US012645059B2

(12) United States Patent 
Kondo et al.

(10) Patent No.: US 12,645,059 B2
(45) Date of Patent: Jun. 2, 2026

(54) VARIABLE MAGNIFICATION OPTICAL SYSTEM AND IMAGING APPARATUS

(71) Applicant: FUJIFILM Corporation, Tokyo (JP)

(72) Inventors: Masato Kondo, Saitama (JP); Tatsuyuki Ogino, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 627 days.

(21) Appl. No.: 18/062,454

(22) Filed: Dec. 6, 2022

(65) Prior Publication Data

US 2023/0194840 A1     Jun. 22, 2023

(30) Foreign Application Priority Data

Dec. 21, 2021     (JP) ................................. 2021-206989

(51) Int. Cl.
    *G02B 15/20*    (2006.01)
    *G02B 15/177*    (2006.01)
(52) U.S. Cl.
    CPC ........... *G02B 15/20* (2013.01); *G02B 15/177* (2013.01)
(58) Field of Classification Search
    CPC .................. G02B 15/20; G02B 15/177; G02B 15/144503; G02B 15/144507; G02B 15/144511; G02B 15/145507; G02B 15/145511; G02B 15/145515; G02B 15/145519; G02B 15/145523;
(Continued)

(56) References Cited

U.S. PATENT DOCUMENTS

2004/0051958 A1    3/2004  Yoneyama
2020/0264413 A1    8/2020  Yamanaka
(Continued)

FOREIGN PATENT DOCUMENTS

EP        3327480 B1 *  7/2020  ..... G02B 15/144507
JP    H08-313809 A    11/1996
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

(Continued)

*Primary Examiner* — William R Alexander
*Assistant Examiner* — Alaina Marie Swanson
(74) *Attorney, Agent, or Firm* — Studebaker Brackett PLLC

(57) ABSTRACT

The variable magnification optical system consists of a front group, a middle group, and a rear group, in order from an object side. The front group consists of two or fewer lens groups and has a negative refractive power. The middle group includes only one lens group that has a positive refractive power as a lens group. The rear group consists of three or less lens groups. An aperture stop is disposed between a lens surface closest to an image side in the front group and a lens surface closest to the object side in the rear group. The front group includes at least three negative lenses and at least one positive lens. A negative meniscus lens convex toward the object side is disposed closest to the object side in the front group. The variable magnification optical system satisfies predetermined conditional expressions.

31 Claims, 42 Drawing Sheets

(58) Field of Classification Search
    CPC ........ G02B 15/145527; G02B 15/1465; G02B
                        15/143507; G02B 15/143503
    USPC ........................................................ 359/683
    See application file for complete search history.

(56)                    References Cited

U.S. PATENT DOCUMENTS

2021/0132346 A1    5/2021   Kitada
2022/0113522 A1    4/2022   Ichimura

FOREIGN PATENT DOCUMENTS

| JP | 2004-085600 A | | 3/2004 | | |
| JP | 2011257625 A | * | 12/2011 | | |
| JP | 2014026264 A | * | 2/2014 | ........... | G02B 15/177 |
| JP | 2015064491 A | * | 4/2015 | ............. | H04N 23/69 |
| JP | 2020-034631 A | | 3/2020 | | |
| JP | 2020-134684 A | | 8/2020 | | |
| JP | 2021-076829 A | | 5/2021 | | |
| JP | 2021-135458 A | | 9/2021 | | |
| JP | 2021-148949 A | | 9/2021 | | |
| JP | 2022-063727 A | | 4/2022 | | |
| JP | 2023-044106 A | | 3/2023 | | |

OTHER PUBLICATIONS

"Notice of Reasons for Refusal" Office Action issued in JP 2021-206989; mailed by the Japanese Patent Office on Jul. 15, 2025.

* cited by examiner

EXAMPLE 1

<u>EXAMPLE 1</u>

EXAMPLE 1

EXAMPLE 2

EXAMPLE 3

EXAMPLE 5

EXAMPLE 6

FIG. 19

EXAMPLE 8

Wide

FNo. = 4.10 d LINE
F LINE
C LINE

-1000        0        1000
SPHERICAL     [μm]
ABERRATION

ω = 56.4° d LINE (S)
d LINE (T)

-1000        0        1000
ASTIGMATISM [μm]

ω = 56.4° d LINE

-20        0        20
DISTORTION        [%]

ω = 56.4°

F LINE
C LINE

-50        0        50
LATERAL        [μm]
CHROMATIC
ABERRATION

Middle

FNo. = 4.11 d LINE
F LINE
C LINE

-1000        0        1000
SPHERICAL     [μm]
ABERRATION

ω = 41.8° d LINE (S)
d LINE (T)

-1000        0        1000
ASTIGMATISM [μm]

ω = 41.8° d LINE

-20        0        20
DISTORTION        [%]

ω = 41.8°

F LINE
C LINE

-50        0        50
LATERAL        [μm]
CHROMATIC
ABERRATION

Tele

FNo. = 4.12 d LINE
F LINE
C LINE

-1000        0        1000
SPHERICAL     [μm]
ABERRATION

ω = 32.4° d LINE (S)
d LINE (T)

-1000        0        1000
ASTIGMATISM [μm]

ω = 32.4° d LINE

-20        0        20
DISTORTION        [%]

ω = 32.4°

F LINE
C LINE

-50        0        50
LATERAL        [μm]
CHROMATIC
ABERRATION

FIG. 21

EXAMPLE 9

Wide

FNo. = 4.10          ω = 55.2°          ω = 55.2°          ω = 55.2°

—— d LINE
——- F LINE
······ C LINE

—— d LINE (S)
······ d LINE (T)

—— d LINE

——- F LINE
······ C LINE

-1000      0      1000   -1000      0      1000   -20      0      20   -50      0      50
SPHERICAL [μm]        ASTIGMATISM [μm]      DISTORTION [%]       LATERAL [μm]
ABERRATION                                                        CHROMATIC
                                                                 ABERRATION

Middle

FNo. = 4.10          ω = 41.7°          ω = 41.7°          ω = 41.7°

—— d LINE
——- F LINE
······ C LINE

—— d LINE (S)
······ d LINE (T)

—— d LINE

——- F LINE
······ C LINE

-1000      0      1000   -1000      0      1000   -20      0      20   -50      0      50
SPHERICAL [μm]        ASTIGMATISM [μm]      DISTORTION [%]       LATERAL [μm]
ABERRATION                                                        CHROMATIC
                                                                 ABERRATION

Tele

FNo. = 4.11          ω = 32.1°          ω = 32.1°          ω = 32.1°

—— d LINE
——- F LINE
······ C LINE

—— d LINE (S)
······ d LINE (T)

—— d LINE

——- F LINE
······ C LINE

-1000      0      1000   -1000      0      1000   -20      0      20   -50      0      50
SPHERICAL [μm]        ASTIGMATISM [μm]      DISTORTION [%]       LATERAL [μm]
ABERRATION                                                        CHROMATIC
                                                                 ABERRATION

EXAMPLE 10

EXAMPLE 10

EXAMPLE 11

EXAMPLE 12

FIG. 29

EXAMPLE 14

FIG. 31

EXAMPLE 14

Wide

FNo. = 4.09      ω = 56.3°      ω = 56.3°      ω = 56.3°

——— d LINE
– – – F LINE
········· C LINE

——— d LINE (S)
········· d LINE (T)

——— d LINE

– – – F LINE
········· C LINE

-1000  0  1000 -1000  0  1000 -20  0  20 -50  0  50
SPHERICAL [μm]    ASTIGMATISM [μm]    DISTORTION [%]    LATERAL [μm]
ABERRATION                                       CHROMATIC
ABERRATION

Middle

FNo. = 4.09      ω = 42.3°      ω = 42.3°      ω = 42.3°

——— d LINE
– – – F LINE
········· C LINE

——— d LINE (S)
········· d LINE (T)

——— d LINE

– – – F LINE
········· C LINE

-1000  0  1000 -1000  0  1000 -20  0  20 -50  0  50
SPHERICAL [μm]    ASTIGMATISM [μm]    DISTORTION [%]    LATERAL [μm]
ABERRATION                                       CHROMATIC
ABERRATION

Tele

FNo. = 4.10      ω = 32.0°      ω = 32.0°      ω = 32.0°

——— d LINE
– – – F LINE
········· C LINE

——— d LINE (S)
········· d LINE (T)

——— d LINE

– – – F LINE
········· C LINE

-1000  0  1000 -1000  0  1000 -20  0  20 -50  0  50
SPHERICAL [μm]    ASTIGMATISM [μm]    DISTORTION [%]    LATERAL [μm]
ABERRATION                                       CHROMATIC
ABERRATION

EXAMPLE 15

FIG. 33

EXAMPLE 15

Wide

FNo. = 4.10                ω = 56.0°                ω = 56.0°                ω = 56.0°

—— d LINE
— — F LINE
------ C LINE

—— d LINE (S)
------ d LINE (T)

—— d LINE

— — F LINE
------ C LINE

-1000    0    1000   -1000    0    1000   -20    0    20   -50    0    50
SPHERICAL  [μm]      ASTIGMATISM [μm]      DISTORTION  [%]      LATERAL    [μm]
ABERRATION                                                     CHROMATIC
                                                              ABERRATION

Middle

FNo. = 4.09                ω = 41.4°                ω = 41.4°                ω = 41.4°

—— d LINE
— — F LINE
------ C LINE

—— d LINE (S)
------ d LINE (T)

—— d LINE

— — F LINE
------ C LINE

-1000    0    1000   -1000    0    1000   -20    0    20   -50    0    50
SPHERICAL  [μm]      ASTIGMATISM [μm]      DISTORTION  [%]      LATERAL    [μm]
ABERRATION                                                     CHROMATIC
                                                              ABERRATION

Tele

FNo. = 4.10                ω = 31.2°                ω = 31.2°                ω = 31.2°

—— d LINE
— — F LINE
------ C LINE

—— d LINE (S)
------ d LINE (T)

—— d LINE

— — F LINE
------ C LINE

-1000    0    1000   -1000    0    1000   -20    0    20   -50    0    50
SPHERICAL  [μm]      ASTIGMATISM [μm]      DISTORTION  [%]      LATERAL    [μm]
ABERRATION                                                     CHROMATIC
                                                              ABERRATION

EXAMPLE 16

EXAMPLE 17

EXAMPLE 17

FIG. 38

EXAMPLE 18

EXAMPLE 18

VARIABLE MAGNIFICATION OPTICAL SYSTEM AND IMAGING APPARATUS

CROSS-REFERENCE TO RELATED APPLICATIONS

The present application claims priority under 35 U.S.C. § 119 to Japanese Patent Application No. 2021-206989, filed on Dec. 21, 2021. The above application is hereby expressly incorporated by reference, in its entirety, into the present application.

BACKGROUND

Technical Field

The technique of the present disclosure relates to a variable magnification optical system and an imaging apparatus.

Related Art

In the related art, as a variable magnification optical system that can be used in an imaging apparatus such as a digital camera, the variable magnification optical systems described in JP2021-148949A and JP2021-076829A are known.

There is a demand for a variable magnification optical system which has a wide angle of view and which is configured to achieve reduction in size and maintain favorable optical performance, and the level of the demand is increasing year by year.

SUMMARY

The present disclosure has been made in view of the above-mentioned circumstances, and an object of the present disclosure is to provide a variable magnification optical system which has a wide angle of view and which is reduced in size and maintains favorable optical performance, and an imaging apparatus comprising the variable magnification optical system.

According to a first aspect of the present disclosure, there is provided a variable magnification optical system consisting of, in order from an object side to an image side: a front group; a middle group; and a rear group. The front group consists of two or fewer lens groups and has a negative refractive power as a whole throughout an entire variable magnification range, the middle group includes only one lens group that has a positive refractive power as a lens group, the rear group consists of three or less lens groups, an aperture stop is disposed between a lens surface closest to the image side in the front group and a lens surface closest to the object side in the rear group, during magnification change, a spacing between the front group and the middle group changes, and a spacing between the middle group and the rear group changes, in a case where the front group consists of two lens groups, a spacing between adjacent lens groups in the front group changes during magnification change, in a case where the rear group consists of a plurality of lens groups, all spacings between adjacent lens groups in the rear group change during magnification change, the front group includes at least three negative lenses and at least one positive lens, a first lens that has a negative refractive power and has a meniscus shape convex toward the object side is disposed closest to the object side in the front group. Assuming that a sum of a back focal length of a whole system in terms of an air-equivalent distance and a distance on an optical axis from a lens surface closest to the object side in the front group to a lens surface closest to the image side in the rear group in a state where an infinite distance object is in focus at a wide angle end is TLw, a focal length of the whole system in a state where the infinite distance object is in focus at the wide angle end is fw, a focal length of the whole system in a state where the infinite distance object is in focus at a telephoto end is ft, and a maximum half angle of view in a state where the infinite distance object is in focus at the telephoto end is wt, Conditional Expressions (1) and (2) are satisfied, which are represented by $$3.8 < TLw/(ft \times \tan \omega t) < 5.2 \tag{1}, and$$

$$1 < (fw \times TLw)/ft^2 < 2 \tag{2}.$$

According to a second aspect of the present disclosure, in the first aspect, assuming that an open F number in a state where the infinite distance object is in focus at the telephoto end is FNot, the variable magnification optical system satisfies Conditional Expression (3), which is represented by $$1.5 < FNot/(ft/fw) < 3 \tag{3}.$$

According to a third aspect of the present disclosure, in the first or second aspect, assuming that a focal length of the front group in a state where the infinite distance object is in focus at the wide angle end is fFw, and a focal length of the middle group is fM, the variable magnification optical system satisfies Conditional Expression (4), which is represented by $$0.1 < (-fFw)/fM < 1.6 \tag{4}.$$

According to fourth aspect of the present disclosure, in any one of the first to third aspects, assuming that a focal length of the front group in a state where the infinite distance object is in focus at the wide angle end is fFw, the variable magnification optical system satisfies Conditional Expression (5), which is represented by $$0.6 < (-fFw)/(fw \times ft)^{1/2} < 1.3 \tag{5}.$$

According to a fifth aspect of the present disclosure, in any one of the first to fourth aspects, assuming that a focal length of the middle group is fM, the variable magnification optical system satisfies Conditional Expression (6), which is represented by $$0.65 < fM/(fw \times ft)^{1/2} < 3.7 \tag{6}.$$

According to a sixth aspect of the present disclosure, in any one of the first to fifth aspects, assuming that a focal length of the first lens is fL1, and a focal length of the front group in a state where the infinite distance object is in focus at the wide angle end is fFw, the variable magnification optical system satisfies Conditional Expression (7), which is represented by $$1 < fL1/fFw < 3.5 \tag{7}.$$

According to a seventh aspect of the present disclosure, in any one of the first to sixth aspects, assuming that a focal length of the front group in a state where the infinite distance object is in focus at the wide angle end is fFw, and an open F number in a state where the infinite distance object is in focus at the telephoto end is FNot, the variable magnification optical system satisfies Conditional Expression (8), which is represented by $$1.8 < (-fFw)/(ft/FNot) < 4 \tag{8}.$$

According to an eighth aspect of the present disclosure, in any one of the first to seventh aspects, assuming that a center thickness of the first lens is D1, and an open F number in a state where the infinite distance object is in focus at the telephoto end is FNot, the variable magnification optical system satisfies Conditional Expression (9), which is represented by $$0.08 < D1/(ft/\text{FNot}) < 0.42 \tag{9}$$

According to a ninth aspect of the present disclosure, in any one of the first to eighth aspects, assuming that a maximum half angle of view in a state where the infinite distance object is in focus at the wide angle end is $\omega w$, and an open F number in a state where the infinite distance object is in focus at the wide angle end is FNow, the variable magnification optical system satisfies Conditional Expression (10), which is represented by $$0.3 < \tan \omega w/\text{FNow} < 0.47 \tag{10}$$

According to a tenth aspect of the present disclosure, in any one of the first to ninth aspects, assuming that a lateral magnification of the middle group in a state where the infinite distance object is in focus at the wide angle end is $\beta Mw$, and a lateral magnification of the middle group in a state where the infinite distance object is in focus at the telephoto end is $\beta Mt$, the variable magnification optical system satisfies Conditional Expression (11), which is represented by $$-4 < \beta Mt/\beta Mw < 3.5 \tag{11}$$

According to an eleventh aspect of the present disclosure, in any one of the first to tenth aspects, assuming that a focal length of the rear group in a state where the infinite distance object is in focus at the wide angle end is fRw, the variable magnification optical system satisfies Conditional Expression (12), which is represented by $$0.15 < (fw \times ft)^{1/2}/|\text{FRw}| < 1.1 \tag{12}$$

According to a twelfth aspect of the present disclosure, in any one of the first to eleventh aspects, assuming that a lateral magnification of a lens group closest to the image side in the rear group in a state where the infinite distance object is in focus at the wide angle end is $\beta Rrw$, the variable magnification optical system satisfies Conditional Expression (13), which is represented by $$-2 < \beta Rrw < 3 \tag{13}$$

According to a thirteenth aspect of the present disclosure, in any one of the first to twelfth aspects, assuming that a distance on the optical axis from the lens surface closest to the object side in the front group to the aperture stop in a state where the infinite distance object is in focus at the wide angle end is DDFSTw, and a focal length of the front group in a state where the infinite distance object is in focus at the wide angle end is fFw, the variable magnification optical system satisfies Conditional Expression (14), which is represented by $$1.4 < DDFSTw/|fFw| < 4 \tag{14}$$

According to a fourteenth aspect of the present disclosure, in any one of the first to thirteenth aspects, assuming that a distance on the optical axis from the lens surface closest to the object side in the front group to a paraxial entrance pupil position in a state where the infinite distance object is in focus at the wide angle end is Enpw, and a maximum half angle of view in a state where the infinite distance object is in focus at the wide angle end is $\omega w$, the variable magnification optical system satisfies Conditional Expression (15), which is represented by $$1.9 < Enpw/\{(fw \times \tan \omega w) \times \log(ft/fw)\} < 3.8 \tag{15}$$

According to a fifteenth aspect of the present disclosure, in any one of the first to the fourteenth aspects, assuming that a distance on the optical axis from the lens surface closest to the object side in the front group to the aperture stop in a state where the infinite distance object is in focus at the wide angle end is DDFSTw, and a maximum half angle of view in a state where the infinite distance object is in focus at the wide angle end is $\omega w$, the variable magnification optical system satisfies Conditional Expression (16), which is represented by $$5 < DDFSTw/\{(fw \times \tan \omega w) \times \log(ft/fw)\} < 10 \tag{16}$$

According to a sixteenth aspect of the present disclosure, in any one of the first to fifteenth aspects, assuming that a distance on the optical axis from the lens surface closest to the object side in the front group to a paraxial entrance pupil position in a state where the infinite distance object is in focus at the wide angle end is Enpw, the variable magnification optical system satisfies Conditional Expression (17), which is represented by $$0.5 < Enpw/(fw \times ft)^{1/2} < 1.1 \tag{17}$$

According to a seventeenth aspect of the present disclosure, in any one of the first to sixteenth aspects, assuming that a distance on the optical axis from the lens surface closest to the object side in the front group to the aperture stop in a state where the infinite distance object is in focus at the wide angle end is DDFSTw, the variable magnification optical system satisfies Conditional Expression (18), which is represented by $$0.3 < DDFSTw/TLw < 0.7 \tag{18}$$

According to an eighteenth aspect of the present disclosure, in any one of the first to the seventeenth aspects, assuming that the back focal length of the whole system in terms of the air-equivalent distance in a state where the infinite distance object is in focus at the wide angle end is Bfw, the variable magnification optical system satisfies Conditional Expression (19), which is represented by $$0.08 < Bfw/TLw < 0.27 \tag{19}$$

According to a nineteenth aspect of the present disclosure, in any one of the first to eighteenth aspects, assuming that a sum of the back focal length of the whole system in terms of the air-equivalent distance and a distance on the optical axis from a paraxial exit pupil position to the lens surface closest to the image side in the rear group in a state where the infinite distance object is in focus at the wide angle end is Expw, the variable magnification optical system satisfies Conditional Expression (20), which is represented by $$0.28 < fw/Expw < 0.65 \tag{20}$$

According to a twentieth aspect of the present disclosure, in any one of the first to the nineteenth aspects, assuming that a curvature radius of an object side surface of the first lens is Rf, and a curvature radius of an image side surface of the first lens is Rr, the variable magnification optical system satisfies Conditional Expression (21), which is represented by $$1.5 < (Rf+Rr)/(Rf-Rr) < 4.2 \tag{21}$$

According to a twenty-first aspect of the present disclosure, in any one of the first to the twentieth aspects, assuming that an average value of Abbe numbers of all positive lenses of the rear group based on a d line is $\nu Rpave$, the variable magnification optical system satisfies Conditional Expression (22), which is represented by $$40 < \nu Rpave < 90 \tag{22}$$

According to a twenty-second aspect of the present disclosure, in any one of the first to twenty-first aspects, assuming that a difference in an optical axis direction between a position of the middle group in a state where the infinite distance object is in focus at the wide angle end and a position of the middle group in a state where the infinite distance object is in focus at the telephoto end is DMwt, and a sign of DMwt is positive in a case where the position of the middle group in a state where the infinite distance object is in focus at the telephoto end is closer to the image side than the position of the middle group in a state where the infinite distance object is in focus at the wide angle end, and is negative in a case where the position of the middle group in a state where the infinite distance object is in focus at the telephoto end is closer to the object side than the position of the middle group in a state where the infinite distance object is in focus at the wide angle end, and a unit of DMwt is millimeters, the variable magnification optical system satisfies Conditional Expression (23), which is represented by $$-0.2 < (ft/fw)/DMwt < -0.04 \qquad (23).$$

According to a twenty-third aspect of the present disclosure, in any one of the first to twenty-second aspects, assuming that a refractive index of the first lens at a d line is NL1, and a refractive index of a negative lens which is second from the object side at the d line among the negative lenses in the front group is NLn2, the variable magnification optical system satisfies Conditional Expression (24), which is represented by $$1.58 < (NL1 + NLn2)/2 < 2.2 \qquad (24).$$

According to a twenty-fourth aspect of the present disclosure, in any one of the first to the twenty-third aspects, an image side surface of a lens having a strongest positive refractive power in the rear group is a convex surface. Assuming that a focal length of the lens having the strongest positive refractive power in the rear group is fRLp, and a focal length of the rear group in a state where the infinite distance object is in focus at the wide angle end is fRw, the variable magnification optical system satisfies Conditional Expression (25), which is represented by $$-10 < fRw/fRLp < 5 \qquad (25).$$

According to a twenty-fourth aspect of the present disclosure, in the twenty-fourth aspect, in the variable magnification optical system, the lens having the strongest positive refractive power in the rear group is a biconvex lens.

According to a twenty-sixth aspect of the present disclosure, in any one of the first to the twenty-fifth aspects, assuming that an effective diameter of the lens surface closest to the object side in the front group is EDf, and an effective diameter of the lens surface closest to the image side in the rear group is EDr, the variable magnification optical system satisfies Conditional Expression (26), which is represented by $$1.1 < EDf/EDr < 2.1 \qquad (26).$$

According to a twenty-seventh aspect of the present disclosure, in any one of the first to the twenty-sixth aspects, assuming that an effective diameter of the lens surface closest to the object side in the front group is EDf, the variable magnification optical system satisfies Conditional Expression (27), which is represented by $$0.2 < EDf/TLw < 0.45 \qquad (27).$$

According to a twenty-eighth aspect of the present disclosure, in any one of the first to twenty-seventh aspects, in the variable magnification optical system, the rear group includes a focusing group that moves along the optical axis during focusing, and the focusing group consists of two or fewer lenses.

According to a twenty-ninth aspect of the present disclosure, in the twenty-eighth aspect, in the variable magnification optical system, the focusing group consists of one negative lens and one positive lens.

According to a thirtieth aspect of the present disclosure is an aspect in which, in the twenty-ninth aspect, in the variable magnification optical system, the focusing group consists of a cemented lens obtained by cementing the one negative lens and the one positive lens.

According to a thirty-first aspect of the present disclosure, in the twenty-eighth aspect, in the variable magnification optical system, the focusing group consists of one single lens.

According to a thirty-second aspect of the present disclosure, in any one of the first to twenty-eighth aspects, the variable magnification optical system includes only one focusing group that moves along the optical axis during focusing, and the focusing group is disposed in the rear group.

According to a thirty-third aspect of the present disclosure is any one of the first to twenty-eighth aspects, in the variable magnification optical system, the front group consists of one lens group that moves during magnification change.

According to a thirty-fourth aspect of the present disclosure, in any one of the first to the twenty-eighth aspects, in the variable magnification optical system, the variable magnification optical system is a zoom lens, and a lens group closest to the object side in the front group remains stationary with respect to an image plane during magnification change.

According to a thirty-fifth aspect of the present disclosure, in any one of the first to twenty-eighth aspects, the variable magnification optical system includes at least two cemented lenses consisting of one positive lens and one negative lens at a position closer to the image side than the front group.

According to a thirty-sixth aspect of the present disclosure, in any one of the first to twenty-eighth aspects, in any one of the middle group and the rear group, in the variable magnification optical system, at least one of the middle group or the rear group includes a composite aspherical lens in which a resin having an aspherical air contact surface is formed on a spherical surface of a glass lens.

According to a thirty-seventh aspect of the present disclosure, in any one of the first to twenty-eighth aspects, assuming that an Abbe number of a negative lens which is third from the object side among the negative lenses in the front group based on a d line is vLn3, the variable magnification optical system satisfies Conditional Expression (28), which is represented by $$50 < vLn3 < 95 \qquad (28).$$

According to a thirty-eighth aspect of the present disclosure, in any one of the first to twenty-eighth aspects, in the variable magnification optical system, a lens group closest to the object side in the rear group has a positive refractive power.

According to a thirty-ninth aspect of the present disclosure, in the thirty-eighth aspect, in the variable magnification optical system, the rear group consists of one lens group that has a positive refractive power and moves during magnification change.

According to a fortieth aspect of the present disclosure, in the thirty-ninth aspect, in the variable magnification optical system, the front group consists of one lens group that moves during magnification change.

According to a forty-first aspect of the present disclosure, in the thirty-ninth or fortieth aspect, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a forty-second aspect of the present disclosure, in the forty-first aspect, in the variable magnification optical system, in the first lens, an object side lens surface and an image side lens surface are spherical surfaces, and in the second lens, an object side lens surface and an image side lens surface are aspherical surfaces.

According to a forty-third aspect of the present disclosure, in the thirty-eighth aspect, in the variable magnification optical system, the rear group consists of, in order from the object side to the image side, a lens group that has a positive refractive power, a lens group that has a negative refractive power, and a lens group that has a negative refractive power.

According to a forty-fourth aspect of the present disclosure, in the forty-third aspect, in the variable magnification optical system, all the lens groups in the rear group move during magnification change.

According to a forty-fifth aspect of the present disclosure, in the forty-third or forty-fourth aspect, in the variable magnification optical system, the front group consists of one lens group that moves during magnification change.

According to a forty-sixth aspect of the present disclosure, in any one of the forty-third to forty-fifth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a forty-seventh aspect of the present disclosure, in the forty-sixth aspect, in the variable magnification optical system, in the first lens, an object side lens surface and an image side lens surface are spherical surfaces, and in the second lens, an object side lens surface and an image side lens surface are aspherical surfaces.

According to a forty-eighth aspect of the present disclosure, in any one of the forty-third to forty-seventh aspects, the variable magnification optical system includes a focusing group that moves along the optical axis during focusing, and the focusing group consists of one single lens.

According to a forty-ninth aspect of the present disclosure, in the thirty-eighth aspect, in the variable magnification optical system, the rear group consists of, in order from the object side to the image side, a lens group that has a positive refractive power, a lens group that has a positive refractive power, and a lens group that has a negative refractive power.

According to a fiftieth aspect of the present disclosure, in the variable magnification optical system, all the lens groups in the rear group move during magnification change.

According to a fifty-first aspect of the present disclosure, in the forty-ninth or fiftieth aspect, in the variable magnification optical system, the front group consists of one lens group that moves during magnification change.

According to a fifty-second aspect of the present disclosure, in any one of the forty-ninth to fifty-first aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a fifty-third aspect of the present disclosure, in the fifty-second aspect, in the variable magnification optical system, in the first lens, an object side lens surface and an image side lens surface are spherical surfaces, and in the second lens, an object side lens surface and an image side lens surface are aspherical surfaces.

According to a fifty-fourth aspect of the present disclosure, in the thirty-eighth aspect, in the variable magnification optical system, the rear group consists of, in order from the object side to the image side, a lens group that has a positive refractive power, a lens group that has a negative refractive power, and a lens group that has a positive refractive power.

According to a fifty-fifth aspect of the present disclosure, in the fifty-fourth aspect, in the variable magnification optical system, all the lens groups in the rear group move during magnification change.

According to a fifty-sixth aspect of the present disclosure, in the fifty-fourth aspect, in the variable magnification optical system, a lens group closest to the image side in the rear group remains stationary with respect to an image plane during magnification change.

According to a fifty-seventh aspect of the present disclosure, in any one of the fifty-fourth to fifty-sixth aspects, in the variable magnification optical system, the front group consists of one lens group that moves during magnification change.

According to a fifty-eighth aspect of the present disclosure, in the fifty-fourth aspect, in the variable magnification optical system, the front group consists of, in order from the object side to the image side, a lens group that has a negative refractive power and a lens group that has a positive refractive power.

According to a fifty-ninth aspect of the present disclosure, in the fifty-eighth aspect, in the variable magnification optical system, the variable magnification optical system is a zoom lens, and a lens group closest to the object side in the front group remains stationary with respect to an image plane during magnification change.

According to a sixtieth aspect of the present disclosure, in any one of the fifty-fourth to fifty-ninth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a sixty-first aspect of the present disclosure, in the sixtieth aspect, in the variable magnification optical system, in the first lens, an object side lens surface and an image side lens surface are spherical surfaces, and in the second lens, an object side lens surface and an image side lens surface are aspherical surfaces.

According to a sixty-second aspect of the present disclosure, in any one of the fifty-fourth to sixty-first aspects, in the variable magnification optical system, the rear group includes a focusing group that moves along the optical axis during focusing, and the focusing group consists of two or fewer lenses.

According to a sixty-third aspect of the present disclosure, in the sixty-second aspect, in the variable magnification optical system, the focusing group consists of one negative lens.

According to a sixty-fourth aspect of the present disclosure, in the thirty-eighth aspect, in the variable magnification optical system, the rear group consists of, in order from the object side to the image side, a lens group that has a positive refractive power and a lens group that has a negative refractive power.

According to a sixty-fifth aspect of the present disclosure, in the sixty-fourth aspect, in the variable magnification optical system, all the lens groups in the rear group move during magnification change.

According to a sixty-sixth aspect of the present disclosure, in the sixty-fourth or sixty-fifth aspect, in the variable magnification optical system, the front group consists of one lens group that moves during magnification change.

According to a sixty-seventh aspect of the present disclosure, in the sixty-fourth or sixty-fifth aspect, in the variable magnification optical system, the front group consists of, in order from the object side to the image side, a lens group that has a negative refractive power and a lens group that has a positive refractive power.

According to a sixty-eighth aspect of the present disclosure, in the sixty-seventh aspect, in the variable magnification optical system, the variable magnification optical system is a zoom lens, and a lens group closest to the object side in the front group remains stationary with respect to an image plane during magnification change.

According to a sixty-ninth aspect of the present disclosure, in any one of the sixty-fourth to the sixty-eighth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a seventieth aspect of the present disclosure, in the sixty-ninth aspect, in the variable magnification optical system, in the first lens, an object side lens surface and an image side lens surface are spherical surfaces, and in the second lens, an object side lens surface and an image side lens surface are aspherical surfaces.

According to a seventy-first aspect of the present disclosure, in any one of the first to thirty-seventh aspects, in the variable magnification optical system, a lens group closest to the object side in the rear group has a negative refractive power.

According to a seventy-second aspect of the present disclosure, in the seventy-first aspect, in the variable magnification optical system, the rear group consists of, in order from the object side to the image side, a lens group that has a negative refractive power and a lens group that has a positive refractive power.

According to a seventy-second aspect of the present disclosure, in the seventy-third aspect, in the variable magnification optical system, all the lens groups in the rear group move during magnification change.

According to a seventy-fourth aspect of the present disclosure, in the seventy-second or seventy-third aspect, in the variable magnification optical system, the front group consists of one lens group that moves during magnification change.

According to a seventy-fifth aspect of the present disclosure, in any one of the seventy-second to the seventy-fourth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a seventy-sixth aspect of the present disclosure, in the seventy-fifth aspect, in the variable magnification optical system, in the first lens, an object side lens surface and an image side lens surface are spherical surfaces, and in the second lens, an object side lens surface and an image side lens surface are aspherical surfaces.

According to a seventy-seventh aspect of the present disclosure, in any one of the seventy-second to seventy-sixth aspects, the variable magnification optical system includes a focusing group that moves along the optical axis during focusing, and the focusing group consists of a cemented lens consisting of one positive lens and one negative lens.

According to a seventy-eighth aspect of the present disclosure, in the seventy-first aspect, in the variable magnification optical system, the rear group consists of, in order from the object side to the image side, a lens group that has a negative refractive power and a lens group that has a negative refractive power.

According to a seventy-eighth aspect of the present disclosure, in the seventy-ninth aspect, in the variable magnification optical system, all the lens groups in the rear group move during magnification change.

According to an eightieth aspect of the present disclosure, in the seventy-eighth or seventy-ninth aspect, in the variable magnification optical system, the front group consists of one lens group that moves during magnification change.

According to an eighty-first aspect of the present disclosure, in any one of the seventy-eighth to eightieth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to an eighty-second aspect of the present disclosure, in the eighty-first aspect, in the variable magnification optical system, in the first lens, an object side lens surface and an image side lens surface are spherical surfaces, and in the second lens, an object side lens surface and an image side lens surface are aspherical surfaces.

According to an eighty-third aspect of the present disclosure, in any one of the seventy-eighth to the eighty-second aspects, the variable magnification optical system includes a focusing group that moves along the optical axis during focusing, and the focusing group consists of a cemented lens consisting of one positive lens and one negative lens.

According to an eighty-fourth aspect of the present disclosure, in the seventy-first aspect, in the variable magnification optical system, the rear group consists of, in order from the object side to the image side, a lens group that has a negative refractive power, a lens group that has a negative refractive power, and a lens group that has a positive refractive power.

According to an eighty-fifth aspect of the present disclosure, in the eighty-fourth aspect, in the variable magnification optical system, all the lens groups in the rear group move during magnification change.

According to an eighty-sixth aspect of the present disclosure, in the eighty-fourth or eighty-fifth aspect, in the variable magnification optical system, the front group consists of one lens group that moves during magnification change.

According to an aspect of the eighty-seventh aspect of the present disclosure, in any one of the eighty-fourth to the eighty-sixth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to an eighty-eighth aspect of the present disclosure, in the eighty-seventh aspect, in the variable magnification optical system, in the first lens, an object side lens surface and an image side lens surface are spherical surfaces, and in the second lens, an object side lens surface and an image side lens surface are aspherical surfaces.

According to an eighty-ninth aspect of the present disclosure, in any one of the eighty-fourth to the eighty-eighth aspects, the variable magnification optical system includes a focusing group that moves along the optical axis during focusing, and the focusing group consists of a cemented lens consisting of one positive lens and one negative lens.

According to a ninetieth aspect of the present disclosure, in the seventy-first aspect, in the variable magnification optical system, the rear group consists of, in order from the object side to the image side, a lens group that has a negative refractive power, a lens group that has a positive refractive power, and a lens group that has a positive refractive power.

According to a ninety-first aspect of the present disclosure, in the ninetieth aspect, in the variable magnification optical system, all the lens groups in the rear group move during magnification change.

According to a ninety-second aspect of the present disclosure, in the ninetieth or ninety-first aspect, in the variable magnification optical system, the front group consists of one lens group that moves during magnification change.

According to a ninety-third aspect of the present disclosure, in any one of the ninetieth to ninety-second aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a ninety-fourth aspect of the present disclosure, in the ninety-third aspect, in the variable magnification optical system, in the first lens, an object side lens surface and an image side lens surface are spherical surfaces, and in the second lens, an object side lens surface and an image side lens surface are aspherical surfaces.

According to a ninety-fifth aspect of the present disclosure, in any one of the ninetieth to ninety-fourth aspects, the variable magnification optical system includes a focusing group that moves along the optical axis during focusing, and the focusing group consists of a cemented lens consisting of one positive lens and one negative lens.

According to a ninety-sixth aspect of the present disclosure, in the seventy-first aspect, in the variable magnification optical system, the rear group consists of, in order from the object side to the image side, a lens group that has a negative refractive power, a lens group that has a positive refractive power, and a lens group that has a negative refractive power.

According to a ninety-seventh aspect of the present disclosure, in the ninety-sixth aspect, in the variable magnification optical system, all the lens groups in the rear group move during magnification change.

According to a ninety-sixth or ninety-seventh aspect of the present disclosure, in the ninety-sixth or ninety-seventh aspect, in the variable magnification optical system, the front group consists of one lens group that moves during magnification change.

According to a ninety-ninth aspect of the present disclosure, in any one of the ninety-sixth to ninety-eighth aspects, in the variable magnification optical system, the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

According to a hundredth aspect of the present disclosure, in the ninety-ninth aspect, in the variable magnification optical system, in the first lens, an object side lens surface and an image side lens surface are spherical surfaces, and in the second lens, an object side lens surface and an image side lens surface are aspherical surfaces.

According to a hundred-first aspect of the present disclosure, in any one of the ninety-sixth to hundredth aspects, the variable magnification optical system includes a focusing group that moves along the optical axis during focusing, and the focusing group consists of a cemented lens consisting of one positive lens and one negative lens.

According to a hundred-second aspect of the present disclosure, there is provided an imaging apparatus comprising the variable magnification optical system according to any one of the first to hundred-first aspects.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group that has a positive refractive power" mean that the group as a whole has a positive refractive power. Similarly, the terms "group that has a negative refractive power" and "group has a negative refractive power" mean that the group as a whole has a negative refractive power. The term "a lens that has a positive refractive power" and the term "a positive lens" are synonymous. The term "a lens that has a negative refractive power" and the term "negative lens" are synonymous. The terms "lens groups" such as "first lens group", "front group", "middle group", "rear group", and "focusing group" in the present specification are not limited to a configuration consisting of a plurality of lenses, but may be a configuration consisting of only one lens.

The curvature radius, the sign of the refractive power, and the surface shape of the lens including the aspherical surface will be used in terms of the paraxial region unless otherwise specified. The sign of the curvature radius of the surface having a shape convex toward the object side is positive, and the sign of the curvature radius of the surface having a shape convex toward the image side is negative.

As used herein, the term "whole system" means a variable magnification optical system. The "focal length" used in a conditional expression is a paraxial focal length. Unless otherwise specified, the "distance on the optical axis" used in Conditional Expression is considered as a geometrical length. The values used in conditional expressions are values in a case where the d line is used as a reference in a state where the infinite distance object is in focus unless otherwise specified. The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the present disclosure, it is possible to provide a variable magnification optical system which has a wide angle of view and which achieves reduction in size and maintains favorable optical performance, and an imaging apparatus comprising the variable magnification optical system.

BRIEF DESCRIPTION OF THE DRAWINGS

FIG. 19 is a diagram of aberrations of the variable magnification optical system of Example 8.

FIG. 21 is a diagram of aberrations of the variable magnification optical system of Example 9.

FIG. 29 is a diagram of aberrations of the variable magnification optical system of Example 13.

FIG. 31 is a diagram of aberrations of the variable magnification optical system of Example 14.

FIG. 33 is a diagram of aberrations of the variable magnification optical system of Example 15.

FIG. 38 is a cross-sectional view showing a configuration of a variable magnification optical system of Example 18 and is a diagram showing movement directions.

DESCRIPTION OF EMBODIMENTS

Hereinafter, embodiments of the present disclosure will be described with reference to the accompanying drawings.

Figure 1:
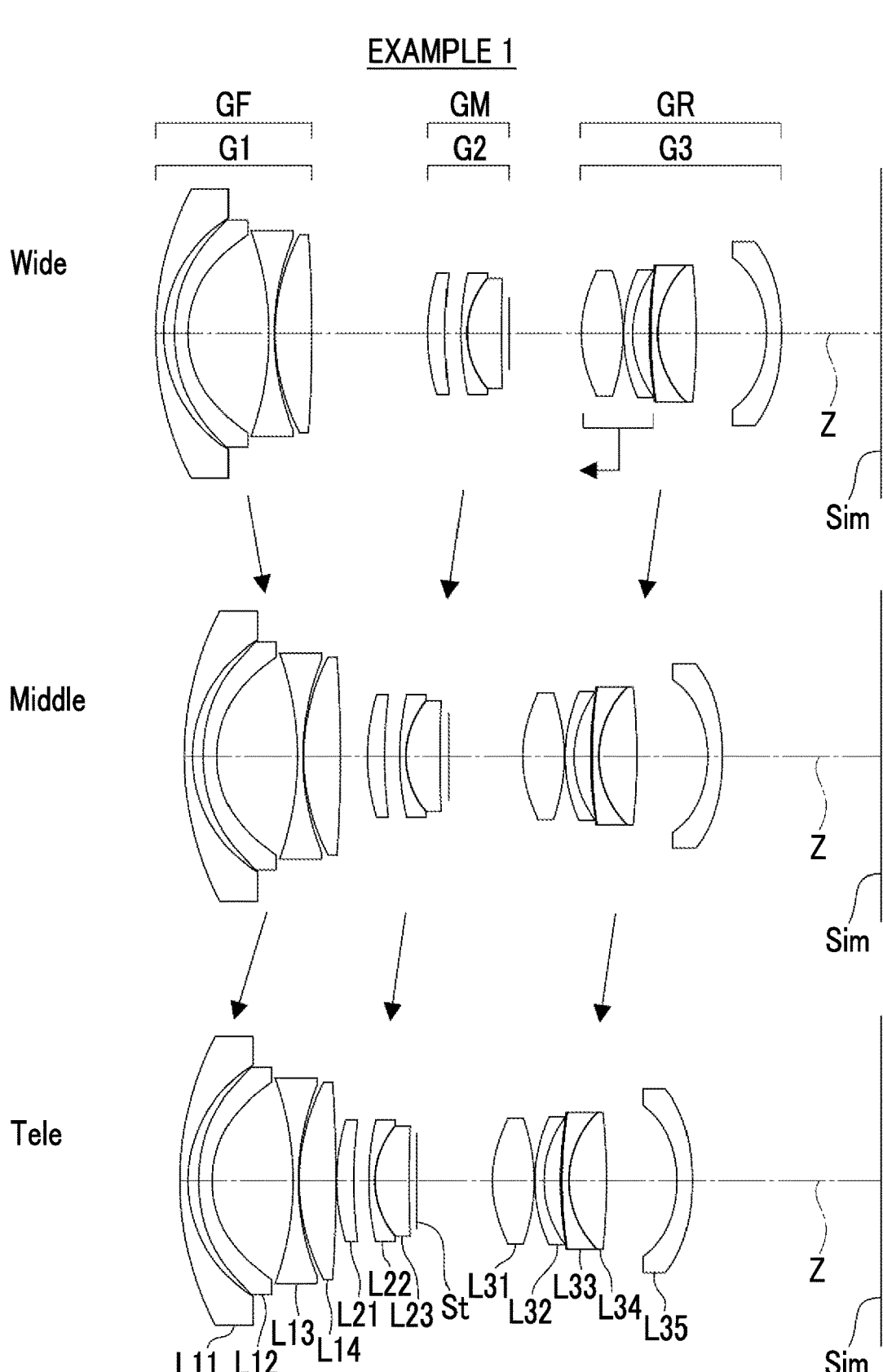
FIG. 1 is a cross-sectional view of a configuration of a variable magnification optical system according to an embodiment corresponding to a variable magnification optical system of Example 1, and is a diagram showing movement directions.
Figure 2:
FIG. 2 is a cross-sectional view of a configuration and luminous fluxes of the variable magnification optical system of FIG. 1.

FIG. 1 shows a cross-sectional view and a schematic movement direction of a configuration of a variable magnification optical system according to an embodiment of the present disclosure in each variable magnification state. Further, FIG. 2 a cross-sectional view of the configuration and a luminous flux of the variable magnification optical system in each variable magnification state in FIG. 1. In FIGS. 1 and 2, the upper part labeled "Wide" indicates a state at a wide angle end, the middle part labeled "Middle" indicates a state in a middle focal length state, and the lower part labeled "Tele" indicates a state at a telephoto end. Both the drawings of FIGS. 1 and 2 are in a state where the infinite distance object is in focus. It should be noted that, in the present specification, an object at a distance of infinity in the optical axis direction from the lens surface closest to the object side in the variable magnification optical system is referred to as an "infinite distance object".

In FIG. 2, as the luminous flux, the upper part shows the on-axis luminous flux wa and the luminous flux wb with the maximum half angle of view ωw, the middle part shows the on-axis luminous flux ma and the luminous flux mb with the maximum half angle of view ωm, and the lower part shows the on-axis luminous flux to and the luminous flux tb with the maximum half angle of view wt. The examples shown in FIGS. 1 and 2 correspond to the variable magnification optical system of Example 1 to be described later. In FIGS. 1 and 2, the left side is the object side and the right side is the image side.

The variable magnification optical system according to the embodiment of the present disclosure consists of a front group GF, a middle group GM, and a rear group GR in order from the object side to the image side along an optical axis Z. The front group GF consists of two or fewer lens groups and has a negative refractive power as a whole in the entire variable magnification range. The middle group GM includes only one lens group that has a positive refractive power as a lens group. That is, the number of lens groups included in the middle group GM is only one. The rear group GR consists of three or less lens groups. An aperture stop St is disposed between the lens surface closest to the image side in the front group GF and the lens surface closest to the object side in the rear group GR.

The "lens group" in the present specification is a part including the at least one lens, which is a constituent part of the variable magnification optical system and is divided by an air spacing that changes during magnification change. During magnification change, each lens group moves or remains stationary, and the mutual spacing between the lenses in each lens group does not change. That is, in the present specification, one lens group is a group in which the spacing between adjacent groups changes during magnification change and the total spacing between adjacent lenses does not change within itself. It should be noted that the "lens group" may include a constituent element other than a lens having no refractive power such as the aperture stop St.

During magnification change, a spacing between the front group GF and the middle group GM changes, and a spacing between the middle group GM and the rear group GR changes. In a case where the front group GF consists of two lens groups, a spacing between adjacent lens groups in the front group changes during magnification change. In a case where the rear group GR consists of a plurality of lens groups, all the spacings of adjacent lens groups in the rear group change during magnification change.

Since the front group GF closest to the object side has a negative refractive power, it is easy to realize a wide angle of view at the wide angle end. By disposing the middle group GM that has a positive refractive power at a position closer to the image side than the front group GF and disposing the rear group GR on the image side of the middle group GM, it is easy to realize a high-performance optical system is realized while maintaining reduction in size. By disposing the aperture stop St between the lens surface closest to the image side in the front group GF and the lens surface closest to the object side in the rear group GR, the stop unit can be reduced in size, and the entire lens system can be reduced in size. As a result, there is an advantage in the conversion.

For example, the variable magnification optical system of FIG. 1 consists of a first lens group G1, a second lens group G2, and a third lens group G3, in order from the object side to the image side. For example, each lens group in FIG. 1 is configured as follows. The first lens group G1 consists of four lenses L11 to L14, in order from the object side to the image side. The second lens group G2 consists of three lenses L21 to L23 and an aperture stop St, in order from the object side to the image side. The third lens group G3 consists of five lenses L31 to L35, in order from the object side to the image side. It should be noted that the aperture stop St shown in FIG. 1 does not indicate the shape and size, but indicates the position in the optical axis direction. This method of showing the aperture stop St is the same in the other drawings.

In the example of FIG. 1, during magnification change, the first lens group G1, the second lens group G2, and the third lens group G3 move along the optical axis Z while changing the spacing between adjacent lens groups. An oblique arrow between the upper part and the middle part of FIG. 1 schematically indicates movement directions of respective lens groups during magnification change from the wide angle end to the middle focal length state. An oblique arrow between the middle and lower stages of FIG. 1 schematically indicates movement directions of respective lens groups during magnification change from the middle focal length state to the telephoto end. In the example of FIG. 1, the front group GF consists of the first lens group G1, the middle group GM consists of the second lens group G2, and the rear group GR consists of the third lens group G3.

It should be noted that the example shown in FIG. 1 is an example, and the variable magnification optical system according to the embodiment of the present disclosure can be variously modified without departing from the scope of the technique of the present disclosure. For example, the front group GF may be configured to consist of one lens group or may be configured to consist of two lens groups. The rear group GR may be configured to consist of one lens group, may be configured to consist of two lens groups, or may be configured to consist of three lens groups. The number of lenses included in each lens group may be different from the number shown in FIG. 1. Hereinafter, A preferable configuration and a possible configuration of the variable magnification optical system according to the embodiment of the present disclosure will be described.

The front group GF may be configured to consist of one lens group that moves during magnification change. By adopting a configuration in which the front group GF moves during magnification change, there is an advantage in obtaining a high variable magnification ratio.

Alternatively, the front group GF may be configured to consist of two lens groups including a lens group that has a negative refractive power and a lens group that has a positive refractive power, in order from the object side to the image side. In such a case, there is an advantage in obtaining a high variable magnification ratio while suppressing fluctuation in aberrations during magnification change.

The variable magnification optical system according to the embodiment of the present disclosure may be a zoom lens or a varifocal lens. In a case where the variable magnification optical system is a zoom lens, a lens group closest to the object side in the front group GF may be configured to remain stationary with respect to the image plane Sim during magnification change. In such a case, since the number of lens groups that move during magnification change can be suppressed, it is possible to reduce the effect of eccentricity, and it is possible to simplify the configuration of the lens frame. Since the total length of the optical system during magnification change is unchanged, fluctuation in the center of gravity of the optical system during magnification change can be reduced. Thereby, it is possible to improve the convenience during imaging.

It is preferable that the front group GF includes a first lens that has a negative refractive power and has a meniscus shape that is disposed closest to the object side and is convex toward the object side. It is preferable that the front group GF includes at least three negative lenses including the first lens and at least one positive lens. By forming the first lens, which is a negative lens closest to the object side, into a meniscus shape convex toward the object side, a refraction angle of a luminous flux incident on the first lens can be reduced. As a result, there is an advantage in correcting field curvature and the like. By disposing three or more negative lenses in the front group GF, the negative refractive power of the front group GF can be increased. As a result, there is an advantage in achieving wide angle of view at the wide angle end. By disposing at least one positive lens in the front group GF, it is possible to reduce the diameter of the luminous flux incident on the middle group GM from the front group GF. As a result, there is an advantage in achieving reduction in size. In the example of FIG. 1, the lens L11 corresponds to the first lens.

More specifically, it is preferable that the front group GF includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side. In such a case, there is an advantage in correcting field curvature or the like, achieving an increase in angle of view at the wide angle end, and achieving reduction in size. In the example of FIG. 1, the lens L12, the lens L13, and the lens L14 correspond to the above-mentioned second lens, third lens, and fourth lens, respectively. The front group GF may be configured to consist of the four lenses as the first to fourth lenses. Alternatively, the front group GF may be configured to consist of a total of five lenses including the four lenses as the first to fourth lenses.

It should be noted that, in the present specification, the phrase "including, in order from an object side to an image side: ~; and ~" means including constituent elements in order continuously and discontinuously. For example, "including, in order from the object side to the image side: A; and B" may include A and B that are continuously disposed, or may include A and B that are discontinuously disposed with another one disposed between A and B.

In a case where the front group GF includes the first lens and the second lens, an object side lens surface and an image side lens surface of the first lens may be configured to be spherical, and an object side lens surface and an image side lens surface of the second lens may be configured to be aspherical. In an optical system having a wide angle of view, the manufacturing cost can be suppressed by using the first lens, which tends to have a large diameter and which is closest to the object side, as a spherical lens. There is an advantage in reducing the size of the optical system while suppressing various aberrations at the wide angle end by using the second lens as an aspherical lens.

It is preferable that the variable magnification optical system according to the embodiment of the present disclosure is configured to include at least two cemented lenses consisting of one positive lens and one negative lens at a position closer to the image side than the front group GF. In such a case, there is an advantage in suppressing lateral chromatic aberration and longitudinal chromatic aberration in the entire variable magnification range.

It is preferable that the lens group in the middle group is configured to move during magnification change. In such a case, it is easy to suppress fluctuation in aberrations during magnification change. As a result, there is an advantage in achieving high performance.

The aperture stop St may be disposed closest to the image side in the middle group GM, may be disposed between two lens surfaces in the middle group, or may be disposed closest to the object side in the rear group GR. The aperture stop St may be configured to move integrally with an adjacent lens during magnification change, or may be configured to move in a locus different from that of any lens during magnification change.

At least one of the middle group GM and the rear group GR may be configured to include a composite aspherical lens in which a resin having an aspherical air contact surface is formed on the spherical surface of the glass lens. In such a case, since the aspherical surface can be added to the lens surface while suppressing the manufacturing cost, various aberrations can be satisfactorily corrected while reducing the cost. In the present disclosure, the composite aspherical lens composed of the resin and the glass lens is not regarded as a cemented lens in which two lenses are cemented, but is treated as one lens.

A lens group closest to the object side in the rear group GR may be configured to have a positive refractive power. In such a case, there is an advantage particularly in suppressing spherical aberration at the telephoto end.

Alternatively, the lens group closest to the object side in the rear group GR may be configured to have a negative refractive power. In such a case, there is an advantage particularly in suppressing distortion at the wide angle end.

The rear group GR may be configured to consist of one lens group having a positive refractive power and moving during magnification change. In such a case, since the entire rear group moves integrally during magnification change, a mechanism for operating the lens group during magnification change can be simplified. Further, since the rear group GR has a positive refractive power, there is an advantage particularly in suppressing spherical aberration at the telephoto end.

Alternatively, the rear group GR may be configured to consist of a lens group that has a negative refractive power and a lens group that has a negative refractive power, in order from the object side to the image side. In such a case, it is easy to suppress fluctuation in distortion during magnification change.

Alternatively, the rear group GR may be configured to include a plurality of lens groups, and the plurality of lens groups may be configured to include both a lens group that has a positive refractive power and a lens group that has a negative refractive power in the plurality of lens groups. In such a case, it is easy to suppress fluctuation in aberrations during magnification change.

In a case where the rear group GR consists of two lens groups, the rear group GR may be configured to consist of a lens group that has a positive refractive power and a lens group that has a negative refractive power, in order from the object side to the image side. Alternatively, the rear group GR may be configured to consist of a lens group that has a negative refractive power and a lens group that has a positive refractive power, in order from the object side to the image side.

In a case where the rear group GR consists of three lens groups, the rear group GR may be configured as described below. The rear group GR may be configured to consist of a lens group that has a positive refractive power, a lens group that has a negative refractive power, and a lens group that has a negative refractive power, in order from the object side to the image side. The rear group GR may be configured to consist of a lens group that has a positive refractive power, a lens group that has a positive refractive power, and a lens group that has a negative refractive power, in order from the object side to the image side. The rear group GR may be configured to consist of a lens group that has a positive refractive power, a lens group that has a negative refractive power, and a lens group that has a positive refractive power, in order from the object side to the image side. The rear group GR may be configured to consist of a lens group that has a negative refractive power, a lens group that has a negative refractive power, and a lens group that has a positive refractive power, in order from the object side to the image side. The rear group GR may be configured to consist of a lens group that has a negative refractive power, a lens group that has a positive refractive power, and a lens group that has a positive refractive power, in order from the object side to the image side. The rear group GR may be configured to consist of a lens group that has a negative refractive power, a lens group that has a positive refractive power, and a lens group that has a negative refractive power, in order from the object side to the image side.

A configuration may be made such that all lens groups in the rear group move during magnification change. In such a case, there is an advantage in obtaining a high variable magnification ratio while suppressing fluctuation in aberrations during magnification change.

Alternatively, during magnification change, the lens group closest to the image side in the rear group GR may be configured to remain stationary with respect to the image plane Sim. In such a case, it is possible to simplify the mechanism for operating the lens group during magnification change.

It is preferable that the variable magnification optical system according to the embodiment of the present disclosure includes a focusing group that moves along the optical axis Z during focusing. In the present specification, a group that moves along the optical axis Z during focusing is referred to as a "focusing group". Focusing is performed by moving the focusing group.

For example, the focusing group in FIG. 1 consists of two lenses L31 and L32. The brackets and left-pointing arrows below the lenses L31 and L32 in the upper part of FIG. 1 indicate that the focusing group consists of the lenses L31 and L32 and the focusing group moves to the object side during focusing from the infinite distance object to the short range object.

It is preferable that the focusing group is included in the rear group GR. By disposing the focusing group in the rear group, it is easy to reduce the diameter of the focusing group. Therefore, it is easy to control the focusing group.

The focusing group may be disposed closest to the object side in the rear group GR. In such a case, the focusing group can be easily reduced in size. As a result, there is an advantage in achieving reduction in size of the entire lens system. Alternatively, in a case where the rear group GR consists of three lens groups, the focusing group may be disposed in the lens group which is second from the object side in the rear group.

It is preferable that the focusing group consists of two or fewer lenses. By reducing the number of lenses forming the focusing group, a mechanism for controlling the focusing group can be simplified, and it is easy to perform rapid focusing.

The focusing group may be configured to consist of one negative lens and one positive lens. In such a case, since it is possible to cancel various aberrations between the negative lens and the positive lens in the focusing group, it is easy to suppress fluctuations in the aberrations during focusing. As a result, there is an advantage in achieving high performance.

The focusing group may be configured to consist of a cemented lens consisting of one negative lens and one positive lens. In such a case, it is possible to further achieve reduction in size as compared with the case where cementing is not performed. By achieving reduction in size of the focusing group, a mechanism for controlling the focusing group can be simplified, and it is easy to perform rapid focusing.

The focusing group may be configured to consist of one single lens. A "single lens" is one lens that is not cemented. In a case where the focusing group consists of one single lens, it is possible to further achieve reduction in size as compared with a case where the focusing group consists of two or more lenses. By achieving reduction in size of the focusing group, a mechanism for controlling the focusing group can be simplified, and it is easy to perform rapid focusing.

The focusing group may be configured to consist of one negative lens. In such a case, it is possible to further achieve reduction in size as compared with the case where the focusing group consists of two or more lenses. By achieving reduction in size of the focusing group, a mechanism for controlling the focusing group can be simplified, and it is easy to perform rapid focusing. Further, by making the refractive power of the focusing group negative, it is easy to impart a strong refractive power to the focusing group. As a result, there is an advantage in suppressing the amount of movement of the focusing group during focusing.

It is preferable that the variable magnification optical system according to the embodiment of the present disclosure includes only one focusing group. In such a case, the mechanism for focusing can be simplified. In a case where the variable magnification optical system includes only one focusing group, it is preferable that the focusing group is disposed in the rear group.

Hereinafter, preferable and possible configurations about conditional expressions of the variable magnification optical system according to the embodiment of the present disclosure will be described. In the following description of conditional expressions, in order to avoid redundant descriptions, the same symbols are used for those having the same definition, and some duplicate descriptions of the symbols will not be repeated. Further, in the following description, in order to avoid redundant description, the "variable magnification optical system according to the embodiment of the present disclosure" is also simply referred to as a "variable magnification optical system".

It is preferable that the variable magnification optical system satisfies Conditional Expression (1). Here, it is assumed that a sum of a back focal length Bfw in terms of the air-equivalent distance of the whole system and a distance on the optical axis from the lens surface closest to the object side in the front group GF to the lens surface closest to the image side in the rear group GR in a state where the infinite distance object is in focus at the wide angle end is TLw. It is assumed that a focal length of the whole system in a state where the infinite distance object is in focus at the telephoto end is ft and a maximum half angle of view in a state where the infinite distance object is in focus at the telephoto end is wt. TLw is the total length in a state where the infinite distance object is in focus at the wide angle end. The tan of Conditional Expression (1) is a tangent, and this notation is the same for other conditional expressions. By not allowing the corresponding value of Conditional Expression (1) to be equal to or less than the lower limit, there is an advantage in suppressing various aberrations in the entire variable magnification range. By not allowing the corresponding value of Conditional Expression (1) to be equal to or greater than the upper limit, there is an advantage in achieving reduction in size of the entire optical system. In order to obtain more favorable characteristics, it is more preferable that the variable magnification optical system satisfies Conditional Expression (1-1), and it is yet more preferable that the variable magnification optical system satisfies Conditional Expression (1-2).

$$3.8 < TLw/(ft \times \tan \omega t) < 5.2 \tag{1}$$

$$4 < TLw/(ft \times \tan \omega t) < 5.1 \tag{1-1}$$

$$4.2 < TLw/(ft \times \tan \omega t) < 5.04 \tag{1-2}$$

Figure 3:
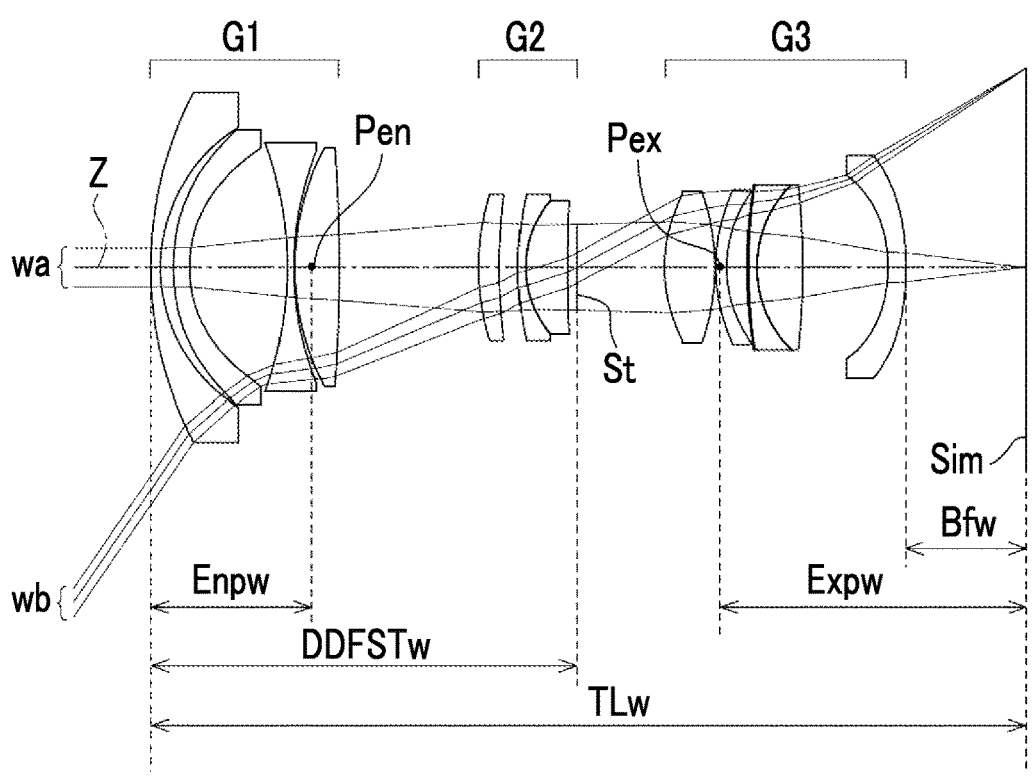
FIG. 3 is a diagram for explaining symbols of each conditional expression.

For example, FIG. 3 shows the back focal length Bfw and the total length TLw in terms of an air-equivalent distance of the whole system in a state where the infinite distance object is in focus at the wide angle end of the variable magnification optical system of FIG. 1. The "back focal length" is a distance on the optical axis from the lens surface closest to the image side in the variable magnification optical system to the image plane Sim. As in the example of FIG. 3, in a case where no member is disposed between the lens surface closest to the image side and the image plane Sim of the variable magnification optical system, a geometrical length from the lens surface closest to the image side in the variable magnification optical system to the image plane Sim is equal to the back focal length Bfw in terms of the air-equivalent distance. However, unlike the example of FIG. 3, in a case where any member such as a filter or a cover glass is not disposed between the image plane Sim and the lens surface closest to the image side in the variable magnification optical system, the geometrical length from the lens surface closest to the image side in the variable magnification optical system to the image plane Sim is different from the back focal length Bfw in terms of the air-equivalent distance. Therefore, the back focal length Bfw is calculated by air-converting the thickness of the member on the optical axis.

Assuming that a focal length of the whole system in a state where the infinite distance object is in focus at the wide angle end is fw, it is preferable that the variable magnification optical system satisfies Conditional Expression (2). By not allowing the corresponding value of Conditional Expression (2) to be equal to or less than the lower limit, there is an advantage in suppressing various aberrations in the entire variable magnification range. By not allowing the corresponding value of Conditional Expression (2) to be equal to or greater than the upper limit, there is an advantage in achieving reduction in size of the entire optical system or obtaining a sufficient variable magnification ratio for the variable magnification optical system. In order to obtain more favorable characteristics, it is more preferable that the variable magnification optical system satisfies Conditional Expression (2-1), and it is yet more preferable that the variable magnification optical system satisfies Conditional Expression (2-2).

$$1 < (fw \times TLw)/ft^2 < 2 \tag{2}$$

$$1.1 < (fw \times TLw)/ft^2 < 1.85 \tag{2-1}$$

$$1.2 < (fw \times TLw)/ft^2 < 1.75 \tag{2-2}$$

In a case where the open F number in a state where the infinite distance object is in focus at the telephoto end is FNot, it is preferable that the variable magnification optical system satisfies Conditional Expression (3). ft/fw of Conditional Expression (3) is the maximum variable magnification ratio. By not allowing the corresponding value of Conditional Expression (3) to be equal to or less than the lower limit, there is an advantage in achieving reduction in size of the entire optical system or particularly in suppressing various aberrations at the telephoto end. By not allowing the corresponding value of Conditional Expression (3) to be equal to or greater than the upper limit, it is easy to obtain sufficient brightness at the telephoto end. In order to obtain more favorable characteristics, it is more preferable that the variable magnification optical system satisfies Conditional Expression (3-1), and it is yet more preferable that the variable magnification optical system satisfies Conditional Expression (3-2).

$$1.5 < FNot/(ft/fw) < 3 \tag{3}$$

$$1.7 < FNot/(ft/fw) < 2.9 \tag{3-1}$$

$$1.9 < FNot/(ft/fw) < 2.85 \tag{3-2}$$

Assuming that a focal length of the front group GF in a state where the infinite distance object is in focus at the wide angle end is fFw and a focal length of the middle group GM is fM, it is preferable that the variable magnification optical system satisfies Conditional Expression (4). By not allowing the corresponding value of Conditional Expression (4) to be equal to or less than the lower limit, the refractive power of the middle group GM is prevented from becoming excessively weak. As a result, there is an advantage particularly in correcting spherical aberration on the telephoto side. By not allowing the corresponding value of Conditional Expression (4) to be equal to or greater than the upper limit, the refractive power of the front group GF is prevented from becoming excessively weak. Therefore, it is easy to suppress an increase in size of the front group GF, and it is easy to suppress the amount of movement of the front group GF during magnification change in a case where the front group GF moves during magnification change. In order to obtain more favorable characteristics, it is more preferable that the variable magnification optical system satisfies Conditional Expression (4-1), and it is yet more preferable that the variable magnification optical system satisfies Conditional Expression (4-2).

$$0.1<(-fFw)/fM<1.6 \tag{4}$$

$$0.2<(-fFw)/fM<1.5 \tag{4-1}$$

$$0.25<(-fFw)/fM<1.45 \tag{4-2}$$

It is preferable that the variable magnification optical system satisfies Conditional Expression (5). By not allowing the corresponding value of Conditional Expression (5) to be equal to or less than the lower limit, the refractive power of the front group GF is prevented from becoming excessively strong. As a result, there is an advantage in suppressing fluctuation in aberrations during magnification change. By not allowing the corresponding value of Conditional Expression (5) to be equal to or greater than the upper limit, the refractive power of the front group GF is prevented from becoming excessively weak. Therefore, it is easy to suppress an increase in size of the front group GF, and it is easy to suppress the amount of movement of the front group GF during magnification change in a case where the front group GF moves during magnification change. In order to obtain more favorable characteristics, it is more preferable that the variable magnification optical system satisfies Conditional Expression (5-1), and it is yet more preferable that the variable magnification optical system satisfies Conditional Expression (5-2).

$$0.6<(-fFw)/(fw{\times}ft)^{1/2}<1.3 \tag{5}$$

$$0.65<(-fFw)/(fw{\times}ft)^{1/2}<1.25 \tag{5-1}$$

$$0.7<(-fFw)/(fw{\times}ft)^{1/2}<1.2 \tag{5-2}$$

It is preferable that the variable magnification optical system satisfies Conditional Expression (6). By not allowing the corresponding value of Conditional Expression (6) to be equal to or less than the lower limit, the refractive power of the middle group GM is not excessively strong. As a result, it is possible to suppress field curvature generated in the middle group GM, and there is an advantage in correcting aberrations during magnification change. By not allowing the corresponding value of Conditional Expression (6) to be equal to or greater than the upper limit, the refractive power of the middle group GM is prevented from becoming excessively weak. Therefore, it is possible to suppress the amount of movement of the middle group GM during magnification change. As a result, there is an advantage in achieving reduction in total length of the optical system. In order to obtain more favorable characteristics, it is more preferable that the variable magnification optical system satisfies Conditional Expression (6-1), and it is yet more preferable that the variable magnification optical system satisfies Conditional Expression (6-2).

$$0.65<fM/(fw{\times}ft)^{1/2}<3.7 \tag{6}$$

$$0.7<fM/(fw{\times}ft)^{1/2}<3.6 \tag{6-1}$$

$$0.75<fM/(fw{\times}ft)^{1/2}<3.5 \tag{6-2}$$

In a configuration in which the front group GF includes the first lens, assuming that a focal length of the first lens is fL1, it is preferable that the variable magnification optical system satisfies Conditional Expression (7). By not allowing the corresponding value of Conditional Expression (7) to be equal to or less than the lower limit, the refractive power of the first lens is prevented from becoming excessively strong. Therefore, it is easy to suppress high-order aberrations at the telephoto end. Alternatively, by not allowing the corresponding value of Conditional Expression (7) from being equal to or less than the lower limit, the refractive power of the front group GF is prevented from becoming excessively weak. Therefore, it is easy to suppress an increase in size of the front group GF. As a result, there is an advantage in achieving reduction in size of the front group GF. In the present specification, the term "higher-order aberration" means a fifth-order or higher-order aberration. By not allowing the corresponding value of Conditional Expression (7) to be equal to or greater than the upper limit, the refractive power of the front group GF is prevented from becoming excessively strong. As a result, there is an advantage in suppressing fluctuation in aberrations during magnification change. In order to obtain more favorable characteristics, it is more preferable that the variable magnification optical system satisfies Conditional Expression (7-1), and it is yet more preferable that the variable magnification optical system satisfies Conditional Expression (7-2).

$$1<fL1/fFw<3.5 \tag{7}$$

$$1.1<fL1/fFw<3.2 \tag{7-1}$$

$$1.2<fL1/fFw<3 \tag{7-2}$$

Assuming that an open F number in a state where the infinite distance object is in focus at the telephoto end is FNot, it is preferable that the variable magnification optical system satisfies Conditional Expression (8). By not allowing the corresponding value of Conditional Expression (8) to be equal to or less than the lower limit, there is an advantage in achieving high performance. By not allowing the corresponding value of Conditional Expression (8) to be equal to or greater than the upper limit, the refractive power of the front group GF is prevented from becoming excessively weak. Therefore, it is easy to suppress an increase in size of the front group GF. As a result, there is an advantage in achieving reduction in size of GF. In order to obtain more favorable characteristics, it is more preferable that the variable magnification optical system satisfies Conditional Expression (8-1), and it is yet more preferable that the variable magnification optical system satisfies Conditional Expression (8-2).

$$1.8<(-fFw)/(ft/F\mathrm{Not})<4 \tag{8}$$

$$2<(-fFw)/(ft/F\mathrm{Not})<3.2 \tag{8-1}$$

$$2.2<(-fFw)/(ft/F\mathrm{Not})<2.9 \tag{8-2}$$

In a configuration in which the front group GF includes the first lens, assuming that a center thickness of the first lens is D1, it is preferable that the variable magnification optical system satisfies Conditional Expression (9). By not allowing the corresponding value of Conditional Expression (9) to be equal to or less than the lower limit, it is easy to ensure the mechanical strength of the first lens. By not allowing the corresponding value of Conditional Expression (9) to be equal to or greater than the upper limit, there is an advantage in achieving reduction in weight of the first lens. In order to obtain more favorable characteristics, it is more preferable that the variable magnification optical system satisfies Conditional Expression (9-1), and it is yet more preferable that the variable magnification optical system satisfies Conditional Expression (9-2).

$$0.08<D1/(ft/F\mathrm{Not})<0.42 \tag{9}$$

$$0.09<D1/(ft/F\mathrm{Not})<0.41 \tag{9-1}$$

$$0.1<D1/(ft/F\mathrm{Not})<0.4 \tag{9-2}$$

Assuming that a maximum half angle of view in a state where the infinite distance object is in focus at the wide angle end is ωw and an open F number in a state where the infinite distance object is in focus at the wide angle end is FNow, it is preferable that the variable magnification optical system satisfies Conditional Expression (10). By not allowing the corresponding value of Conditional Expression (10) to be equal to or less than the lower limit, it is easy to reduce the open F number at the wide angle end while increasing the angle of view at the wide angle end. By not allowing the corresponding value of Conditional Expression (10) to be equal to or greater than the upper limit, it is easy to suppress an increase in number of lenses and suppress an increase in size of the optical system while obtaining favorable optical performance. In order to obtain more favorable characteristics, it is more preferable that the variable magnification optical system satisfies Conditional Expression (10-1), and it is yet more preferable that the variable magnification optical system satisfies Conditional Expression (10-2).

$$0.3 < \tan \omega w / FNow < 0.47 \tag{10}$$

$$0.31 < \tan \omega w / FNow < 0.45 \tag{10-1}$$

$$0.32 < \tan \omega w / FNow < 0.43 \tag{10-2}$$

Assuming that a lateral magnification of the middle group GM in a state where the infinite distance object is in focus at the wide angle end is $\beta Mw$ and a lateral magnification of the middle group GM in a state where the infinite distance object is in focus at the telephoto end is $\beta Mt$, it is preferable that the variable magnification optical system satisfies Conditional Expression (11). By not allowing the corresponding value of Conditional Expression (11) to be equal to or less than the lower limit, there is an advantage in achieving an increase in variable magnification ratio. By not allowing the corresponding value of Conditional Expression (11) to be equal to or greater than the upper limit, there is an advantage in suppressing fluctuation in aberrations during magnification change. In order to obtain more favorable characteristics, it is more preferable that the variable magnification optical system satisfies Conditional Expression (11-1), and it is yet more preferable that the variable magnification optical system satisfies Conditional Expression (11-2).

$$-4 < \beta Mt / \beta Mw < 3.5 \tag{11}$$

$$-3.5 < \beta Mt / \beta Mw < 3 \tag{11-1}$$

$$-3 < \beta Mt / \beta Mw < 2.5 \tag{11-2}$$

Assuming that a focal length of the rear group GR in a state where the infinite distance object is in focus at the wide angle end is fRw, it is preferable that the variable magnification optical system satisfies Conditional Expression (12). By not allowing the corresponding value of Conditional Expression (12) to be equal to or less than the lower limit, there is an advantage in suppressing various aberrations in the entire variable magnification range. By not allowing the corresponding value of Conditional Expression (12) to be equal to or greater than the upper limit, there is an advantage in suppressing the sensitivity to the error of the rear group GR. In order to obtain more favorable characteristics, it is more preferable that the variable magnification optical system satisfies Conditional Expression (12-1), and it is yet more preferable that the variable magnification optical system satisfies Conditional Expression (12-2).

$$0.15 < (fw \times ft)^{1/2} / |fRw| < 1.1 \tag{12}$$

$$0.2 < (fw \times ft)^{1/2} / |fRw| < 0.9 \tag{12-1}$$

$$0.25 < (fw \times ft)^{1/2} / |fRw| < 0.8 \tag{12-2}$$

Assuming that a lateral magnification of the lens group closest to the image side in the rear group GR in a state where the infinite distance object is in focus at the wide angle end is $\beta Rrw$, it is preferable that the variable magnification optical system satisfies Conditional Expression (13). By not allowing the corresponding value of Conditional Expression (13) to be equal to or less than the lower limit, there is an advantage in achieving an increase in variable magnification ratio. By not allowing the corresponding value of Conditional Expression (13) to be equal to or greater than the upper limit, there is an advantage in suppressing various aberrations in the entire variable magnification range. In order to obtain more favorable characteristics, it is more preferable that the variable magnification optical system satisfies Conditional Expression (13-1), and it is yet more preferable that the variable magnification optical system satisfies Conditional Expression (13-2).

$$-2 < \beta Rrw < 3 \tag{13}$$

$$-1 < \beta Rrw < 2.75 \tag{13-1}$$

$$-0.5 < \beta Rrw < 2.5 \tag{13-2}$$

Assuming that a distance on the optical axis from the lens surface closest to the object side in the front group GF to the aperture stop St in a state where the infinite distance object is in focus at the wide angle end is DDFSTw, it is preferable that the variable magnification optical system satisfies Conditional Expression (14). For example, FIG. 3 shows the distance DDFSTw defined described above for the variable magnification optical system of FIG. 1. By not allowing the corresponding value of Conditional Expression (14) to be equal to or less than the lower limit, the distance from the lens surface closest to the object side in the front group GF to the aperture stop St is prevented from being excessively shortened. Therefore, the movable range of the middle group GM is prevented from becoming excessively small. As a result, there is an advantage in achieving an increase in variable magnification ratio. Alternatively, by not allowing the corresponding value of Conditional Expression (14) to be equal to or less than the lower limit, the refractive power of the front group GF is prevented from becoming excessively weak. As a result, there is an advantage in achieving both reduction in size and an increase in variable magnification ratio. By not allowing the corresponding value of Conditional Expression (14) to be equal to or greater than the upper limit, the distance from the lens surface closest to the object side in the front group GF on the wide angle side to the position of the entrance pupil is prevented from becoming excessively long. Therefore, it is possible to suppress an increase in diameter of the group GF. As a result, it is easy to achieve reduction in size. Alternatively, by not allowing the corresponding value of Conditional Expression (14) to be equal to or greater than the upper limit, the refractive power of the front group GF is prevented from becoming excessively strong. As a result, there is an advantage in achieving high performance. In order to obtain more favorable characteristics, it is more preferable that the variable magnification optical system satisfies Conditional Expression (14-1), and it is yet more preferable that the variable magnification optical system satisfies Conditional Expression (14-2).

$$1.4 < DDFSTw / |fFw| < 4 \tag{14}$$

$$1.5 < DDFSTw / |fFw| < 3.75 \tag{14-1}$$

$$1.6 < DDFSTw / |fFw| < 3.5 \tag{14-2}$$

It is preferable that the variable magnification optical system satisfies Conditional Expression (15). Here, it is assumed that a distance on the optical axis from the lens surface closest to the object side in the front group GF in a state where the infinite distance object is in focus at the wide angle end to a paraxial entrance pupil position Pen is Enpw. For example, FIG. 3 shows the paraxial entrance pupil position Pen and the distance Enpw defined described above in a state where the infinite distance object is in focus at the wide angle end of the variable magnification optical system of FIG. 1. In the present specification, the sign of Enpw is negative in a case where the paraxial entrance pupil position Pen of the front group GF is closer to the object side than the lens surface closest to the object side, and is positive in a case where the paraxial entrance pupil position Pen is closer to the image side than the lens surface closest to the object side in the front group GF. By not allowing the corresponding value of Conditional Expression (15) to be equal to or less than the lower limit, the distance from the lens surface closest to the object side in the front group GF on the wide angle side to the paraxial entrance pupil position Pen is prevented from being excessively shortened. As a result, it is easy to suppress fluctuation in the aberration during magnification change. By not allowing the corresponding value of Conditional Expression (15) to be equal to or greater than the upper limit, the distance from the lens surface closest to the object side in the front group GF on the wide angle side to the paraxial entrance pupil position Pen is prevented from becoming excessively long. Therefore, it is possible to suppress an increase in diameter of the front group GF. As a result, it is easy to achieve reduction in size. In order to obtain more favorable characteristics, it is more preferable that the variable magnification optical system satisfies Conditional Expression (15-1), and it is yet more preferable that the variable magnification optical system satisfies Conditional Expression (15-2).

$$1.9 < Enpw/\{(fw \times \tan \omega w) \times \log(ft/fw)\} < 3.8 \tag{15}$$

$$2 < Enpw/\{(fw \times \tan \omega w) \times \log(ft/fw)\} < 3.5 \tag{15-1}$$

$$2.1 < Enpw/\{(fw \times \tan \omega w) \times \log(ft/fw)\} < 3.2 \tag{15-2}$$

It is preferable that the variable magnification optical system satisfies Conditional Expression (16). By not allowing the corresponding value of Conditional Expression (16) to be equal to or less than the lower limit, the distance from the lens surface closest to the object side in the front group GF on the wide angle side to the entrance pupil position is prevented from becoming excessively short. Therefore, it is easy to suppress fluctuation in aberrations during magnification change. By not allowing the corresponding value of Conditional Expression (16) to be equal to or greater than the upper limit, the distance from the lens surface closest to the object side in the front group GF on the wide angle side to the position of the entrance pupil is prevented from becoming excessively long. Therefore, it is possible to suppress an increase in diameter of the group GF. As a result, it is easy to achieve reduction in size. In order to obtain more favorable characteristics, it is more preferable that the variable magnification optical system satisfies Conditional Expression (16-1), and it is yet more preferable that the variable magnification optical system satisfies Conditional Expression (16-2).

$$5 < DDFSTw/\{(fw \times \tan \omega w) \times \log(ft/fw)\} < 10 \tag{16}$$

$$5.5 < DDFSTw/\{(fw \times \tan \omega w) \times \log(ft/fw)\} < 9 \tag{16-1}$$

$$6 < DDFSTw/\{(fw \times \tan \omega w) \times \log(ft/fw)\} < 8 \tag{16-2}$$

It is preferable that the variable magnification optical system satisfies Conditional Expression (17). By not allowing the corresponding value of Conditional Expression (17) to be equal to or less than the lower limit, the distance from the lens surface closest to the object side in the front group GF on the wide angle side to the paraxial entrance pupil position Pen is prevented from being excessively shortened. As a result, it is easy to suppress fluctuation in the aberration during magnification change. By not allowing the corresponding value of Conditional Expression (17) to be equal to or greater than the upper limit, the distance from the lens surface closest to the object side in the front group GF on the wide angle side to the paraxial entrance pupil position Pen is prevented from becoming excessively long. Therefore, it is possible to suppress an increase in diameter of the front group GF. As a result, it is easy to achieve reduction in size. In order to obtain more favorable characteristics, it is more preferable that the variable magnification optical system satisfies Conditional Expression (17-1), and it is yet more preferable that the variable magnification optical system satisfies Conditional Expression (17-2).

$$0.5 < Enpw/(fw \times ft)^{1/2} < 1.1 \tag{17}$$

$$0.55 < Enpw/(fw \times ft)^{1/2} < 1 \tag{17-1}$$

$$0.6 < Enpw/(fw \times ft)^{1/2} < 0.9 \tag{17-2}$$

It is preferable that the variable magnification optical system satisfies Conditional Expression (18). By not allowing the corresponding value of Conditional Expression (18) to be equal to or less than the lower limit, the distance from the lens surface closest to the object side in the front group GF on the wide angle side to the entrance pupil position is prevented from becoming excessively short. Therefore, it is easy to suppress fluctuation in aberrations during magnification change. By not allowing the corresponding value of Conditional Expression (18) to be equal to or greater than the upper limit, the distance from the lens surface closest to the object side in the front group GF on the wide angle side to the position of the entrance pupil is prevented from becoming excessively long. Therefore, it is possible to suppress an increase in diameter of the group GF. As a result, it is easy to achieve reduction in size. In order to obtain more favorable characteristics, it is more preferable that the variable magnification optical system satisfies Conditional Expression (18-1), and it is yet more preferable that the variable magnification optical system satisfies Conditional Expression (18-2).

$$0.3 < DDFSTw/TLw < 0.7 \tag{18}$$

$$0.38 < DDFSTw/TLw < 0.6 \tag{18-1}$$

$$0.43 < DDFSTw/TLw < 0.5 \tag{18-2}$$

Assuming that a back focal length in terms of the air-equivalent distance of the whole system in a state where the infinite distance object is in focus at the wide angle end is Bfw, it is preferable that the variable magnification optical system satisfies Conditional Expression (19). By not allowing the corresponding value of Conditional Expression (19) to be equal to or less than the lower limit, the back focal length Bfw defined described above is prevented from becoming excessively short. Therefore, the mount exchange mechanism can be easily attached. By not allowing the corresponding value of Conditional Expression (19) to be equal to or greater than the upper limit, the back focal length Bfw defined described above is prevented from becoming excessively long. Therefore, it is easy to achieve reduction in size. In order to obtain more favorable characteristics, it is more preferable that the variable magnification optical system satisfies Conditional Expression (19-1), and it is yet more preferable that the variable magnification optical system satisfies Conditional Expression (19-2).

$$0.08<Bfw/TLw<0.27 \tag{19}$$

$$0.1<Bfw/TLw<0.25 \tag{19-1}$$

$$0.12<Bfw/TLw<0.22 \tag{19-2}$$

It is preferable that the variable magnification optical system satisfies Conditional Expression (20). Here, it is assumed that a sum of the back focal length Bfw in terms of the air-equivalent distance of the whole system and a distance on the optical axis from a paraxial exit pupil position Pex to the lens surface closest to the image side in the rear group GR in a state where the infinite distance object is in focus at the wide angle end is Expw. For example, FIG. 3 shows the paraxial exit pupil position Pex and the distance Expw defined described above in a state where the infinite distance object is in focus at the wide angle end of the variable magnification optical system of FIG. 1. In the present specification, the reference sign of Expw is positive in a case where the paraxial exit pupil position Pex is closer to the object side than the image plane Sim, and is negative in a case where the paraxial exit pupil position Pex is closer to the image side than the image plane Sim. By not allowing the corresponding value of Conditional Expression (20) to be equal to or less than the lower limit, the total length of the optical system can be easily shortened. As a result, there is an advantage in achieving reduction in size. By not allowing the corresponding value of Conditional Expression (20) to be equal to or greater than the upper limit, it is easy to reduce the angle of incidence of the off-axis principal ray to the image plane Sim. As a result, there is an advantage in ensuring the amount of ambient light. In order to obtain more favorable characteristics, it is more preferable that the variable magnification optical system satisfies Conditional Expression (20-1), and it is yet more preferable that the variable magnification optical system satisfies Conditional Expression (20-2).

$$0.28<fw/Expw<0.65 \tag{20}$$

$$0.3<fw/Expw<0.6 \tag{20-1}$$

$$0.32<fw/Expw<0.58 \tag{20-2}$$

In the configuration in which the front group GF includes the first lens, assuming that a curvature radius of the object side surface of the first lens is Rf and a curvature radius of the image side surface of the first lens is Rr, it is preferable that the variable magnification optical system satisfies Conditional Expression (21). By not allowing the corresponding value of Conditional Expression (21) to be equal to or less than the lower limit, it is easy to correct particularly astigmatism on the telephoto side. By not allowing the corresponding value of Conditional Expression (21) to be equal to or greater than the upper limit, the refractive power of the first lens is prevented from becoming excessively weak. Therefore, it is easy to achieve an increase in angle of view. In order to obtain more favorable characteristics, it is more preferable that the variable magnification optical system satisfies Conditional Expression (21-1), and it is yet more preferable that the variable magnification optical system satisfies Conditional Expression (21-2).

$$1.5<(Rf+Rr)/(Rf-Rr)<4.2 \tag{21}$$

$$1.6<(Rf+Rr)/(Rf-Rr)<4.1 \tag{21-1}$$

$$1.7<(Rf+Rr)/(Rf-Rr)<4 \tag{21-2}$$

Assuming that an average value of the Abbe number of all the positive lenses of the rear group GR based on the d line is vRpave, it is preferable that the variable magnification optical system satisfies Conditional Expression (22). By not allowing the corresponding value of Conditional Expression (22) to be equal to or less than the lower limit, there is an advantage particularly in correcting longitudinal chromatic aberration at the telephoto end. By not allowing the corresponding value of Conditional Expression (22) to be equal to or greater than the upper limit, there is an advantage in correcting various aberrations other than chromatic aberration. In order to obtain more favorable characteristics, it is more preferable that the variable magnification optical system satisfies Conditional Expression (22-1), and it is yet more preferable that the variable magnification optical system satisfies Conditional Expression (22-2).

$$40<vRpave<90 \tag{22}$$

$$45<vRpave<86 \tag{22-1}$$

$$50<vRpave<82 \tag{22-2}$$

Assuming that a difference in the optical axis direction between a position of the middle group GM in a state where the infinite distance object is in focus at the wide angle end and a position of the middle group GM in the state where the infinite distance object is in focus at the telephoto end in the optical axis direction is DMwt, it is preferable that the variable magnification optical system satisfies Conditional Expression (23). For example, FIG. 2 shows the difference DMwt defined described above for the variable magnification optical system of FIG. 1. The sign of DMwt is positive in a case where the position of the middle group GM in a state where the infinite distance object is in focus at the telephoto end is closer to the image side than the position of the middle group GM in a state where the infinite distance object is in focus at the wide angle end. The sign thereof is negative in a case where the position of the middle group GM in a state where the infinite distance object is in focus at the telephoto end is closer to the object side than the position of the middle group GM in a state where the infinite distance object is in focus at the wide angle end. The unit of DMwt is millimeter. By not allowing the corresponding value of Conditional Expression (23) to be equal to or less than the lower limit, it is possible to suppress the amount of movement of the middle group GM during magnification change. As a result, there is an advantage in achieving reduction in size of the optical system. By not allowing the corresponding value of Conditional Expression (23) to be equal to or greater than the upper limit, there is an advantage in suppressing fluctuation in aberrations during magnification change. In order to obtain more favorable characteristics, it is more preferable that the variable magnification optical system satisfies Conditional Expression (23-1), and it is yet more preferable that the variable magnification optical system satisfies Conditional Expression (23-2).

$$-0.2<(ft/fw)/DMwt<-0.04 \tag{23}$$

$$-0.19<(ft/fw)/DMwt<-0.05 \tag{23-1}$$

$$-0.18<(ft/fw)/DMwt<-0.06 \tag{23-1}$$

In a configuration in which the front group GF includes at least three negative lenses including the first lens, assuming that a refractive index of the first lens at the d line is NL1 and a refractive index of a negative lens, which is second from the object side, at the d line among the negative lenses in the front group is NLn2, it is preferable that the variable magnification optical system satisfies Conditional Expression (24). By not allowing the corresponding value of Conditional Expression (24) to be less than or equal to the lower limit, it is easy to suitably ensure the refractive power of the front group GF. As a result, there is an advantage in suppressing distortion at the wide angle end while shortening the focal length of the variable magnification optical system at the wide angle end. By not allowing the corresponding value of Conditional Expression (24) to be equal to or greater than the upper limit, it is possible to suppress weighting of the first lens and the negative lens which is second from the object side in the front group. In order to obtain more favorable characteristics, it is more preferable that the variable magnification optical system satisfies Conditional Expression (24-1), and it is yet more preferable that the variable magnification optical system satisfies Conditional Expression (24-2).

$$1.58 < (NL1 + NLn2)/2 < 2.2 \tag{24}$$

$$1.62 < (NL1 + NLn2)/2 < 2.15 \tag{24-1}$$

$$1.7 < (NL1 + NLn2)/2 < 2.1 \tag{24-2}$$

It is preferable that an image side surface of a lens having the strongest positive refractive power in the rear group is a convex surface. In such a case, there is an advantage in correcting spherical aberration in the entire variable magnification range. It is preferable that the lens having the strongest positive refractive power in the rear group is a biconvex lens. In such a case, there is an advantage particularly in correcting spherical aberration at the telephoto end.

In a configuration in which the image side surface of the lens having the strongest positive refractive power in the rear group is a convex surface, assuming that a focal length of the lens having the strongest positive refractive power in the rear group is fRLp, it is preferable that the variable magnification optical system satisfies Conditional Expression (25). By not allowing the corresponding value of Conditional Expression (25) to be equal to or less than the lower limit, there is an advantage particularly in correcting spherical aberration at the telephoto end. By not allowing the corresponding value of Conditional Expression (25) to be equal to or greater than the upper limit, it is easy to reduce, particularly, the angle of incidence of the off-axis principal ray to the image plane Sim at the wide angle end. As a result, there is an advantage in ensuring the amount of ambient light. In order to obtain more favorable characteristics, it is more preferable that the variable magnification optical system satisfies Conditional Expression (25-1), and it is yet more preferable that the variable magnification optical system satisfies Conditional Expression (25-2).

$$-10 < fRw/fRLp < 5 \tag{25}$$

$$-9.5 < fRw/fRLp < 4.5 \tag{25-1}$$

$$-9 < fRw/fRLp < 4 \tag{25-2}$$

Assuming that an effective diameter of the lens surface closest to the object side in the front group GF is EDf and an effective diameter of the lens surface closest to the image side in the rear group GR is EDr, it is preferable that the variable magnification optical system satisfies Conditional Expression (26). In general, in order to reduce the diameter of the lens closest to the object side, in a case where the refractive power of the front group GF is increased and the refractive power of the front group GF is increased, fluctuation in aberrations during magnification change tends to be large. Under such circumstances, by not allowing the corresponding value of Conditional Expression (26) from being equal to or less than the lower limit, the diameter of the lens closest to the object side is prevented from becoming excessively small. As a result, there is an advantage in suppressing fluctuation in aberrations during magnification change. Alternatively, by not allowing the corresponding value of Conditional Expression (26) to be equal to or less than the lower limit, the diameter of the lens closest to the object side is prevented from becoming excessively small. As a result, there is an advantage in ensuring the ambient light amount ratio of the maximum image height. By not allowing the corresponding value of Conditional Expression (26) to be equal to or greater than the upper limit, it is possible to suppress an increase in diameter of the lens closest to the object side. Therefore, it is easy to achieve reduction in size. In order to obtain more favorable characteristics, it is more preferable that the variable magnification optical system satisfies Conditional Expression (26-1), and it is yet more preferable that the variable magnification optical system satisfies Conditional Expression (26-2).

$$1.1 < EDf/EDr < 2.1 \tag{26}$$

$$1.2 < EDf/EDr < 2 \tag{26-1}$$

$$1.3 < EDf/EDr < 1.9 \tag{26-2}$$

In the specification, twice the distance to the optical axis Z from the intersection between the lens surface and the ray passing through the outermost side among rays incident onto the lens surface from the object side and emitted to the image side is the "effective diameter" of the lens surface. The "outside" here is the radial outside centered on the optical axis Z, that is, the side separated from the optical axis Z. It should be noted that the "ray passing through the outermost side" is determined in consideration of the entire variable magnification range.

Figure 4:
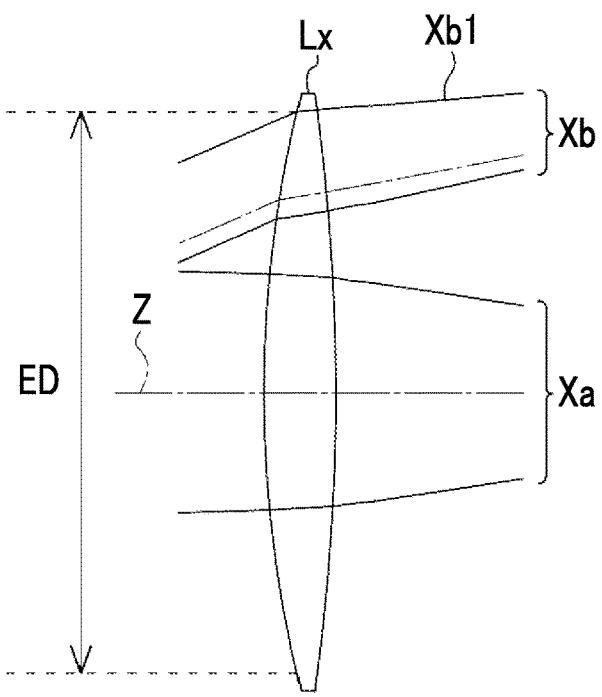
FIG. 4 is a diagram for explaining an effective diameter.

As an explanatory diagram, FIG. 4 shows an example of an effective diameter ED. In FIG. 4, the left side is the object side, and the right side is the image side. FIG. 4 shows an on-axis luminous flux Xa and an off-axis luminous flux Xb passing through the lens Lx. In the example of FIG. 4, a ray Xb1, which is the upper ray of the off-axis luminous flux Xb, is the ray passing through the outermost side. Therefore, in the example of FIG. 4, twice the distance to the optical axis Z from the intersection between the ray Xb1 and the object side surface of the lens Lx is the effective diameter ED of the object side surface of the lens Lx. In FIG. 4, the upper ray of the off-axis luminous flux Xb is the ray passing through the outermost side, but which ray is the ray passing through the outermost side depends on the optical system.

It is preferable that the variable magnification optical system satisfies Conditional Expression (27). By not allowing the corresponding value of Conditional Expression (27) to be equal to or less than the lower limit, it is possible to suppress an increase in total length of the optical system. Therefore, it is easy to achieve reduction in size thereof in the optical axis direction. By not allowing the corresponding value of Conditional Expression (27) to be equal to or greater than the upper limit, it is possible to suppress an increase in diameter of the lens closest to the object side. Therefore, it is easy to achieve reduction in size in the radial direction. In order to obtain more favorable characteristics, it is more preferable that the variable magnification optical system satisfies Conditional Expression (27-1), and it is yet more preferable that the variable magnification optical system satisfies Conditional Expression (27-2).

$$0.2 < EDf/TLw < 0.45 \tag{27}$$

$$0.25 < EDf/TLw < 0.41 \tag{27-1}$$

$$0.3 < EDf/TLw < 0.375 \tag{27-2}$$

In a configuration in which the front group GF includes at least three negative lenses, assuming that an Abbe number of the negative lens which is third from the object side based on the d line among the negative lenses in the front group is vLn3, it is preferable that the variable magnification optical system satisfies Conditional Expression (28). By not allowing the corresponding value of Conditional Expression (28) to be equal to or less than the lower limit, it is possible to suppress excessive correction of longitudinal chromatic aberration at the telephoto end. By not allowing the corresponding value of Conditional Expression (28) to be equal to or greater than the upper limit, it is possible to suppress insufficient correction of longitudinal chromatic aberration at the telephoto end. In order to obtain more favorable characteristics, it is more preferable that the variable magnification optical system satisfies Conditional Expression (28-1), and it is yet more preferable that the variable magnification optical system satisfies Conditional Expression (28-2).

$$50 < vLn3 < 95 \tag{28}$$

$$55 < vLn3 < 91 \tag{28-1}$$

$$60 < vLn3 < 87 \tag{28-2}$$

The above-mentioned preferred configurations and available configurations may be optional combinations, and it is preferable to selectively adopt the configurations in accordance with required specification. It should be noted that Conditional Expressions that the variable magnification optical system according to the embodiment of the present disclosure preferably satisfies are not limited to Conditional Expressions described in the form of Expression, and the lower limit and the upper limit are selected from the preferable and more preferable, more preferable, and yet more preferable conditional expressions. Conditional Expressions may include all conditional expressions obtained through optional combinations.

For example, the variable magnification optical system according to a preferred aspect of the present disclosure consists of, in order from the object side to the image side: a front group GF; a middle group GM; and a rear group GR. The front group GF consists of two or fewer lens groups and has a negative refractive power as a whole throughout an entire variable magnification range. The middle group GM includes only one lens group that has a positive refractive power as a lens group. The rear group GR consists of three or less lens groups. An aperture stop St is disposed between a lens surface closest to the image side in the front group GF and a lens surface closest to the object side in the rear group GR. During magnification change, a spacing between the front group GF and the middle group GM changes, and a spacing between the middle group GM and the rear group GR changes. In a case where the front group GF consists of two lens groups, a spacing between adjacent lens groups in the front group changes during magnification change. In a case where the rear group GR consists of a plurality of lens groups, all spacings between adjacent lens groups in the rear group change during magnification change. The front group GF includes at least three negative lenses and at least one positive lens. A first lens that has a negative refractive power and has a meniscus shape convex toward the object side is disposed closest to the object side in the front group GF. The variable magnification optical system satisfies Conditional Expressions (1) and (2).

Next, examples of the variable magnification optical system according to the embodiment of the present disclosure will be described, with reference to the drawings. The reference numerals attached to the lenses in the cross-sectional views of each example are used independently for each example in order to avoid complication of description and drawings due to an increase in number of digits of the reference numerals. Accordingly, even in a case where common reference numerals are attached in the drawings of different examples, constituent elements do not necessarily have a common configuration.

Example 1

The configuration and movement directions of the variable magnification optical system according to Example 1 are shown in FIG. 1, and the illustration method and configuration thereof are as described above, and thus, repeated description will be partially omitted. The variable magnification optical system of Example 1 consists of, in order from the object side to the image side, a first lens group G1 that has a positive refractive power, a second lens group G2 that has a negative refractive power, and a third lens group G3 that has a positive refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of five lenses L31 to L35, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3. The focusing group consists of two lenses L31 and L32. During focusing from the infinite distance object to the short range object, the focusing group moves toward the object side.

Table 1 shows basic lens data, Table 2 shows specifications and variable surface spacings, and Table 3 shows aspherical coefficients of the variable magnification optical system of Example 1. The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line. The column of ED shows effective diameters of the lens surface closest to the object side and the lens surface closest to the image side.

In the table of basic lens data, the sign of the curvature radius of the surface having a shape convex toward the object side is positive and the sign of the curvature radius of the surface having a shape convex toward the image side is negative. In a cell of a surface number of a surface corresponding to the aperture stop St, the surface number and a term of (St) are noted. A value at the bottom cell of the column of D in the table indicates a spacing between the image plane Sim and the surface closest to the image side in the table. Regarding the variable surface spacing, the symbol DD[ ] is used during magnification change, and the object side surface number of the spacing is given in H and is noted in the column of D.

Table 2 shows the variable magnification ratio Zr, the focal length f, the back focal length Bf at the air-equivalent distance, the open F number FNo., the maximum total angle of view 2ω, and the variable surface spacing during magnification change, based on the d line. In a case where the variable magnification optical system is a zoom lens, the variable magnification ratio is synonymous with the zoom magnification. [°] in the cells of 2ω indicates that the unit thereof is a degree. In Table 2, the values in the wide angle end state, the middle focal length state, and the telephoto end state are shown in the columns labeled with "Wide", "Middle", and "Tele", respectively.

In basic lens data, a reference sign * is attached to surface numbers of aspherical surfaces, and numerical values of the paraxial curvature radius are written into the cells of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, on the third surface of Example 1, m=4, 6, 8, 10, and 12. The "E±n" (n: an integer) in numerical values of the aspherical coefficients of Table 3 indicates "×10^{±n}". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

Further, in the basic lens data, a reference sign  is attached to the surface numbers of the aspherical surfaces of the composite aspherical lens, among the aspherical surfaces. For example, in Example 1, the lens L33 is a composite aspherical lens, and a reference sign  is attached to the surface numbers of the nineteenth surfaces of Table 1 corresponding to the aspherical surface of the lens L33.

In the data of each table, degrees are used as a unit of an angle, and millimeters are used as a unit of a length, but appropriate different units may be used since the optical system can be used even in a case where the system is enlarged or reduced in proportion. Each of the following tables shows numerical values rounded off to predetermined decimal places.

TABLE 1

| Example 1 | | | | | |
| --- | --- | --- | --- | --- | --- |
| Sn | R | D | Nd | vd | ED |
| 1 | 41.0233 | 1.0623 | 1.88441 | 40.42 | 38.00 |
| 2 | 17.8415 | 1.4245 | | | |
| *3 | 22.9826 | 1.7500 | 1.80625 | 40.91 | |
| *4 | 14.9108 | 10.5874 | | | |
| 5 | −39.7845 | 0.7027 | 1.45860 | 90.19 | |
| 6 | 33.5287 | 0.1066 | | | |
| 7 | 27.7532 | 4.8267 | 1.71736 | 29.52 | |
| 8 | −186.9845 | DD[8] | | | |
| 9 | 27.0743 | 2.2501 | 1.99605 | 20.23 | |
| 10 | 64.1320 | 1.9906 | | | |
| 11 | 36.1247 | 0.7998 | 1.90478 | 22.45 | |
| 12 | 11.2002 | 4.5098 | 1.54565 | 51.10 | |
| 13 | 195.7588 | 1.0000 | | | |
| 14(St) | ∞ | DD[14] | | | |
| *15 | 16.2297 | 5.5002 | 1.43875 | 94.66 | |
| *16 | −24.1093 | 0.1000 | | | |
| 17 | 20.1676 | 1.1769 | 1.48749 | 70.24 | |
| 18 | 13.9556 | 2.1879 | | | |
| **19 | 53.5889 | 0.2000 | 1.51460 | 49.96 | |
| 20 | 61.4138 | 0.9000 | 1.68675 | 50.40 | |
| 21 | 12.6841 | 4.9980 | 1.51742 | 52.43 | |
| 22 | −86.3070 | 9.2550 | | | |
| *23 | −16.8768 | 1.9502 | 1.92501 | 35.50 | |
| *24 | −32.8976 | DD[24] | | | 24.1467 |

TABLE 2

| Example 1 | | | |
| --- | --- | --- | --- |
| | Wide | Middle | Tele |
| Zr | 1.0 | 1.5 | 1.7 |
| f | 17.48 | 25.82 | 30.06 |
| Bf | 13.07 | 20.84 | 24.81 |
| FNo. | 4.09 | 4.10 | 4.10 |
| 2ω[°] | 110.6 | 81.6 | 72.2 |
| DD[8] | 15.23 | 3.56 | 0.09 |
| DD[14] | 9.52 | 9.68 | 9.77 |
| DD[24] | 13.07 | 20.84 | 24.81 |

TABLE 3

| Example 1 | | | | |
| --- | --- | --- | --- | --- |
| Sn | 3 | 4 | 15 | 16 |
| KA | 8.1210723E−01 | −1.1004635E−01 | 1.0000000E+00 | 1.0000000E+00 |
| A4 | 5.6326887E−05 | 9.3327152E−05 | −3.8668178E−05 | 4.6466233E−06 |
| A6 | −1.3252970E−07 | −5.7215188E−10 | 2.4643779E−08 | −3.2429784E−08 |
| A8 | 1.1471431E−10 | −7.9157634E−10 | −2.3739181E−10 | 2.0813625E−09 |
| A10 | 1.3529944E−13 | 4.0476606E−12 | −1.4787345E−11 | −3.7711548E−11 |
| A12 | −1.6653574E−15 | −1.4423747E−14 | 2.1218887E−13 | 3.4467795E−13 |
| Sn | 19 | 23 | 24 | |
| KA | 3.5711921E+00 | 2.3294658E+00 | 4.8543293E+00 | |
| A4 | 5.9041699E−06 | −8.8322590E−05 | −7.5821321E−05 | |
| A6 | −4.1255842E−08 | 7.9002297E−07 | 6.8608059E−07 | |
| A8 | −4.9562162E−10 | −4.2810735E−09 | −4.4564993E−09 | |
| A10 | 6.5518462E−12 | 2.1481406E−11 | 1.8141456E−11 | |
| A12 | −1.7390167E−14 | −4.6489862E−14 | −4.3046668E−14 | |

Figure 5:
FIG. 5 is a diagram of aberrations of the variable magnification optical system of Example 1.

FIG. 5 shows a diagram of aberrations of the variable magnification optical system of Example 1 in a state where the infinite distance object is in focus. FIG. 5 shows, in order from the left, spherical aberration, astigmatism, distortion, and lateral chromatic aberration. In FIG. 5, the upper part labeled "Wide" shows aberrations in the wide angle end state, the middle part labeled "Middle" shows aberrations in the middle focal length state, and the lower part labeled "Tele" shows aberrations in the telephoto end state. In the spherical aberration diagram, aberrations at the d line, the F line, and the C line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, aberrations at the F line, and the C line are respectively indicated by the long broken line, and the short broken line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are basically similar to those in the following examples unless otherwise specified. Therefore, in the following description, repeated description will not be given.

Example 2

Figure 6:
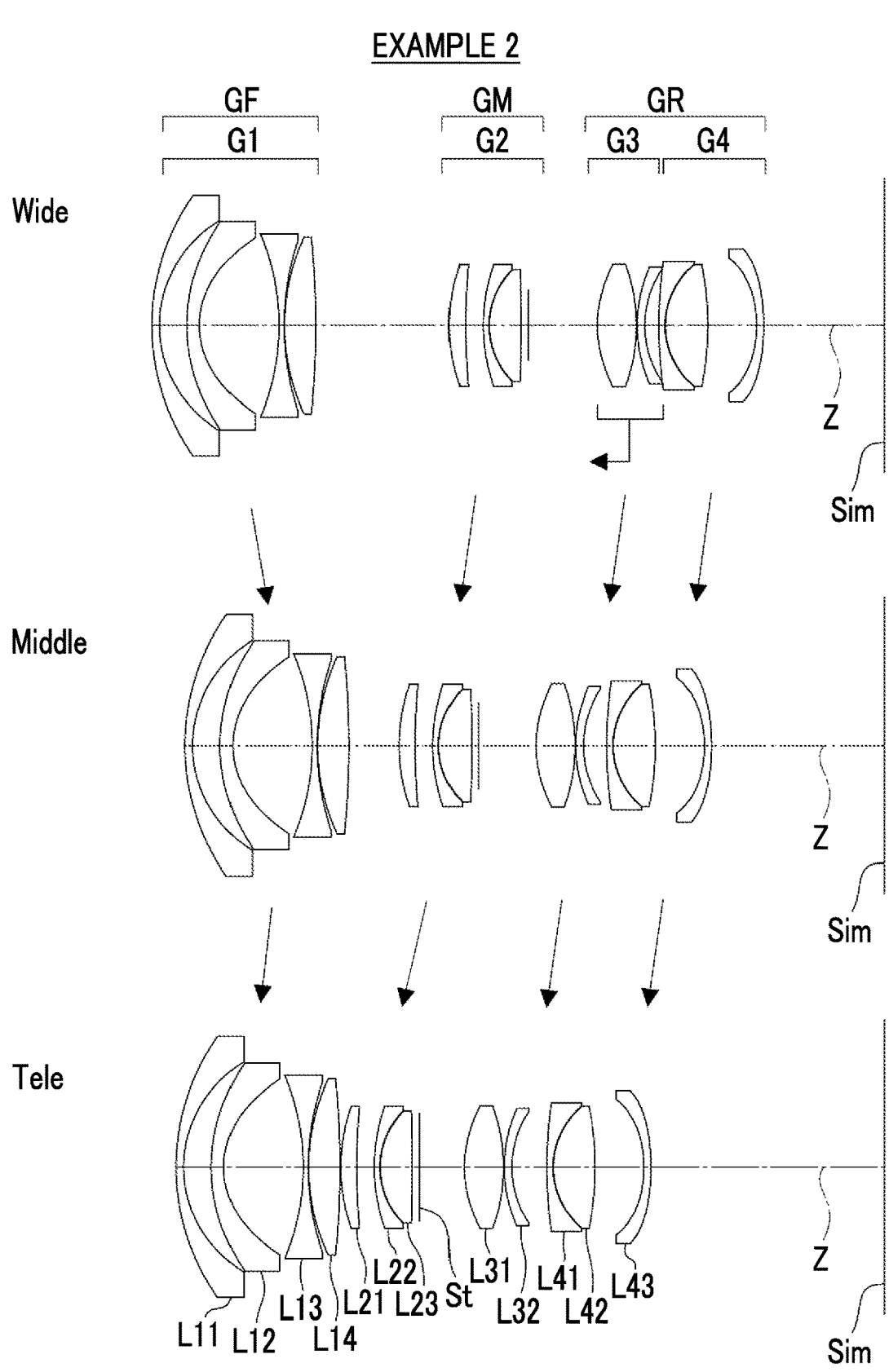
FIG. 6 is a cross-sectional view showing a configuration of a variable magnification optical system of Example 2 and is a diagram showing movement directions.

FIG. 6 shows a configuration and movement directions of the variable magnification optical system of Example 2. The variable magnification optical system of Example 2 consists of, in order from the object side to the image side, a first lens group G1 that has a negative refractive power, a second lens group G2 that has a positive refractive power, a third lens group G3 that has a positive refractive power, and a fourth lens group G4 that has a negative refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of three lenses L41 to L43, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3 and the fourth lens group G4. The focusing group consists of the third lens group G3. During focusing from the infinite distance object to the short range object, the focusing group moves toward the object side.

Figure 7:
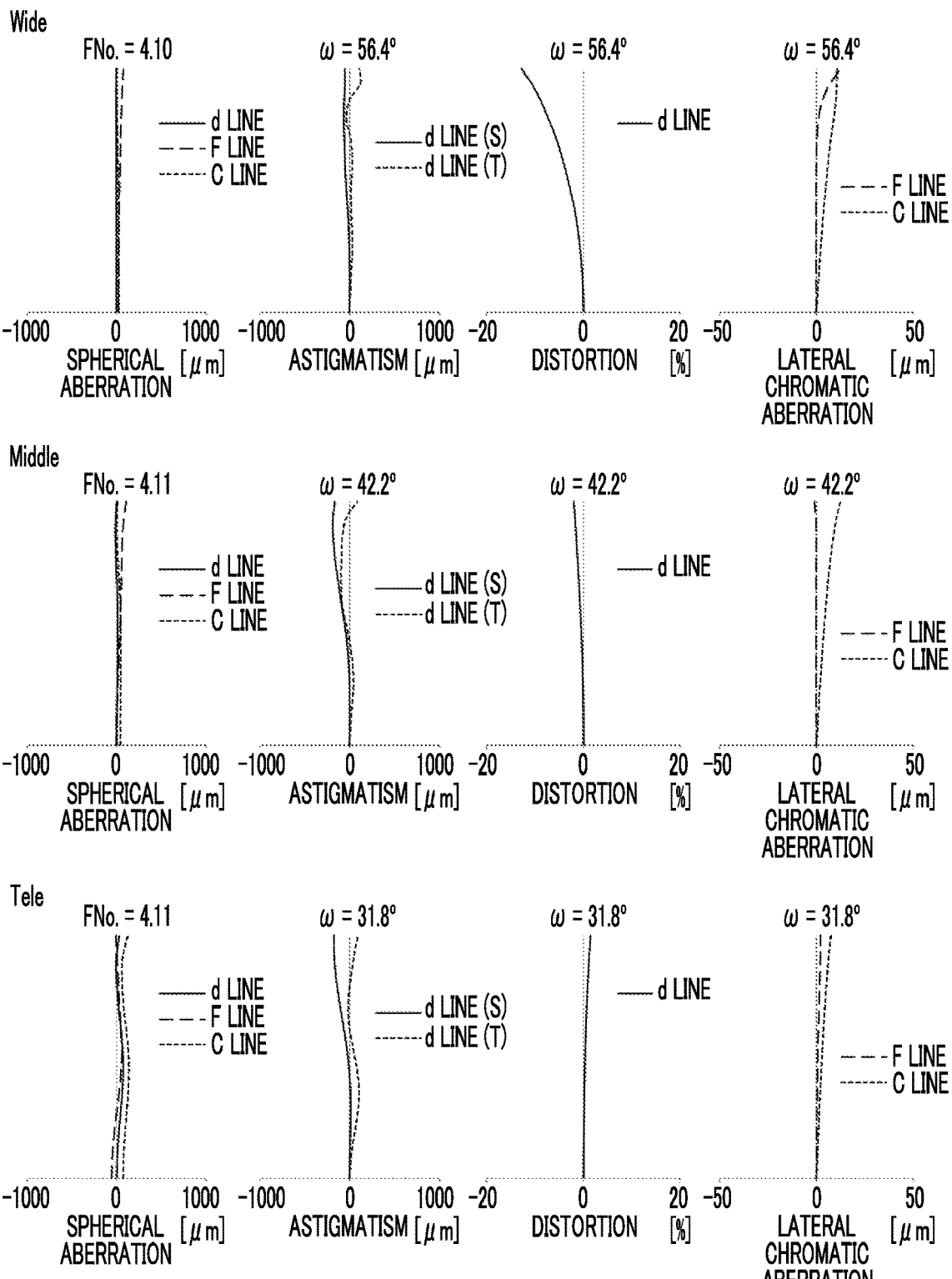
FIG. 7 is a diagram of aberrations of a variable magnification optical system of Example 2.

Regarding the variable magnification optical system of Example 2, Table 4 shows basic lens data, Table 5 shows specifications and variable surface spacings, and Table 6 shows aspherical coefficients thereof. FIG. 7 shows aberration diagrams.

TABLE 4

| | | Example 2 | | | |
|---|---|---|---|---|---|
| Sn | R | D | Nd | vd | ED |
| 1 | 34.7337 | 1.0624 | 1.83971 | 45.00 | 38.4948 |
| 2 | 18.4957 | 3.8661 | | | |
| *3 | 27.7795 | 1.7498 | 1.80625 | 40.91 | |
| *4 | 13.0989 | 11.1582 | | | |
| 5 | −36.1401 | 0.6998 | 1.45860 | 90.19 | |
| 6 | 41.1735 | 0.0440 | | | |
| 7 | 32.1481 | 4.4110 | 1.71736 | 29.52 | |
| 8 | −136.7313 | DD[8] | | | |
| 9 | 27.8906 | 2.2498 | 1.89795 | 20.21 | |
| 10 | 102.2212 | 2.4730 | | | |
| 11 | 28.6480 | 0.8001 | 1.99755 | 22.73 | |
| 12 | 12.0883 | 4.5098 | 1.52048 | 76.00 | |
| 13 | −357.2532 | 0.9999 | | | |
| 14(St) | ∞ | DD[14] | | | |
| *15 | 18.4859 | 5.4999 | 1.43875 | 94.66 | |
| *16 | −28.4815 | 0.1000 | | | |
| 17 | 22.1654 | 1.0799 | 1.48749 | 70.24 | |
| 18 | 15.5775 | DD[18] | | | |
| 19 | 70.0908 | 0.9000 | 1.80682 | 48.36 | |
| 20 | 12.1336 | 5.9324 | 1.51742 | 52.43 | |
| 21 | −47.5221 | 6.8559 | | | |
| *22 | −18.6937 | 0.9998 | 1.76450 | 49.10 | |
| *23 | −34.8873 | DD[23] | | | 22.6144 |

TABLE 5

| | Example 2 | | |
|---|---|---|---|
| | Wide | Middle | Tele |
| Zr | 1.0 | 1.5 | 2.1 |
| f | 16.48 | 24.34 | 34.36 |
| Bf | 16.92 | 24.25 | 32.71 |
| FNo. | 4.11 | 4.11 | 4.10 |
| 2ω[°] | 112.8 | 84.4 | 63.6 |
| DD[8] | 18.66 | 7.05 | 0.10 |
| DD[14] | 9.75 | 8.05 | 6.19 |
| DD[18] | 1.97 | 3.30 | 4.91 |
| DD[23] | 16.92 | 24.25 | 32.71 |

TABLE 6

| | Example 2 | | |
|---|---|---|---|
| Sn | 3 | 4 | 15 |
| KA | 9.6091432E−01 | −7.7920273E−01 | 1.0000000E+00 |
| A4 | 8.8551726E−06 | 8.8118018E−05 | −2.1597318E−05 |
| A6 | −4.0532208E−08 | −7.2398157E−08 | −8.6133358E−08 |
| A8 | 1.3746027E−10 | 5.6229935E−10 | 1.3655419E−09 |
| A10 | −5.3929845E−13 | −1.9491933E−12 | −2.6126294E−11 |
| A12 | 5.7314038E−16 | −1.6758157E−15 | 1.6113117E−13 |
| Sn | 16 | 22 | 23 |
| KA | 1.0000000E+00 | 2.6234001E+00 | −6.1317456E+00 |
| A4 | −7.5771434E−06 | −3.1627312E−05 | −6.5462222E−05 |
| A6 | −1.4153489E−07 | 4.3166744E−07 | 1.8282822E−07 |
| A8 | 3.1031103E−09 | −8.4541440E−09 | −3.4666022E−09 |
| A10 | −4.2922173E−11 | 8.0208311E−11 | 1.9771862E−11 |
| A12 | 2.3260708E−13 | −3.9191588E−13 | −7.9951929E−14 |

Example 3

Figure 8:
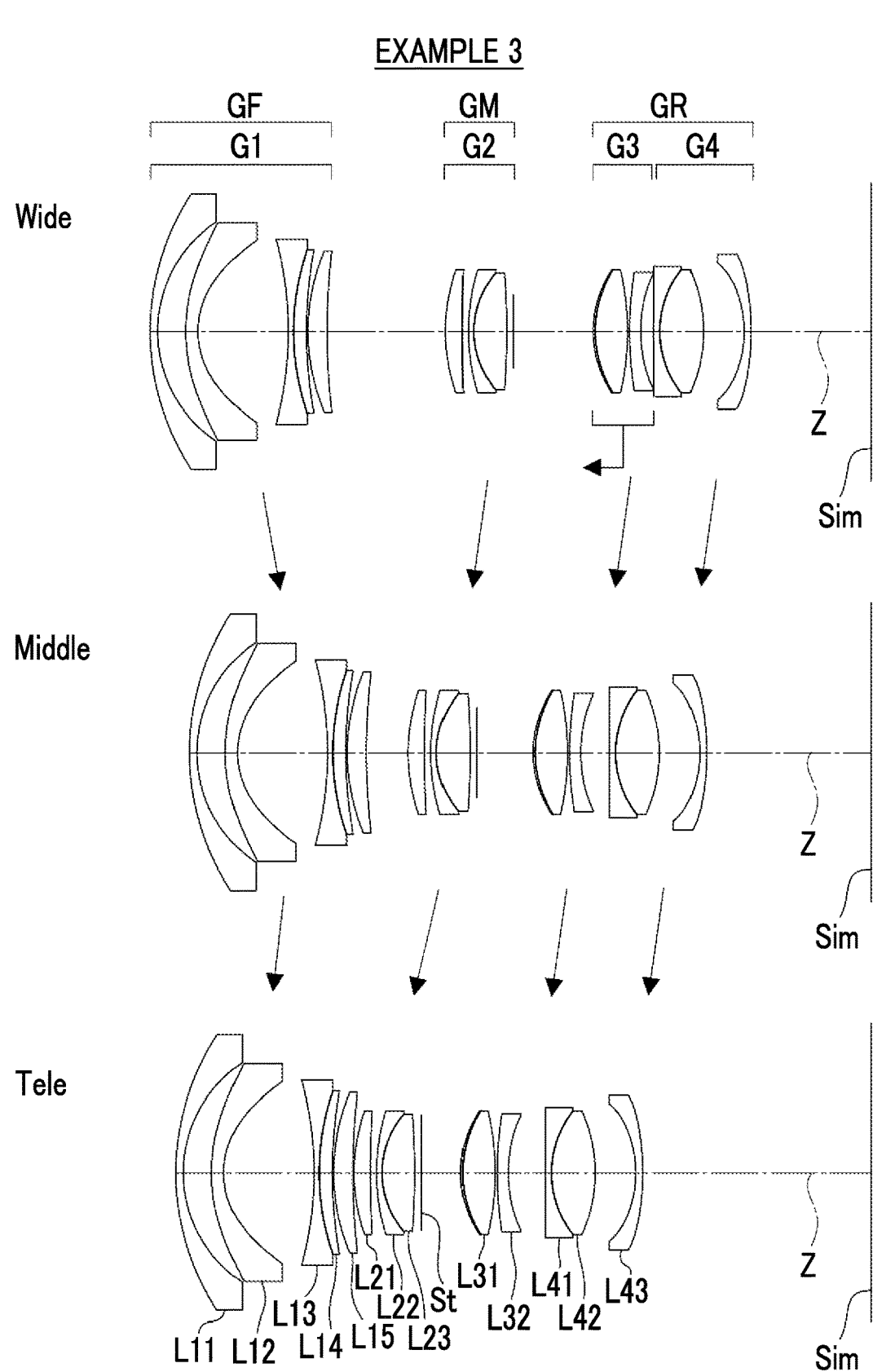
FIG. 8 is a cross-sectional view showing a configuration of a variable magnification optical system of Example 3 and is a diagram showing movement directions.

FIG. 8 shows a configuration and movement directions of the variable magnification optical system of Example 3. The variable magnification optical system of Example 3 consists of, in order from the object side to the image side, a first lens group G1 that has a negative refractive power, a second lens group G2 that has a positive refractive power, a third lens group G3 that has a positive refractive power, and a fourth lens group G4 that has a negative refractive power. The first lens group G1 consists of five lenses L11 to L15, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of three lenses L41 to L43, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3 and the fourth lens group G4. The focusing group consists of the third lens group G3. During focusing from the infinite distance object to the short range object, the focusing group moves toward the object side.

Figure 9:
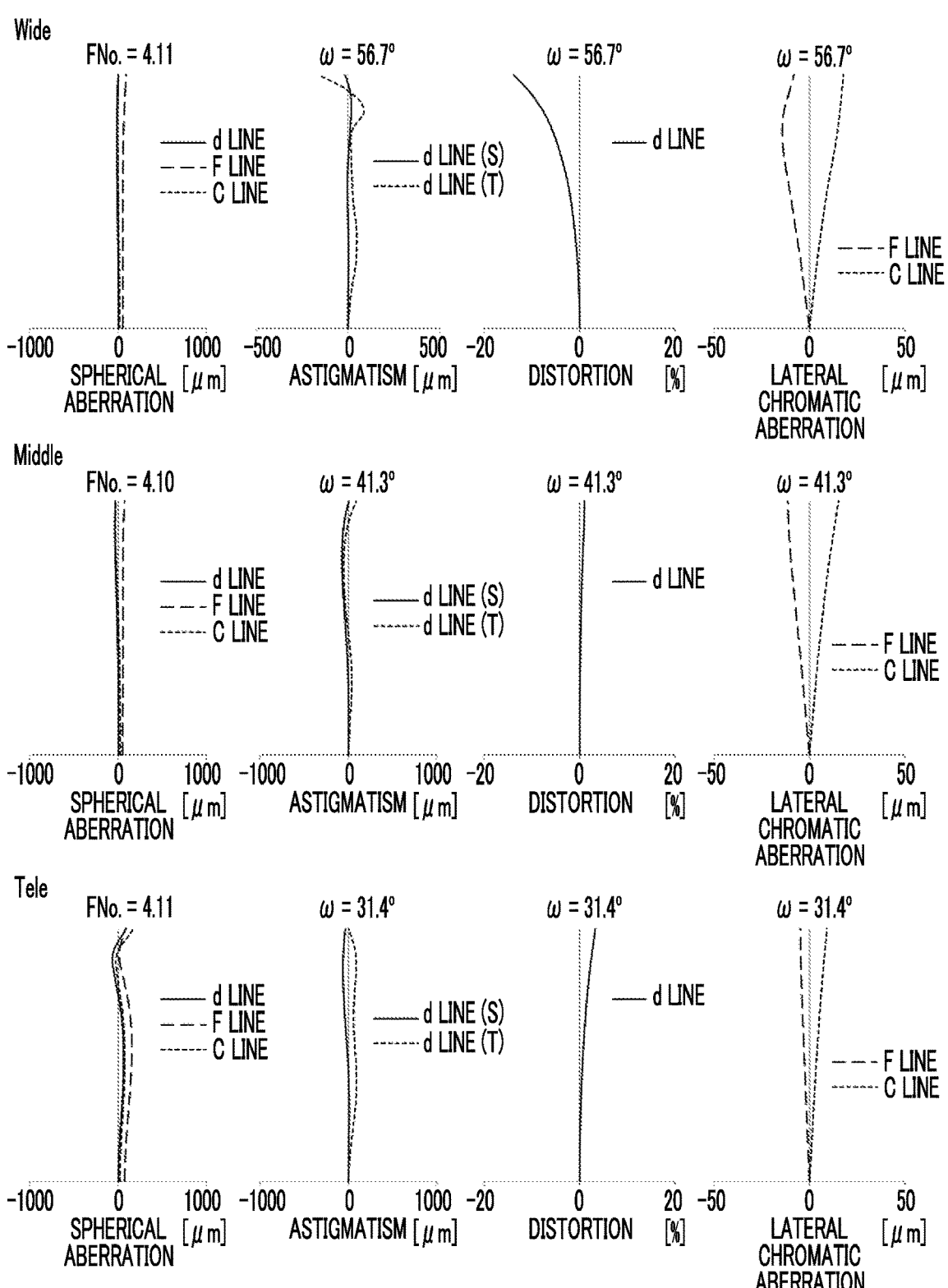
FIG. 9 is a diagram of aberrations of the variable magnification optical system of Example 3.

Regarding the variable magnification optical system of Example 3, Table 7 shows basic lens data, Table 8 shows specifications and variable surface spacings, and Table 9 shows aspherical coefficients thereof. FIG. 9 shows aberration diagrams.

TABLE 7

| Sn | R | D | Nd | vd | ED |
|---|---|---|---|---|---|
| 1 | 36.5418 | 1.0815 | 1.64770 | 60.28 | 39.9638 |
| 2 | 19.2366 | 4.1002 | | | |
| *3 | 26.3051 | 1.7498 | 1.80625 | 40.91 | |
| *4 | 12.1160 | 13.1197 | | | |
| 5 | −51.3820 | 0.7468 | 1.45860 | 90.19 | |
| 6 | 36.2660 | 1.8979 | 1.92286 | 18.90 | |
| 7 | 67.4314 | 0.2000 | | | |
| 8 | 30.0594 | 2.7900 | 1.48749 | 70.24 | |

TABLE 7-continued

| Sn | R | D | Nd | vd | ED |
|---|---|---|---|---|---|
| 9 | 100.4354 | DD[9] | | | |
| 10 | 27.0097 | 2.3878 | 1.69849 | 33.47 | |
| 11 | 183.3664 | 0.8952 | | | |
| 12 | 30.4376 | 0.7998 | 1.95375 | 32.32 | |
| 13 | 12.9358 | 4.7768 | 1.49700 | 81.54 | |
| 14 | −115.5927 | 0.9998 | | | |
| 15(St) | ∞ | DD[15] | | | |
| **16 | 16.2376 | 0.3000 | 1.51460 | 49.96 | |
| 17 | 16.9468 | 4.7077 | 1.52841 | 76.45 | |
| 18 | −39.0281 | 0.2942 | | | |
| *19 | 53.2359 | 1.6252 | 1.88202 | 37.22 | |
| *20 | 22.6877 | DD[20] | | | |
| 21 | 2012.4634 | 0.9000 | 1.76961 | 52.17 | |
| 22 | 14.5955 | 6.3666 | 1.51823 | 58.90 | |
| 23 | −21.7512 | 5.8921 | | | |
| *24 | −16.7964 | 1.0102 | 1.76450 | 49.10 | |
| *25 | −38.0465 | DD[25] | | | 21.9574 |

Example 3

TABLE 8

| | Example 3 | | |
|---|---|---|---|
| | Wide | Middle | Tele |
| Zr | 1.0 | 1.5 | 2.1 |
| f | 16.47 | 24.33 | 34.35 |
| Bf | 18.26 | 23.89 | 33.21 |
| FNo. | 4.11 | 4.10 | 4.11 |
| 2ω[°] | 113.4 | 82.6 | 62.8 |
| DD[9] | 17.14 | 6.10 | 0.18 |
| DD[15] | 11.59 | 8.18 | 5.55 |
| DD[20] | 1.86 | 4.16 | 5.38 |
| DD[25] | 17.46 | 23.89 | 33.21 |

TABLE 9

| | Example 3 | | | |
|---|---|---|---|---|
| Sn | 3 | 4 | 16 | 19 |
| KA | 9.6597460E−01 | −3.1708753E−01 | 8.7375688E−01 | 6.4970735E+00 |
| A4 | 9.3427415E−06 | 7.5762028E−05 | 5.5053594E−06 | 2.7212010E−06 |
| A6 | −1.1556577E−07 | −4.3915758E−08 | −1.9520392E−08 | −2.3255433E−07 |
| A8 | 1.6346543E−10 | −7.9857759E−10 | 4.3762566E−10 | 1.4447930E−09 |
| A10 | 5.0167358E−13 | 5.4860555E−12 | −5.3207043E−13 | −1.0973168E−11 |
| A12 | −2.6522860E−15 | −6.9065614E−15 | −5.4078211E−14 | 9.1705785E−15 |
| A14 | −2.3620841E−18 | −7.2183317E−17 | 2.1945765E−16 | 1.1891287E−15 |
| A16 | 1.2727340E−20 | −6.6166503E−19 | 3.1405618E−19 | −2.7526604E−17 |
| A18 | 6.3508112E−23 | 7.0658691E−21 | | 4.6042099E−19 |
| A20 | −1.6993536E−25 | −1.4649246E−23 | | −2.9352921E−21 |

| Sn | 20 | 24 | 25 |
|---|---|---|---|
| KA | −7.3956076E−02 | 1.6672561E+00 | −2.3037118E+01 |
| A4 | 5.9602286E−05 | 1.4403151E−05 | −4.5024150E−05 |
| A6 | −1.9050478E−07 | 6.1813876E−08 | 2.5037778E−07 |
| A8 | 4.4660381E−09 | −5.7171986E−09 | −4.4487150E−09 |
| A10 | −3.0332120E−11 | 3.7544407E−11 | 2.4005795E−11 |
| A12 | −3.0083856E−13 | −2.9146884E−14 | −9.8951881E−14 |
| A14 | 8.9608743E−15 | −2.9400183E−15 | 6.1408434E−16 |
| A16 | −1.0510926E−16 | −1.6470809E−18 | −3.0166092E−18 |
| A18 | 1.6929910E−18 | 3.5966100E−19 | −1.1510337E−20 |
| A20 | −1.3310688E−20 | −2.6618225E−21 | 8.9497228E−23 |

Example 4

Figure 10:
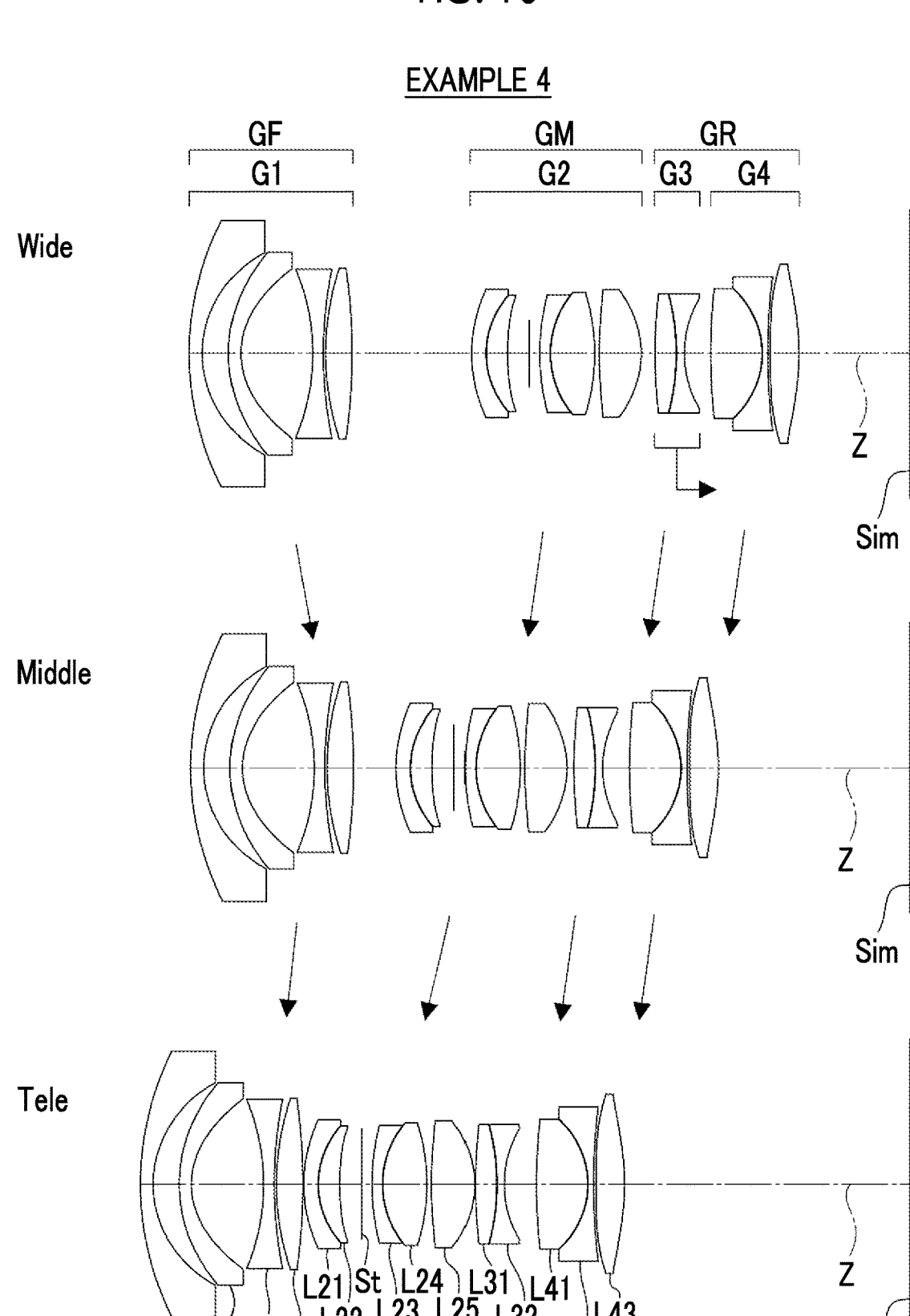
FIG. 10 is a cross-sectional view showing a configuration of a variable magnification optical system of Example 4 and is a diagram showing movement directions.

FIG. 10 shows a configuration and movement directions of the variable magnification optical system of Example 4. The variable magnification optical system of Example 4 consists of, in order from the object side to the image side, a first lens group G1 that has a negative refractive power, a second lens group G2 that has a positive refractive power, a third lens group G3 that has a negative refractive power, and a fourth lens group G4 that has a negative refractive power. The first lens group G1 consists of four lenses L11 to L14, in order from the object side to the image side. The second lens group G2 consists of lenses L21 and L22, an aperture stop St, and lenses L23 to L25, in order from the object side to the image side. The third lens group G3 consists of two lenses L31 and L32, in order from the object side to the image side. The fourth lens group G4 consists of three lenses L41 to L43, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3 and the fourth lens group G4. The focusing group consists of the third lens group G3. During focusing from the infinite distance object to the short range object, the focusing group moves to the image side.

Figure 11:
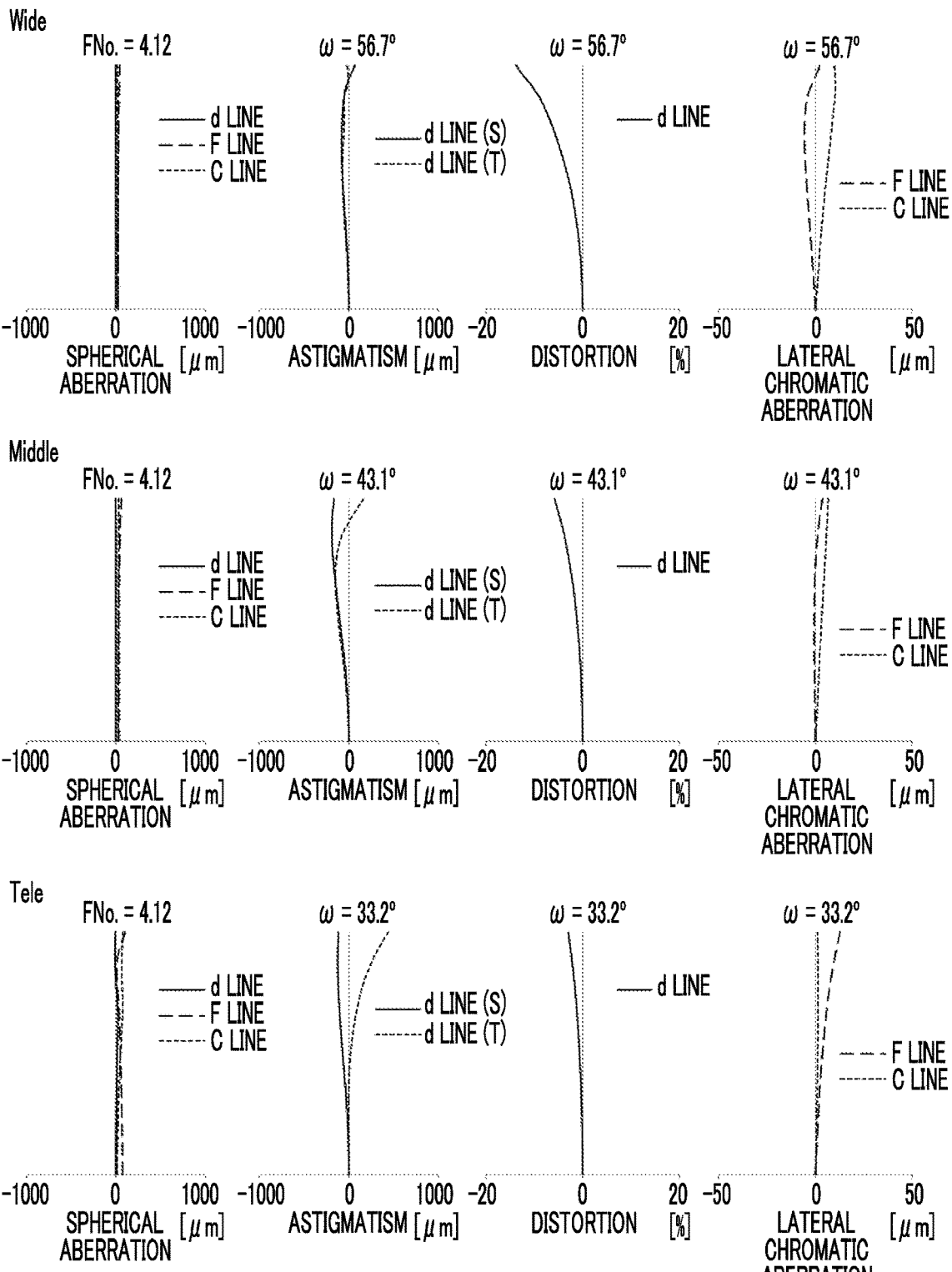
FIG. 11 is a diagram of aberrations of the variable magnification optical system of Example 4.

Regarding the variable magnification optical system of Example 4, Table 10 shows basic lens data, Table 11 shows specifications and variable surface spacings, and Table 12 shows aspherical coefficients thereof. FIG. 11 shows aberration diagrams.

TABLE 10

| | | Example 4 | | | |
|---|---|---|---|---|---|
| Sn | R | D | Nd | vd | ED |
| 1 | 45.94645 | 1.875 | 1.80996 | 47.00 | |
| 2 | 17.46512 | 3.750 | | | |
| *3 | 24.01204 | 1.750 | 1.67763 | 57.62 | |

TABLE 10-continued

| | | Example 4 | | | |
|---|---|---|---|---|---|
| Sn | R | D | Nd | vd | ED |
| *4 | 12.54385 | 10.314 | | | |
| 5 | −34.34395 | 1.516 | 1.50914 | 78.59 | |
| 6 | 67.41800 | 0.315 | | | |
| 7 | 42.48759 | 3.821 | 1.90366 | 31.34 | |
| 8 | −94.40639 | DD[8] | | | |
| 9 | 23.86239 | 2.091 | 1.94235 | 27.54 | |
| 10 | 13.73670 | 3.085 | 1.71850 | 48.14 | |
| *11 | 44.86878 | 3.128 | | | |
| 12(St) | ∞ | 1.500 | | | |
| 13 | 37.32703 | 1.511 | 1.89153 | 36.84 | |
| 14 | 14.91571 | 6.370 | 1.53775 | 74.70 | |
| 15 | −32.04705 | 0.653 | | | |
| *16 | 63.19798 | 6.080 | 1.51633 | 64.06 | |
| *17 | −15.00152 | DD[17] | | | |
| 18 | 81.41728 | 3.076 | 1.92286 | 18.90 | |
| 19 | −36.28235 | 1.068 | 1.84584 | 35.46 | |
| 20 | 17.18765 | DD[20] | | | |
| 21 | 94.48193 | 7.398 | 1.65160 | 58.54 | |
| 22 | −13.58684 | 0.800 | 1.92495 | 34.39 | |
| 23 | 98.57139 | 0.378 | | | |
| *24 | 1118.40337 | 4.122 | 1.55332 | 71.68 | |
| *25 | −37.80233 | DD[25] | | | 26.0499 |

TABLE 11

| | Example 4 | | |
|---|---|---|---|
| | Wide | Middle | Tele |
| Zr | 1.0 | 1.5 | 2.1 |
| f | 16.488 | 24.551 | 34.049 |
| Bf | 15.864 | 27.468 | 40.874 |
| FNo. | 4.12 | 4.12 | 4.12 |
| 2ω[°] | 113.4 | 86.2 | 66.4 |
| DD[8] | 17.003 | 6.086 | 0.113 |
| DD[17] | 1.974 | 0.977 | 0.076 |
| DD[20] | 3.781 | 3.878 | 4.615 |
| DD[25] | 15.864 | 27.468 | 40.874 |

TABLE 12

| | Example 4 | | | |
|---|---|---|---|---|
| Sn | 3 | 4 | 11 | 16 |
| KA | 1.0000000E+00 | 5.7781500E−01 | 1.0000000E+00 | 1.0000000E+00 |
| A4 | 1.4943485E−05 | 5.6582471E−06 | 3.8720570E−05 | −2.5024910E−05 |
| A6 | −1.1290771E−07 | −1.4993013E−07 | 1.1569647E−07 | 9.3217317E−09 |
| A8 | 4.0636448E−10 | −3.6447151E−10 | 1.6575319E−09 | 2.4712402E−10 |
| A10 | −6.2810017E−13 | 4.1270077E−12 | −2.1311334E−11 | −2.2170233E−12 |
| A12 | −1.5285963E−16 | −2.0561067E−14 | 2.3618035E−13 | 1.1289063E−14 |

| | Example 4 | | |
|---|---|---|---|
| Sn | 17 | 24 | 25 |
| KA | 1.0000000E+00 | 1.0000000E+00 | 1.0000000E+00 |
| A4 | 4.3635057E−05 | 7.1281423E−05 | 3.2343555E−05 |
| A6 | −1.6204647E−07 | −2.8252503E−07 | −5.2216026E−08 |
| A8 | 7.7394010E−10 | 1.0631111E−09 | −9.9969435E−11 |
| A10 | −2.2850571E−12 | −3.2357701E−12 | 2.1709862E−12 |
| A12 | −2.9035005E−15 | 3.9203312E−15 | −7.7904394E−15 |

Example 5

Figure 12:
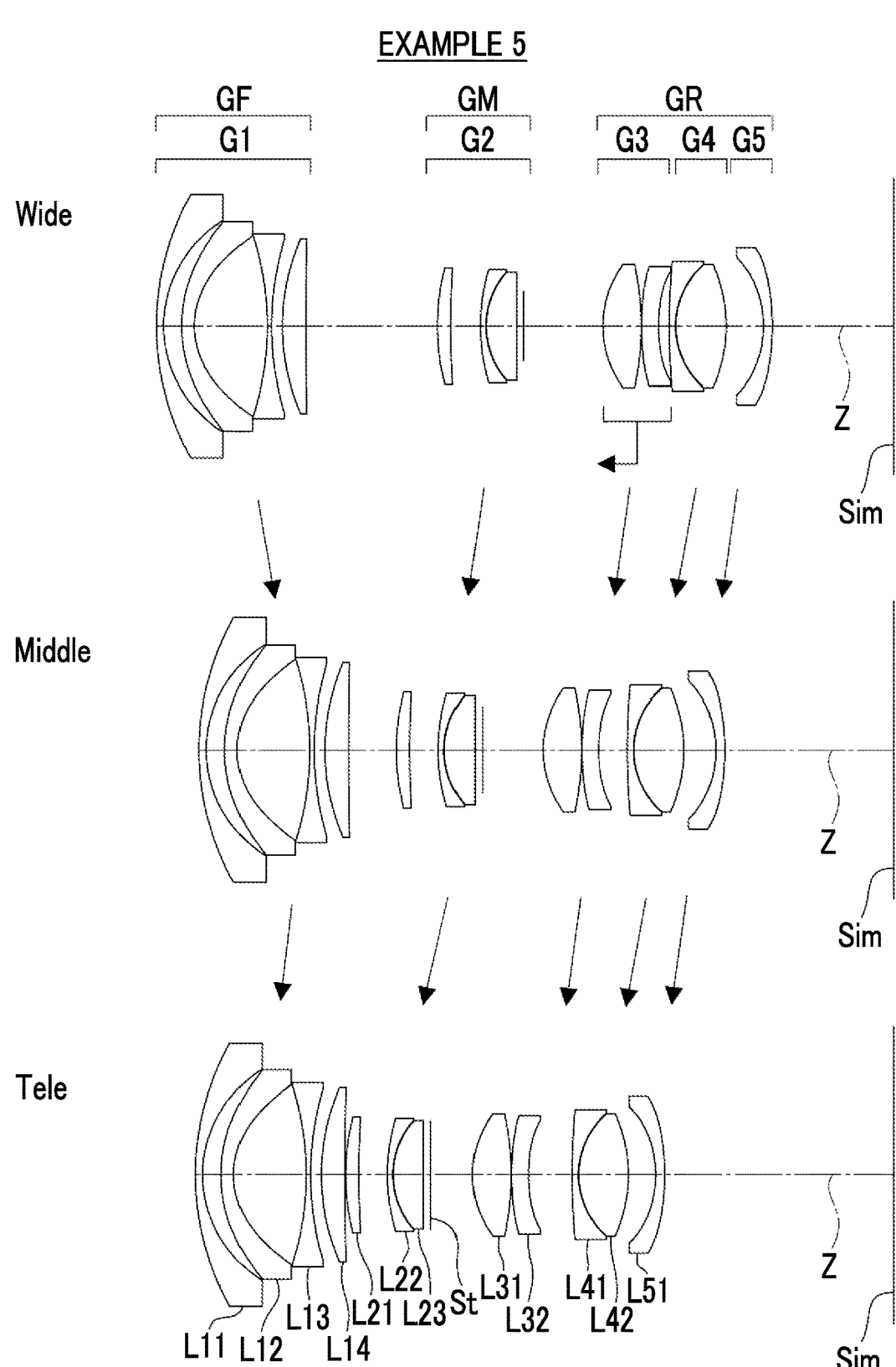
FIG. 12 is a cross-sectional view showing a configuration of a variable magnification optical system of Example 5 and is a diagram showing movement directions.

FIG. 12 shows a configuration and movement directions of the variable magnification optical system of Example 5. The variable magnification optical system shown in Example 5 consists of, in order from the object side to the image side, a first lens group G1 that has a negative refractive power, a second lens group G2 that has a positive refractive power, a third lens group G3 that has a positive refractive power, a fourth lens group G4 that has a positive refractive power, and a fifth lens group G5 that has a negative refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of two lenses L41 and L42, in order from the object side to the image side. The fifth lens group G5 consists of one lens L51.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves toward the object side.

Figure 13:
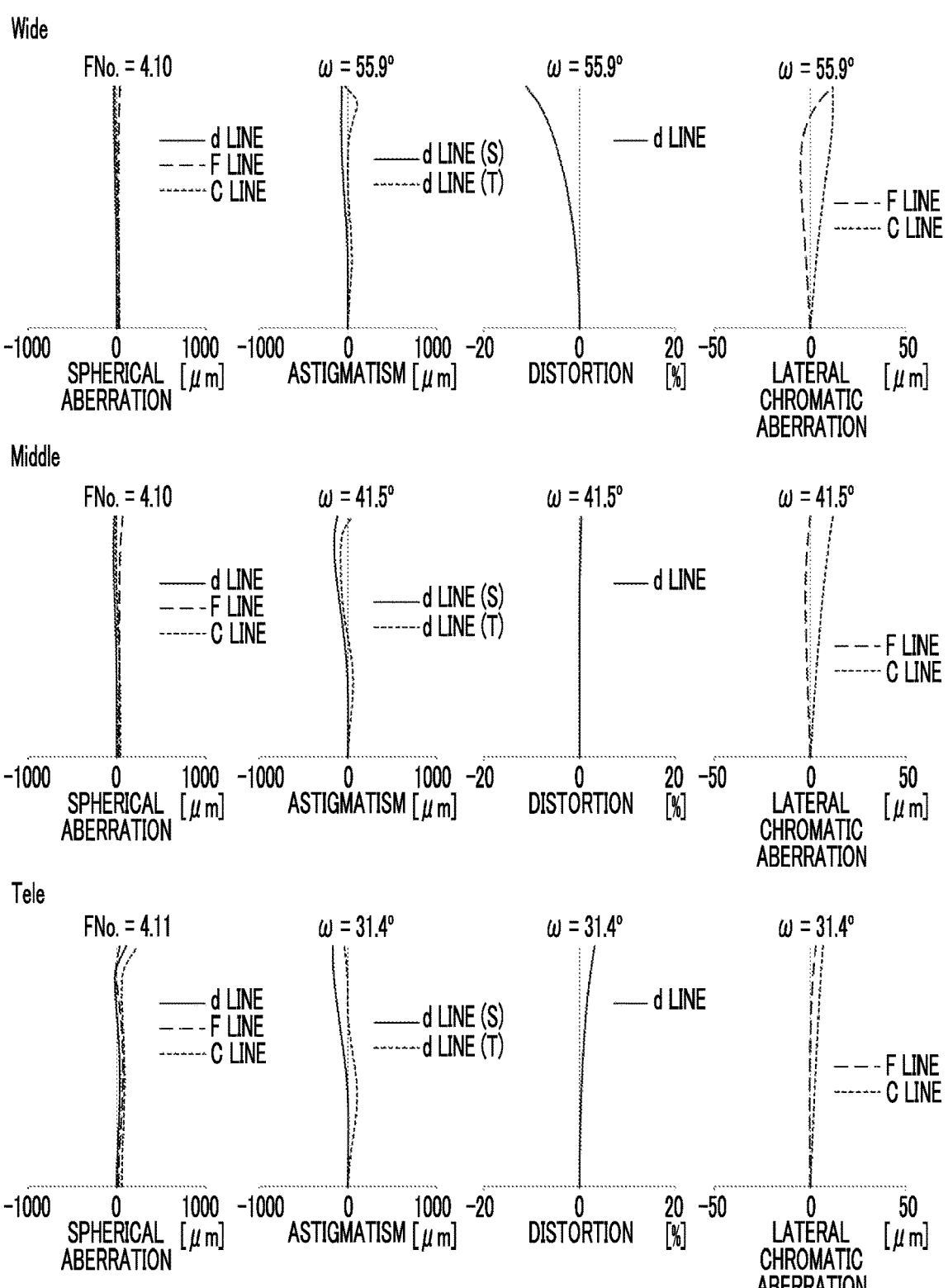
FIG. 13 is a diagram of aberrations of the variable magnification optical system of Example 5.

Regarding the variable magnification optical system of Example 5, Table 13 shows basic lens data, Table 14 shows specifications and variable surface spacings, and Table 15 shows aspherical coefficients thereof. FIG. 13 shows aberration diagrams.

TABLE 13

Example 5

| Sn | R | D | Nd | vd | ED |
|---|---|---|---|---|---|
| 1 | 41.12079 | 1.008 | 1.80610 | 40.93 | 38.5 |
| 2 | 18.63589 | 2.544 | | | |
| *3 | 22.41015 | 1.750 | 1.80625 | 40.91 | |
| *4 | 12.71722 | 10.122 | | | |
| 5 | −45.21763 | 0.609 | 1.48749 | 70.24 | |
| 6 | 46.49956 | 1.499 | | | |
| 7 | 33.30794 | 3.292 | 1.78472 | 25.68 | |
| 8 | 616.35193 | DD[8] | | | |
| 9 | 35.51090 | 1.865 | 1.90101 | 31.15 | |
| 10 | 153.05828 | 3.962 | | | |
| 11 | 29.94390 | 0.800 | 1.96980 | 30.20 | |
| 12 | 12.48000 | 4.246 | 1.58313 | 59.37 | |
| 13 | 3004.27257 | 1.000 | | | |
| 14(St) | ∞ | DD[14] | | | |
| 15 | 15.77721 | 5.369 | 1.49700 | 81.54 | |
| 16 | −43.53705 | 0.050 | | | |
| *17 | 47.48712 | 2.368 | 1.95150 | 29.83 | |
| *18 | 26.84414 | DD[18] | | | |
| 19 | 112.64848 | 0.900 | 1.86037 | 42.88 | |
| 20 | 12.36541 | 6.991 | 1.54072 | 47.23 | |
| 21 | −22.81850 | DD[21] | | | |
| *22 | −17.09252 | 1.250 | 1.76450 | 49.10 | |
| *23 | −39.68078 | DD[23] | | | 23.0106 |

TABLE 14

Example 5

| | Wide | Middle | Tele |
|---|---|---|---|
| Zr | 1.0 | 1.5 | 2.1 |
| f | 16.472 | 24.330 | 34.344 |
| Bf | 16.942 | 23.572 | 31.903 |
| FNo. | 4.10 | 4.10 | 4.11 |
| 2ω[°] | 111.8 | 83.0 | 62.8 |
| DD[8] | 18.363 | 6.680 | 0.090 |
| DD[14] | 11.093 | 8.466 | 5.723 |
| DD[18] | 1.489 | 3.993 | 6.088 |
| DD[21] | 5.181 | 4.414 | 3.823 |
| DD[23] | 16.944 | 23.572 | 31.903 |

TABLE 15

Example 5

| Sn | 3 | 4 | 17 |
|---|---|---|---|
| KA | 8.3106645E−01 | −7.7392052E−01 | 1.0000000E+00 |
| A4 | 1.0866530E−05 | 9.4178133E−05 | 4.2220310E−05 |
| A6 | −6.1230899E−08 | −1.3196465E−07 | −6.8533108E−08 |
| A8 | 1.0277984E−10 | 5.2365009E−10 | 1.2488842E−09 |
| A10 | −4.4089606E−13 | −3.1608411E−12 | −1.3982652E−11 |
| A12 | 4.7391360E−16 | 4.0881067E−15 | 1.3273493E−14 |

| Sn | 18 | 22 | 23 |
|---|---|---|---|
| KA | 1.0000000E+00 | 1.0000000E+00 | 0.0000000E+00 |
| A4 | 8.1370459E−05 | −4.2185705E−05 | −3.4295583E−05 |
| A6 | 7.5435396E−08 | 4.6898715E−07 | 2.9071859E−07 |
| A8 | 5.3111752E−09 | −8.3984912E−09 | −4.0302442E−09 |
| A10 | −5.1422747E−11 | 6.0274094E−11 | 1.8757690E−11 |
| A12 | 3.9084096E−13 | −2.9797650E−13 | −5.4371494E−14 |

Example 6

Figure 14:
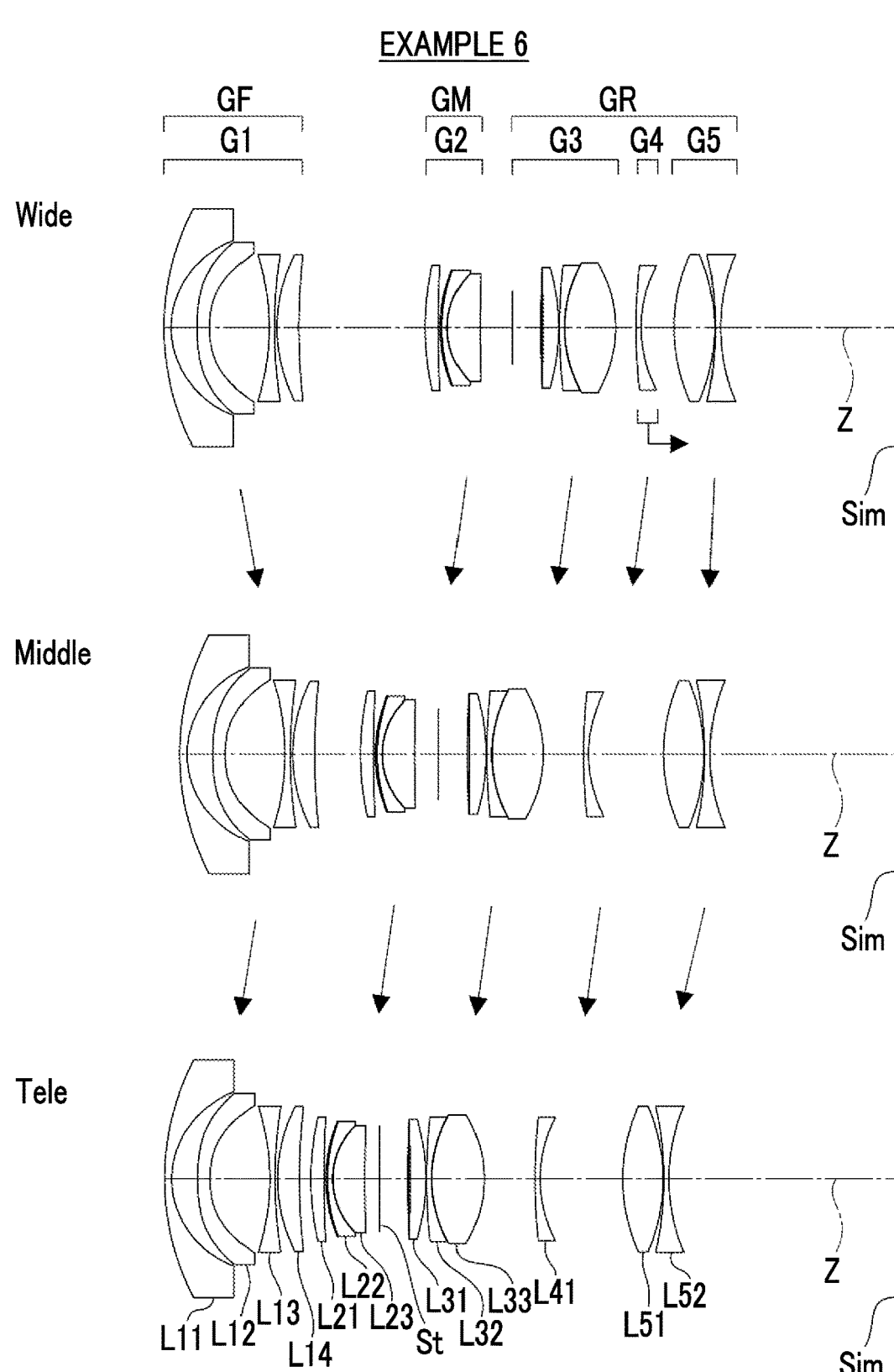
FIG. 14 is a cross-sectional view showing a configuration of a variable magnification optical system of Example 6 and is a diagram showing movement directions.

FIG. 14 shows a configuration and movement directions of the variable magnification optical system of Example 6. The variable magnification optical system shown in Example 6 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23, in order from the object side to the image side. The third lens group G3 consists of the aperture stop St and three lenses L31 to L33, in order from the object side to the image side. The fourth lens group G4 consists of one lens L41. The fifth lens group G5 consists of two lenses L51 and L52, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the fourth lens group G4. During focusing from the infinite distance object to the short range object, the focusing group moves to the image side.

Figure 15:
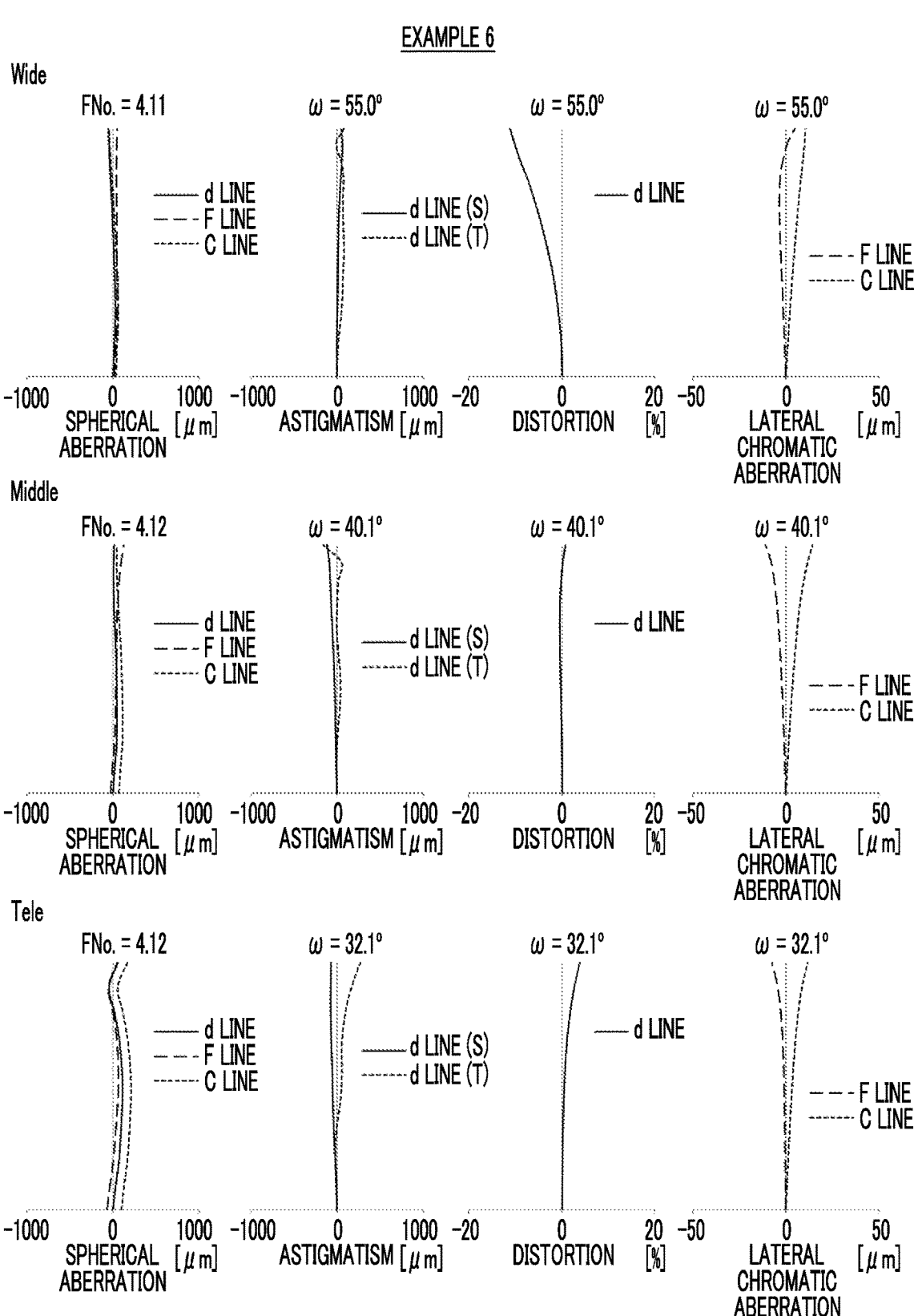
FIG. 15 is a diagram of aberrations of the variable magnification optical system of Example 6.

Regarding the variable magnification optical system of Example 6, Table 16 shows basic lens data, Table 17 shows specifications and variable surface spacings, and Table 18 shows aspherical coefficients thereof. FIG. 15 shows aberration diagrams.

TABLE 16

| | | Example 6 | | | |
|---|---|---|---|---|---|
| Sn | R | D | Nd | vd | ED |
| 1 | 40.8088 | 1.0479 | 1.73986 | 54.01 | 36 |
| 2 | 14.2596 | 3.7066 | | | |
| *3 | 44.8562 | 1.7498 | 1.51934 | 77.02 | |
| *4 | 17.3306 | 8.5043 | | | |
| 5 | −38.3388 | 0.7527 | 1.53303 | 71.52 | |
| 6 | 76.2028 | 0.3512 | | | |
| 7 | 25.3266 | 3.1357 | 1.69895 | 30.13 | |
| 8 | 105.4549 | DD[8] | | | |
| 9 | 44.7255 | 1.8788 | 1.99765 | 28.23 | |
| 10 | 213.3601 | 0.2555 | | | |
| **11 | 23.8762 | 0.2500 | 1.51460 | 49.96 | |
| 12 | 26.0603 | 0.7322 | 1.98334 | 29.67 | |
| 13 | 11.8846 | 4.6252 | 1.54853 | 48.96 | |
| 14 | 348.9447 | DD[14] | | | |
| 15(St) | ∞ | 4.0677 | | | |
| **16 | 126.3641 | 0.3000 | 1.51460 | 49.96 | |
| 17 | −536.3891 | 2.2939 | 1.52825 | 76.85 | |
| 18 | −33.4827 | 0.0998 | | | |
| 19 | 88.9621 | 0.7362 | 1.76349 | 40.92 | |
| 20 | 21.0627 | 7.3604 | 1.49700 | 81.54 | |
| 21 | −19.8398 | DD[21] | | | |

TABLE 16-continued

| | | Example 6 | | | |
|---|---|---|---|---|---|
| Sn | R | D | Nd | vd | ED |
| 22 | 91.3025 | 0.7353 | 1.76494 | 51.51 | |
| 23 | 21.1104 | DD[23] | | | |
| 24 | 28.2971 | 5.7738 | 1.56883 | 56.36 | |
| 25 | −29.4570 | 0.0998 | | | |
| *26 | −57.5423 | 0.7523 | 1.72835 | 50.45 | |
| *27 | 32.3292 | DD[27] | | | 22.1545 |

TABLE 17

| | Example 6 | | |
|---|---|---|---|
| | Wide | Middle | Tele |
| Zr | 1.0 | 1.5 | 2.0 |
| f | 17.02 | 25.48 | 33.18 |
| Bf | 25.28 | 26.78 | 32.62 |
| FNo. | 4.11 | 4.11 | 4.11 |
| 2ω[°] | 110.0 | 80.2 | 64.2 |
| DD[8] | 18.08 | 6.57 | 1.65 |
| DD[14] | 4.56 | 3.40 | 2.05 |
| DD[21] | 2.90 | 5.75 | 7.24 |
| DD[23] | 4.70 | 10.76 | 11.87 |
| DD[27] | 25.28 | 26.78 | 32.62 |

TABLE 18

| | Example 6 | | | |
|---|---|---|---|---|
| Sn | 3 | 4 | 26 | 27 |
| KA | 9.9608905E−01 | −2.7380808E−01 | 1.0000000E+00 | −2.9999931E+00 |
| A3 | 0.0000000E+00 | 1.2767565E−18 | 0.0000000E+00 | 0.0000000E+00 |
| A4 | 2.7354814E−04 | 3.0496691E−04 | 5.4077536E−06 | 4.0902901E−05 |
| A5 | −1.2227542E−05 | −2.6108572E−06 | −2.0914369E−06 | −4.5287680E−06 |
| A6 | −5.5474736E−08 | −2.3302162E−06 | 5.0214427E−08 | 5.1322508E−07 |
| A7 | −1.2989103E−07 | 1.8056176E−07 | 1.7137855E−08 | 1.9611660E−08 |
| A8 | 1.7301834E−08 | 4.9001008E−09 | −9.8293629E−10 | −1.2370843E−08 |
| A9 | 2.8702993E−10 | −1.7845159E−09 | −9.7015036E−11 | 8.0145558E−10 |
| A10 | −1.1662636E−10 | 1.0226620E−10 | 5.1042985E−12 | 9.5025653E−11 |
| A11 | 2.2312250E−12 | 6.9172212E−12 | 3.1707708E−13 | −1.1491875E−11 |
| A12 | 3.2583875E−13 | −7.5225050E−13 | −1.1687461E−14 | −3.2728777E−13 |
| A13 | −1.1691994E−14 | −1.7170776E−14 | −5.8491294E−16 | 6.8191529E−14 |
| A14 | −4.2441535E−14 | 1.8458160E−15 | 1.2588714E−17 | 4.1444212E−16 |
| A15 | 2.0838450E−17 | 2.5778507E−17 | 5.6484054E−19 | −1.9915692E−16 |
| A16 | 2.1184033E−19 | −1.5502568E−18 | −5.2337270E−21 | 1.1081323E−19 |
| A17 | −1.3139210E−20 | −1.6675410E−20 | −2.2148588E−22 | 2.3274028E−19 |

| Sn | 11 | 16 |
|---|---|---|
| KA | 9.6206742E−01 | 2.5164058E−01 |
| A3 | 2.0885587E−21 | −2.0378184E−17 |
| A4 | −1.3128580E−05 | −3.3462844E−05 |
| A5 | 4.8760794E−06 | 2.6158300E−06 |
| A6 | 1.6676578E−07 | −9.4273293E−07 |
| A7 | −4.3193216E−07 | 8.6364712E−08 |
| A8 | 2.6258070E−08 | 5.1567540E−08 |
| A9 | 2.0643443E−08 | −1.5461549E−08 |
| A10 | −2.2169490E−09 | 1.3671320E−09 |
| A11 | −5.6163540E−10 | 3.4676423E−11 |
| A12 | 7.5662497E−11 | −8.2290211E−12 |
| A13 | 9.0973079E−12 | −6.0869802E−13 |
| A14 | −1.3862376E−12 | 8.8825400E−14 |
| A15 | −8.9750708E−14 | 2.9634401E−15 |
| A16 | 1.4572805E−14 | −5.0598263E−16 |
| A17 | 5.1096292E−16 | −7.6213479E−18 |
| A18 | −8.4150039E−17 | 1.5201983E−18 |
| A19 | −1.3076735E−18 | 7.9290923E−21 |
| A20 | 2.0961699E−19 | −1.8584728E−21 |

Example 7

Figure 16:
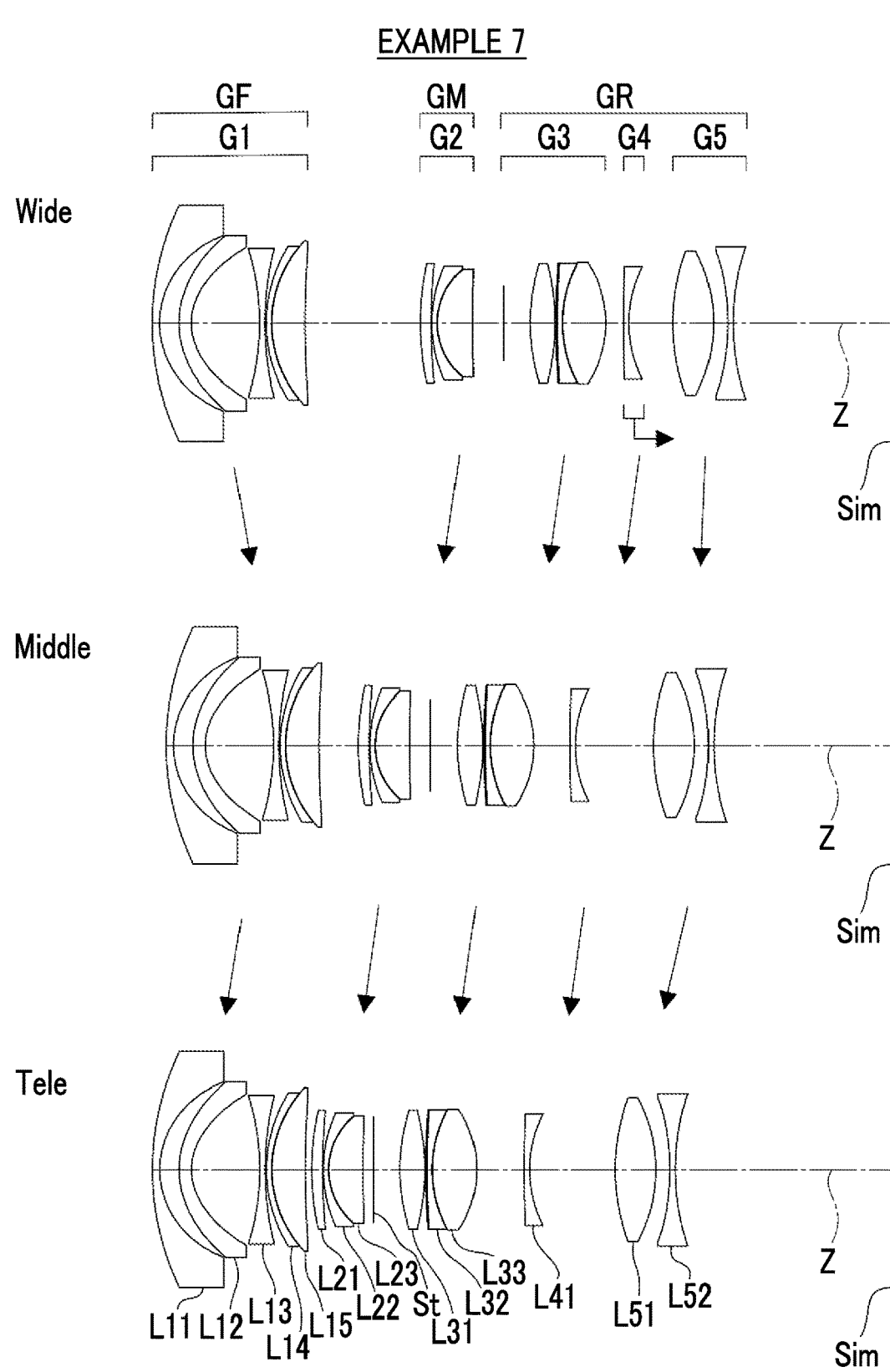
FIG. 16 is a cross-sectional view showing a configuration of a variable magnification optical system of Example 7 and is a diagram showing movement directions.

FIG. 16 shows a configuration and movement directions of the variable magnification optical system of Example 7. The variable magnification optical system shown in Example 7 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of five lenses L11 to L15, in order from the object side to the image side. The second lens group G2 consists of three lenses L21 to L23, in order from the object side to the image side. The third lens group G3 consists of the aperture stop St and three lenses L31 to L33, in order from the object side to the image side. The fourth lens group G4 consists of one lens L41. The fifth lens group G5 consists of two lenses L51 and L52, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the fourth lens group G4. During focusing from the infinite distance object to the short range object, the focusing group moves to the image side.

Figure 17:
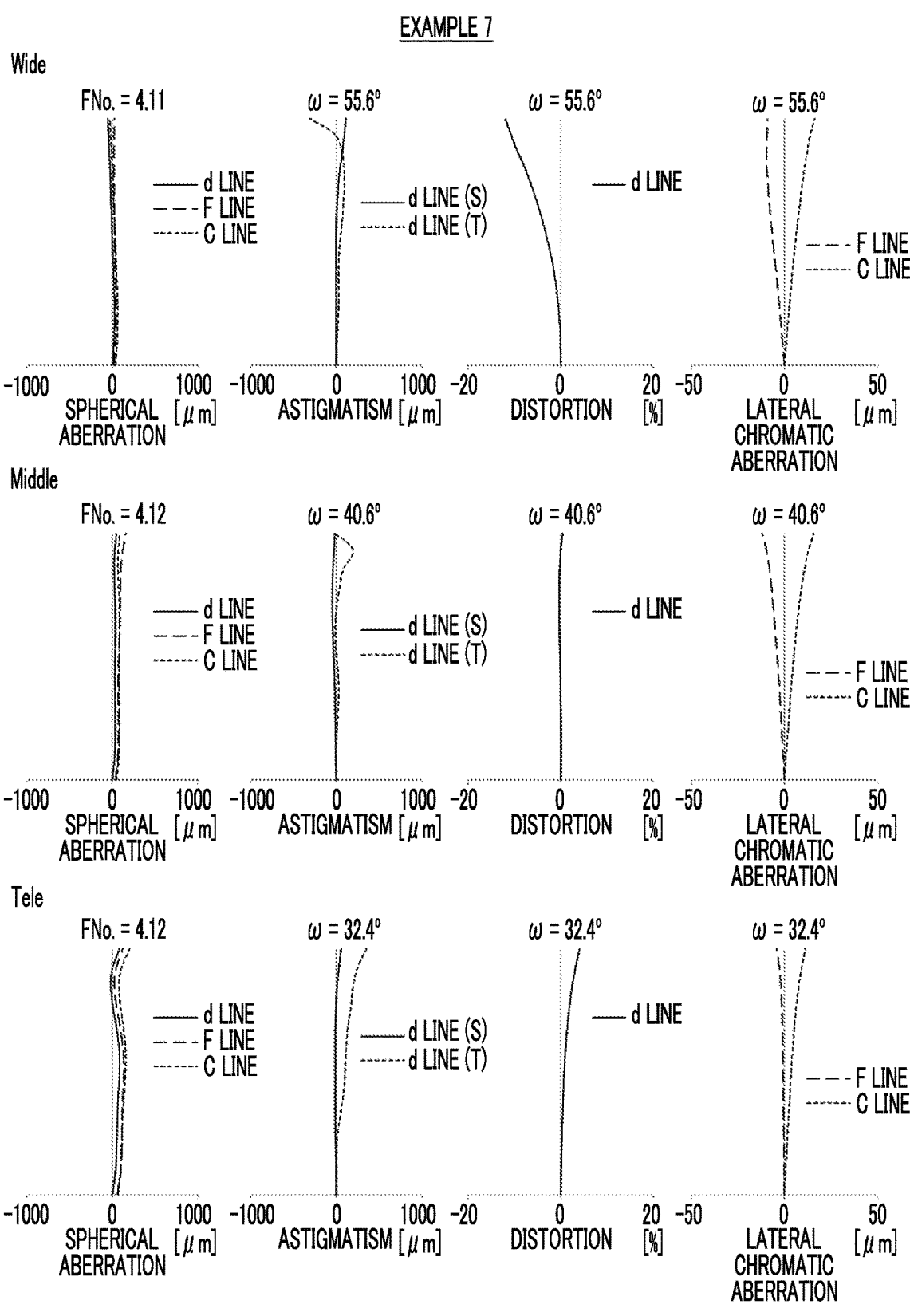
FIG. 17 is a diagram of aberrations of the variable magnification optical system of Example 7.

Regarding the variable magnification optical system of Example 7, Table 19 shows basic lens data, Table 20 shows specifications and variable surface spacings, and Table 21 shows aspherical coefficients thereof. FIG. 17 shows aberration diagrams.

TABLE 19

| | Example 7 | | | | |
|---|---|---|---|---|---|
| Sn | R | D | Nd | vd | ED |
| 1 | 44.5068 | 1.0323 | 1.68219 | 58.59 | 36 |
| 2 | 14.4753 | 2.7373 | | | |
| *3 | 14.7754 | 1.7500 | 1.73663 | 55.54 | |
| *4 | 9.7945 | 9.5391 | | | |
| 5 | −41.3626 | 0.7566 | 1.53908 | 75.20 | |
| 6 | 50.7945 | 0.1842 | | | |
| 7 | 23.8104 | 0.7498 | 1.80809 | 22.76 | |
| 8 | 19.3776 | 4.7132 | 1.68893 | 31.07 | |
| 9 | 174.6875 | DD[9] | | | |
| 10 | 46.2311 | 1.5285 | 1.76193 | 52.95 | |
| 11 | 105.1544 | 0.0999 | | | |
| 12 | 22.8159 | 0.7346 | 1.96889 | 31.78 | |
| 13 | 11.3922 | 4.8516 | 1.60438 | 38.44 | |
| 14 | 278.4484 | DD[14] | | | |
| 15(St) | ∞ | 3.7205 | | | |
| *16 | 29.9739 | 3.5223 | 1.55332 | 71.68 | |
| *17 | −35.1552 | 0.1001 | | | |
| **18 | 118.5990 | 0.2000 | 1.51460 | 49.96 | |
| 19 | 151.3545 | 0.7348 | 1.85620 | 43.31 | |
| 20 | 21.0134 | 6.1307 | 1.43875 | 94.66 | |
| 21 | −18.0334 | DD[21] | | | |
| 22 | 283.7999 | 0.7368 | 1.73748 | 55.45 | |
| 23 | 20.3730 | DD[23] | | | |
| 24 | 34.5366 | 5.7201 | 1.48749 | 70.24 | |
| 25 | −25.0588 | 1.9780 | | | |
| *26 | −42.2339 | 0.7609 | 1.57141 | 63.65 | |
| *27 | 42.0552 | DD[27] | | | 23.1217 |

TABLE 20

| | Example 7 | | |
|---|---|---|---|
| | Wide | Middle | Tele |
| Zr | 1.0 | 1.5 | 2.0 |
| f | 16.80 | 25.15 | 32.76 |
| Bf | 22.47 | 25.18 | 30.57 |
| FNo. | 4.11 | 4.12 | 4.12 |
| 2ω[°] | 111.2 | 81.2 | 64.8 |
| DD[9] | 16.25 | 5.56 | 0.93 |
| DD[14] | 4.35 | 2.92 | 1.47 |
| DD[21] | 2.51 | 5.10 | 6.67 |
| DD[23] | 6.19 | 11.05 | 12.10 |
| DD[27] | 22.47 | 25.18 | 30.57 |

TABLE 21

| | Example 7 | | | |
|---|---|---|---|---|
| Sn | 3 | 4 | 16 | 17 |
| KA | −1.0447872E+00 | 2.0854515E−02 | 2.3618487E+00 | 3.0000084E+00 |
| A3 | −4.5327055E−06 | −2.6830519E−05 | −5.7947095E−06 | 5.6359207E−06 |
| A4 | 5.2061297E−05 | 3.8030062E−05 | −2.8221524E−05 | 2.4115113E−05 |
| A5 | −6.6053148E−06 | −3.0729645E−06 | −1.3365296E−06 | −1.7112534E−06 |
| A6 | 1.6594872E−06 | 5.6620336E−07 | 5.8628454E−07 | 8.6868801E−07 |
| A7 | −1.5551109E−07 | 3.6606012E−08 | −1.2770753E−07 | −1.4602950E−07 |
| A8 | −1.2442441E−09 | −1.1332372E−08 | 3.1469219E−09 | −1.1149136E−09 |
| A9 | 1.0499052E−09 | −8.4984243E−11 | 2.2549864E−09 | 2.5645006E−09 |
| A10 | −3.1793560E−11 | 1.1690298E−10 | −1.5893780E−10 | −1.1500184E−10 |
| A11 | −2.6545558E−12 | −8.4123974E−13 | −1.6594668E−11 | −1.8762964E−11 |
| A12 | 1.2531443E−13 | −5.5188528E−13 | 1.4151817E−12 | 1.0369160E−12 |
| A13 | 2.6503081E−15 | −1.1938231E−16 | 6.9526768E−14 | 7.2307755E−14 |
| A14 | −2.0889319E−16 | 1.1996177E−15 | −4.7983978E−15 | −3.5363122E−15 |
| A15 | 6.6796500E−19 | −1.8078802E−18 | −1.4836356E−16 | −1.1905910E−16 |
| A16 | 1.0335779E−19 | 2.7461500E−19 | −3.6212392E−19 | 5.6748565E−18 |
| A17 | 1.7543037E−21 | −4.4558109E−20 | 4.0946253E−19 | −2.1289117E−19 |

TABLE 21-continued

| | Example 7 | |
|---|---|---|
| Sn | | 18 |
| KA | | 2.1505344E+01 |
| A4 | | −6.8288831E−06 |
| A6 | | 8.7187107E−08 |
| A8 | | 1.5536119E−10 |
| A10 | | −8.0487289E−12 |
| A12 | | 5.0748417E−15 |
| A14 | | 1.7287134E−16 |
| A16 | | −1.1906761E−18 |

| Sn | 26 | 27 |
|---|---|---|
| KA | 1.0000000E+00 | −2.3848025E+00 |
| A3 | 2.2204460E−20 | 1.6544153E−05 |
| A4 | −1.3212518E−05 | 1.1770091E−05 |
| A5 | −1.7066065E−07 | −1.5524985E−06 |
| A6 | −1.1522183E−07 | 3.9357994E−07 |
| A7 | 1.3065512E−08 | −3.1292463E−08 |
| A8 | 4.2617538E−10 | −5.2687337E−09 |
| A9 | −8.4779152E−11 | 9.7419440E−10 |
| A10 | −9.7531810E−13 | 1.5346756E−11 |
| A11 | 2.6530625E−13 | −9.2706531E−12 |
| A12 | 1.4289218E−15 | 7.1294252E−14 |
| A13 | −3.6014703E−16 | 4.6306532E−14 |
| A14 | −4.8071712E−18 | −4.9463327E−16 |
| A15 | 9.5918526E−19 | −1.2754379E−16 |
| A16 | −3.0660668E−20 | 8.4158371E−19 |
| A17 | −1.3029342E−21 | 1.4999805E−19 |

Example 8

Figure 18:
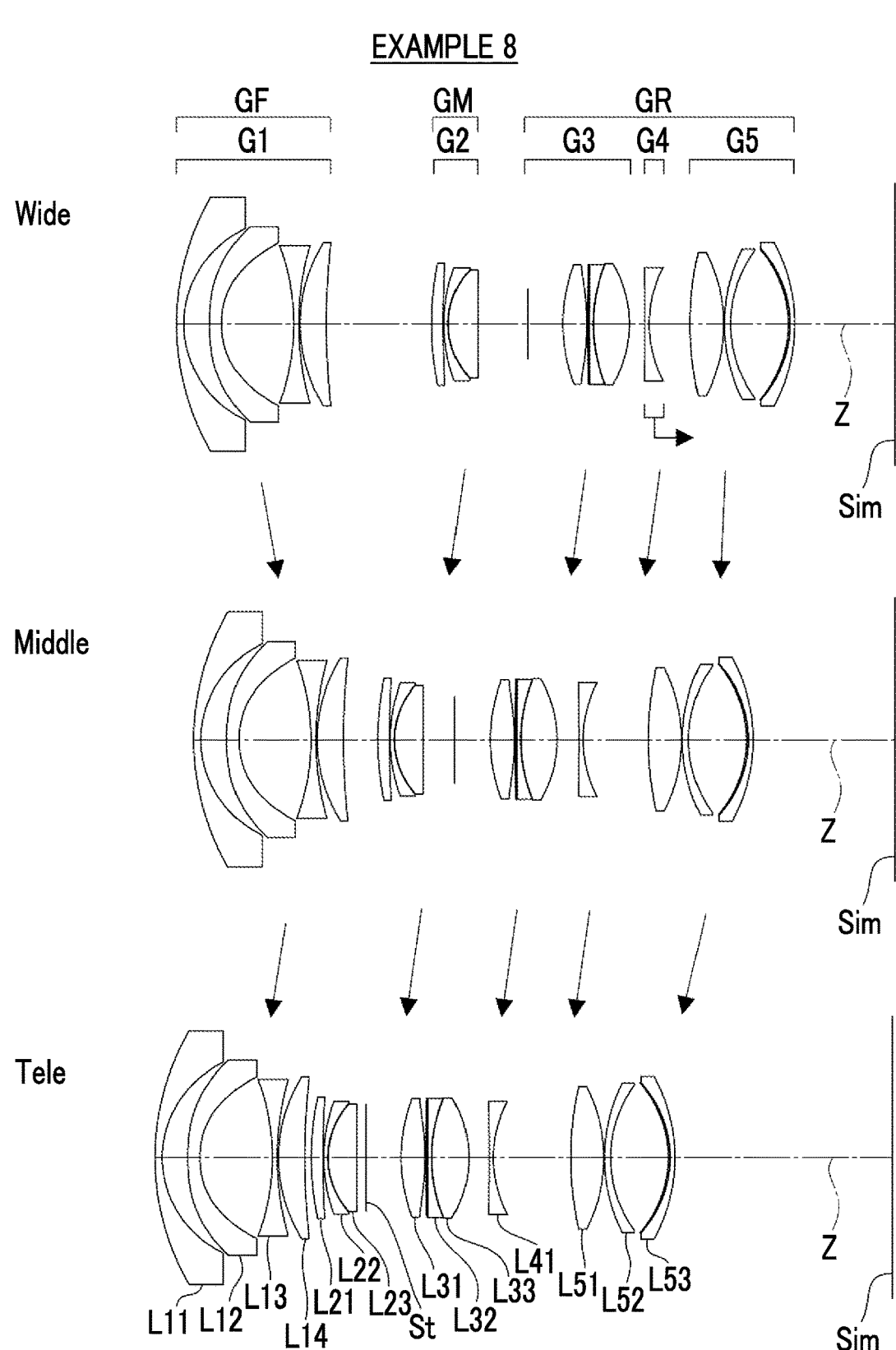
FIG. 18 is a cross-sectional view showing a configuration of a variable magnification optical system of Example 8 and is a diagram showing movement directions.

FIG. 18 shows a configuration and movement directions of the variable magnification optical system of Example 8. The variable magnification optical system shown in Example 8 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23, in order from the object side to the image side. The third lens group G3 consists of the aperture stop St and three lenses L31 to L33, in order from the object side to the image side. The fourth lens group G4 consists of one lens L41. The fifth lens group G5 consists of three lenses L51 to L53, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the fourth lens group G4. During focusing from the infinite distance object to the short range object, the focusing group moves to the image side.

Regarding the variable magnification optical system of Example 8, Table 22 shows basic lens data, Table 23 shows specifications and variable surface spacings, and Table 24 shows aspherical coefficients thereof. FIG. 19 shows aberration diagrams.

TABLE 22

| | | Example 8 | | | |
|---|---|---|---|---|---|
| Sn | R | D | Nd | vd | ED |
| 1 | 40.9071 | 1.0373 | 1.75294 | 52.71 | 39 |
| 2 | 16.6068 | 3.7352 | | | |
| *3 | 38.5674 | 1.7613 | 1.54844 | 72.55 | |
| *4 | 15.2834 | 10.4643 | | | |
| 5 | −36.1371 | 0.7079 | 1.46622 | 85.20 | |
| 6 | 46.0482 | 0.1807 | | | |
| 7 | 24.6140 | 3.8185 | 1.69895 | 30.13 | |
| 8 | 117.1146 | DD[8] | | | |
| 9 | 48.2027 | 1.7033 | 1.74066 | 28.73 | |
| 10 | 185.2617 | 0.0998 | | | |
| 11 | 26.2843 | 0.6140 | 1.91818 | 32.54 | |
| 12 | 13.0169 | 4.1770 | 1.51902 | 69.46 | |
| 13 | 1544.2794 | DD[13] | | | |
| 14(St) | ∞ | 5.0798 | | | |
| *15 | 26.1593 | 3.4959 | 1.55332 | 71.68 | |
| *16 | −37.5651 | 0.0998 | | | |
| **17 | 278.5822 | 0.2500 | 1.51460 | 49.96 | |
| 18 | 904.6956 | 0.5867 | 1.70291 | 52.95 | |
| 19 | 25.5850 | 5.2796 | 1.43875 | 94.66 | |
| 20 | −19.2422 | DD[20] | | | |
| 21 | −663.2774 | 0.6037 | 1.73350 | 54.65 | |
| 22 | 19.7923 | DD[22] | | | |
| 23 | 53.4201 | 4.8321 | 1.49700 | 81.54 | |
| 24 | −25.0870 | 0.0998 | | | |
| 25 | 26.8581 | 0.8989 | 1.78195 | 49.81 | |
| 26 | 19.9673 | 8.3933 | | | |
| **27 | −18.0250 | 0.2500 | 1.51460 | 49.96 | |
| 28 | −17.8606 | 0.7100 | 1.75313 | 52.69 | |
| 29 | −27.3646 | DD[29] | | | 24.9572 |

TABLE 23

| | Example 8 | | |
|---|---|---|---|
| | Wide | Middle | Tele |
| Zr | 1.0 | 1.5 | 2.1 |
| f | 16.45 | 24.64 | 34.03 |
| Bf | 14.54 | 20.61 | 31.60 |
| FNo. | 4.10 | 4.11 | 4.12 |
| 2ω[°] | 112.8 | 83.6 | 64.8 |
| DD[8] | 15.29 | 5.01 | 0.97 |
| DD[13] | 7.27 | 4.52 | 1.38 |
| DD[20] | 2.28 | 3.17 | 2.92 |
| DD[22] | 5.93 | 9.51 | 11.26 |
| DD[29] | 14.54 | 20.61 | 31.60 |

TABLE 24

| | Example 8 | | |
|---|---|---|---|
| Sn | 3 | 4 | 15 |
| KA | 9.4238280E−01 | −6.0122815E−01 | 1.8021679E+00 |
| A3 | −1.3440523E−19 | 0.0000000E+00 | −8.8272108E−21 |
| A4 | 1.8573032E−04 | 2.5110793E−04 | −1.4157228E−05 |
| A5 | −1.1727332E−05 | −1.1346473E−05 | −1.7418205E−06 |
| A6 | −3.4622960E−07 | −3.9826967E−07 | 4.4657149E−07 |
| A7 | 6.3103639E−08 | 5.1710001E−08 | −6.1109278E−08 |
| A8 | 1.8566598E−10 | 6.9527136E−09 | −1.0216906E−09 |
| A9 | −2.6486544E−10 | −8.7615279E−10 | 1.1156335E−09 |
| A10 | 5.2421316E−12 | −1.9559279E−11 | −4.4351976E−11 |
| A11 | 6.7239293E−13 | 6.2567073E−12 | −7.8252966E−12 |
| A12 | −2.1668495E−14 | −3.3760381E−14 | 4.4886368E−13 |
| A13 | −1.0684951E−15 | −2.2264275E−14 | 2.8797769E−14 |
| A14 | 3.2123744E−17 | 2.0380263E−16 | −1.5750239E−15 |
| A15 | 1.1058898E−18 | 3.8685134E−17 | −5.2479663E−17 |
| A16 | −1.5147676E−20 | −2.2852142E−19 | 1.8484117E−18 |
| A17 | −5.9012221E−22 | −2.6110277E−20 | 3.6322989E−20 |
| Sn | 16 | 17 | 27 |
| KA | 2.4483102E+00 | −1.5170761E+02 | −1.8616197E+00 |
| A3 | −7.9444898E−20 | 0.0000000E+00 | 8.9948625E−20 |
| A4 | 4.8855539E−05 | −4.6328188E−06 | −6.6597419E−05 |
| A5 | −4.4001033E−06 | −2.2005006E−06 | 5.8875722E−06 |
| A6 | 5.1890056E−07 | −1.2202820E−07 | −1.1707475E−06 |
| A7 | −3.3067062E−08 | 6.2372409E−08 | 5.5778015E−08 |
| A8 | 1.5673127E−09 | 3.0207112E−09 | 1.5531604E−08 |
| A9 | 9.1078472E−10 | −6.4354825E−10 | −1.6428556E−09 |
| A10 | −8.2621420E−11 | −2.4449064E−11 | −1.1110164E−10 |
| A11 | −6.4905847E−12 | 3.6591053E−12 | 1.7807061E−11 |
| A12 | 6.3413538E−13 | 9.4210151E−14 | 3.2402524E−13 |
| A13 | 2.5404411E−14 | −1.1989311E−14 | −9.2794939E−14 |
| A14 | −1.9517093E−15 | −1.7649677E−16 | −1.2430294E−16 |
| A15 | −5.4713065E−17 | 2.1142300E−17 | 2.3004703E−16 |
| A16 | 2.1537445E−18 | 1.2826759E−19 | −6.2479358E−19 |
| A17 | 4.9670269E−20 | −1.5604449E−20 | −2.0979690E−19 |

Example 9

Figure 20:
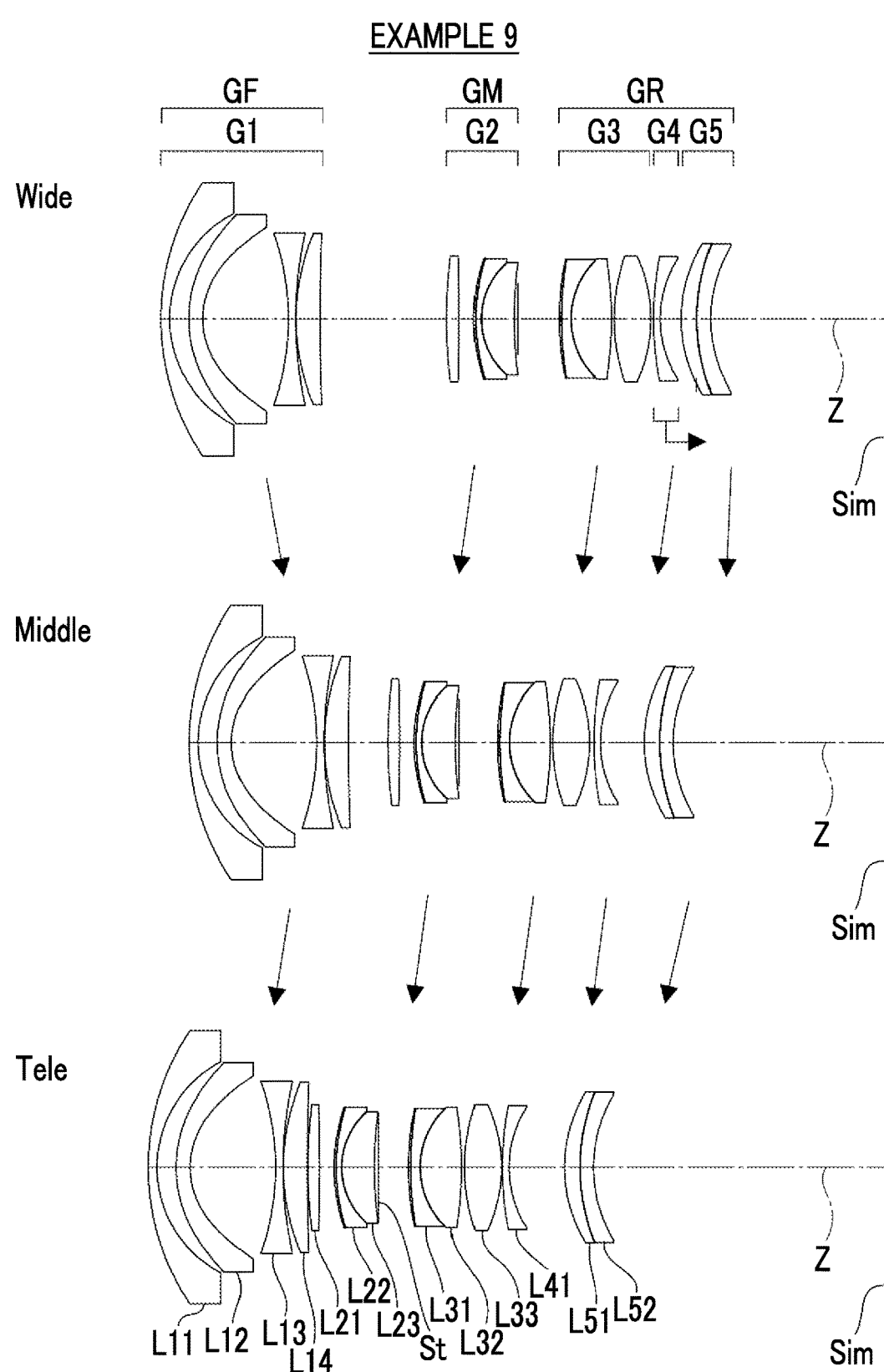
FIG. 20 is a cross-sectional view showing a configuration of a variable magnification optical system of Example 9 and is a diagram showing movement directions.

FIG. 20 shows a configuration and movement directions of the variable magnification optical system of Example 9. The variable magnification optical system shown in Example 9 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a negative refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of three lenses L31 to L33, in order from the object side to the image side. The fourth lens group G4 consists of one lens L41. The fifth lens group G5 consists of two lenses L51 and L52, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the fourth lens group G4. During focusing from the infinite distance object to the short range object, the focusing group moves to the image side.

Regarding the variable magnification optical system of Example 9, Table 25 shows basic lens data, Table 26 shows specifications and variable surface spacings, and Table 27 shows aspherical coefficients thereof. FIG. 21 shows aberration diagrams.

TABLE 25

| | Example 9 | | | | |
|---|---|---|---|---|---|
| Sn | R | D | Nd | νd | ED |
| 1 | 34.9053 | 1.2500 | 1.85013 | 30.06 | 39 |
| 2 | 17.0226 | 2.7500 | | | |
| *3 | 18.7605 | 2.0002 | 1.82507 | 47.45 | |
| *4 | 11.5259 | 12.1632 | | | |
| 5 | −36.9764 | 1.0548 | 1.43875 | 94.66 | |
| 6 | 56.7573 | 0.0500 | | | |
| 7 | 31.3671 | 3.4453 | 1.80518 | 25.42 | |
| 8 | 346.8991 | DD[8] | | | |
| 9 | 73.1328 | 1.6543 | 1.83481 | 42.74 | |
| 10 | −376.4141 | 2.0643 | | | |
| **11 | 25.5588 | 0.3000 | 1.51460 | 49.96 | |
| 12 | 28.3666 | 0.8000 | 1.91008 | 28.33 | |
| 13 | 10.7364 | 4.6728 | 1.73992 | 33.27 | |
| 14 | 59.3671 | 0.5514 | | | |
| 15(St) | ∞ | DD[15] | | | |
| **16 | 44.8319 | 0.3000 | 1.51460 | 49.96 | |
| 17 | 50.5504 | 1.3750 | 1.82123 | 45.68 | |
| 18 | 11.8176 | 5.8323 | 1.55332 | 71.68 | |
| *19 | −45.2720 | 0.3777 | | | |
| 20 | 27.4829 | 5.2500 | 1.55200 | 70.70 | |
| 21 | −21.3623 | DD[21] | | | |
| 22 | 45.7182 | 0.9648 | 1.86087 | 43.71 | |
| 23 | 16.1096 | DD[23] | | | |
| 24 | 20.7687 | 2.2241 | 1.59522 | 67.73 | |
| 25 | 28.7547 | 1.9277 | 1.94435 | 34.98 | |
| *26 | 19.6600 | DD[26] | | | 20.9116 |

TABLE 26

| | Example 9 | | |
|---|---|---|---|
| | Wide | Middle | Tele |
| Zr | 1.0 | 1.5 | 2.1 |
| f | 16.454 | 24.304 | 34.060 |
| Bf | 25.280 | 30.570 | 42.010 |
| FNo. | 4.10 | 4.10 | 4.11 |
| 2ω[°] | 110.4 | 83.4 | 64.2 |
| DD[8] | 18.07 | 5.65 | 0.08 |
| DD[15] | 5.92 | 5.47 | 4.33 |
| DD[21] | 0.37 | 0.63 | 0.11 |
| DD[23] | 3.00 | 6.27 | 7.94 |
| DD[26] | 25.28 | 30.57 | 42.01 |

TABLE 27

| | Example 9 | |
| --- | --- | --- |
| Sn | 3 | 26 |
| KA | 0.0000000E+00 | 0.0000000E+00 |
| A4 | 3.2283894E−05 | 1.1328773E−05 |
| A6 | −8.1225023E−08 | −5.9436648E−09 |
| A8 | 1.0800447E−10 | −1.3953201E−11 |
| A10 | −1.8918675E−13 | 3.9498194E−13 |
| Sn | 4 | 19 |
| KA | 0.0000000E+00 | 1.0000000E+00 |
| A4 | 6.6797526E−05 | 2.8332754E−05 |
| A6 | −2.7668331E−09 | 1.0902288E−07 |
| A8 | −5.3916435E−10 | −4.3759934E−09 |
| A10 | 1.7881480E−12 | 6.4586268E−11 |
| A12 | −8.4407369E−15 | −4.9572404E−13 |
| Sn | 11 | 16 |
| KA | 3.1716138E−01 | 4.1000932E+00 |
| A3 | −4.5474735E−19 | −2.2205574E−18 |
| A4 | 1.1223586E−05 | −7.3720701E−05 |
| A5 | −2.4734002E−05 | 1.2105222E−04 |
| A6 | 1.2394063E−05 | −7.9420642E−05 |
| A7 | −1.5783239E−06 | 2.3124240E−05 |
| A8 | −5.4249903E−07 | −4.1865181E−07 |
| A9 | 1.6065754E−07 | −1.4934931E−06 |
| A10 | 2.8252828E−09 | 3.0646951E−07 |
| A11 | −4.6941093E−09 | 1.4517092E−08 |
| A12 | 2.2217723E−10 | −1.1408628E−08 |
| A13 | 6.6349222E−11 | 7.6123920E−10 |
| A14 | −5.1519424E−12 | 1.5857433E−10 |
| A15 | −4.9809709E−13 | −2.2140835E−11 |
| A16 | 4.8457784E−14 | −5.7618405E−13 |
| A17 | 1.9106120E−15 | 2.2040770E−13 |
| A18 | −2.1527632E−16 | −5.3376596E−15 |
| A19 | −2.9492411E−18 | −7.7409391E−16 |
| A20 | 3.7224210E−19 | 3.7371185E−17 |

Figure 22:
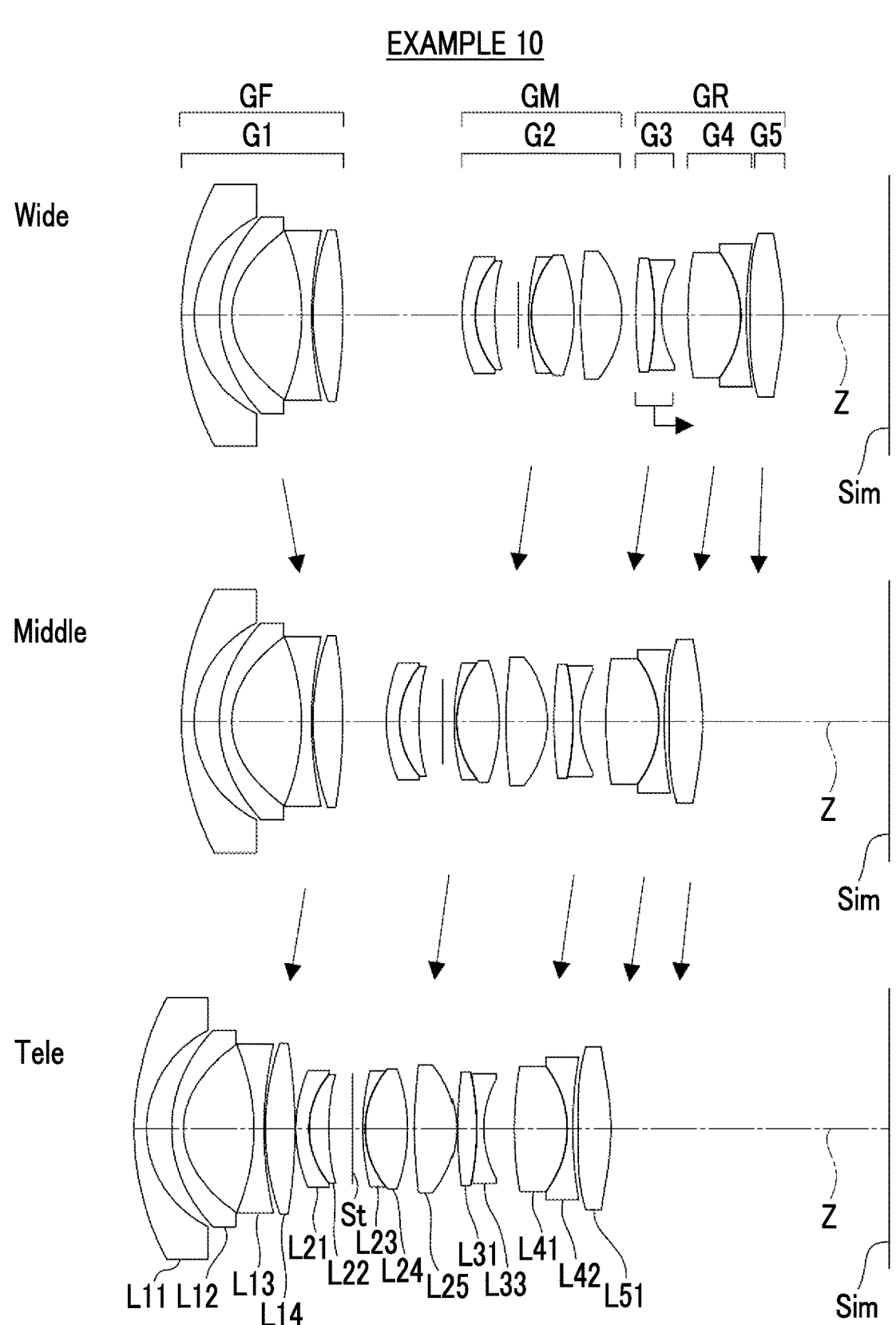
FIG. 22 is a cross-sectional view showing a configuration of a variable magnification optical system of Example 10 and is a diagram showing movement directions.

FIG. 22 shows a configuration and movement directions of the variable magnification optical system of Example 10. The variable magnification optical system shown in Example 10 consists of, in order from the object side to the image side, a first lens group G1 that has a negative refractive power, a second lens group G2 that has a positive refractive power, a third lens group G3 that has a negative refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of lenses L21 and L22, an aperture stop St, and lenses L23 to L25, in order from the object side to the image side. The third lens group G3 consists of two lenses L31 and L32, in order from the object side to the image side. The fourth lens group G4 consists of two lenses L41 and L42, in order from the object side to the image side. The fifth lens group G5 consists of one lens L51.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves to the image side.

Figure 23:
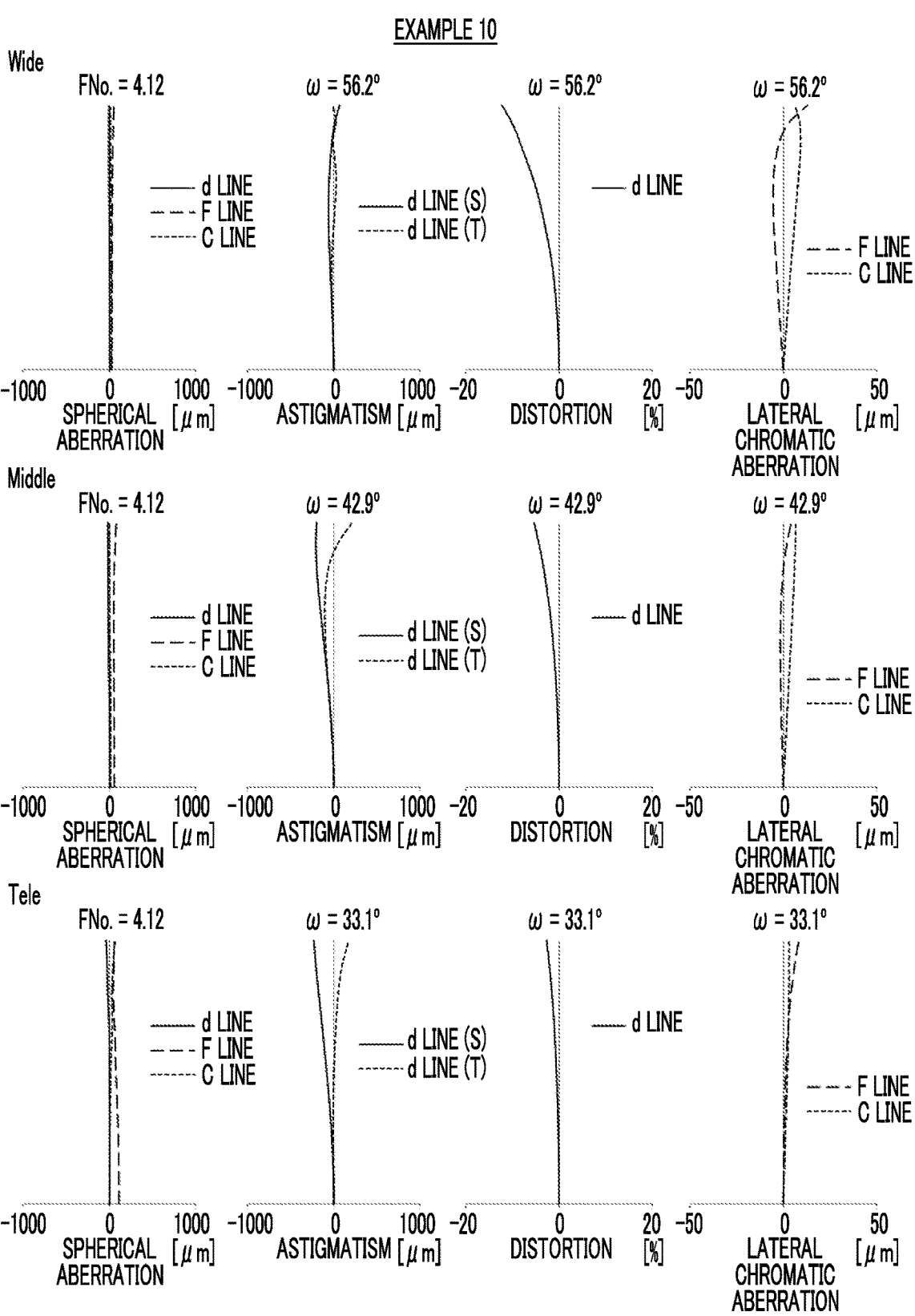
FIG. 23 is a diagram of aberrations of the variable magnification optical system of Example 10.

Regarding the variable magnification optical system of Example 10, Table 28 shows basic lens data, Table 29 shows specifications and variable surface spacings, and Table 30 shows aspherical coefficients thereof. FIG. 23 shows aberration diagrams.

TABLE 28

| | | Example 10 | | | |
| --- | --- | --- | --- | --- | --- |
| Sn | R | D | Nd | vd | ED |
| 1 | 44.87325 | 1.875 | 1.81670 | 46.33 | 40.8 |
| 2 | 17.34958 | 3.761 | | | |
| *3 | 22.01255 | 1.754 | 1.76346 | 51.65 | |
| *4 | 12.55093 | 10.395 | | | |
| 5 | −34.99436 | 1.500 | 1.52363 | 76.36 | |
| 6 | 61.87848 | 0.208 | | | |
| 7 | 41.98346 | 4.428 | 1.90366 | 31.34 | |
| 8 | −83.91029 | DD[8] | | | |
| 9 | 24.28927 | 1.969 | 1.93715 | 26.32 | |
| 10 | 13.69615 | 2.933 | 1.70894 | 43.54 | |
| *11 | 47.37166 | 3.526 | | | |
| 12(St) | ∞ | 1.503 | | | |
| 13 | 37.80750 | 0.376 | 1.88846 | 38.40 | |
| 14 | 14.92833 | 6.330 | 1.49700 | 81.54 | |
| 15 | −28.49195 | 0.993 | | | |
| *16 | 61.46560 | 6.169 | 1.51633 | 64.06 | |
| *17 | −14.99840 | DD[17] | | | |
| 18 | 74.99379 | 2.814 | 1.92286 | 18.90 | |
| 19 | −44.55694 | 1.034 | 1.82190 | 36.75 | |
| 20 | 16.96600 | DD[20] | | | |
| 21 | 60.70717 | 7.882 | 1.59522 | 67.73 | |
| 22 | −16.52949 | 0.800 | 1.91693 | 33.82 | |
| 23 | 69.99328 | DD[23] | | | |
| *24 | −1657.91238 | 4.920 | 1.55332 | 71.68 | |
| *25 | −38.16818 | DD[25] | | | 25.4 |

TABLE 29

| | Example 10 | | |
| --- | --- | --- | --- |
| | Wide | Middle | Tele |
| Zr | 1.0 | 1.5 | 2.1 |
| f | 16.496 | 24.562 | 34.064 |
| Bf | 15.777 | 27.771 | 41.357 |
| FNo. | 4.12 | 4.12 | 4.12 |
| 2ω[°] | 112.4 | 85.8 | 66.2 |
| DD[8] | 17.546 | 6.471 | 0.125 |
| DD[17] | 2.095 | 1.002 | 0.110 |
| DD[20] | 3.833 | 3.900 | 4.581 |
| DD[23] | 0.598 | 0.734 | 0.801 |
| DD[25] | 15.777 | 27.771 | 41.357 |

TABLE 30

| | | Example 10 | | |
| --- | --- | --- | --- | --- |
| Sn | 3 | 4 | 11 | 16 |
| KA | 1.0000000E+00 | 5.7781500E−01 | 1.0000000E+00 | 1.0000000E+00 |
| A4 | 1.1781993E−05 | 5.8385921E−06 | 3.9556716E−05 | −2.3339041E−05 |
| A6 | −1.1098540E−07 | −1.4230839E−07 | 1.2858286E−07 | 2.0440868E−08 |
| A8 | 4.2077557E−10 | −2.8797201E−10 | 1.6376326E−09 | 1.3738981E−10 |

TABLE 30-continued

| | Example 10 | | |
|---|---|---|---|
| A10 | −7.0618851E−13 | 4.0260157E−12 | −2.1640449E−11 | −1.1144346E−12 |
| A12 | −2.3675539E−16 | −2.1429734E−14 | 2.3220899E−13 | 9.7344375E−15 |

| Sn | 17 | 24 | 25 |
|---|---|---|---|
| KA | 1.0000000E+00 | 1.0000000E+00 | 1.0000000E+00 |
| A4 | 4.1227061E−05 | 7.3723028E−05 | 3.4969790E−05 |
| A6 | −1.5204465E−07 | −2.7845468E−07 | −5.1756020E−08 |
| A8 | 7.7646911E−10 | 1.0282549E−09 | −1.1160480E−10 |
| A10 | −2.3987275E−12 | −3.0005939E−12 | 1.8378605E−12 |
| A12 | 1.7257107E−15 | 4.0419982E−15 | −5.0772592E−15 |

Example 11

Figure 24:
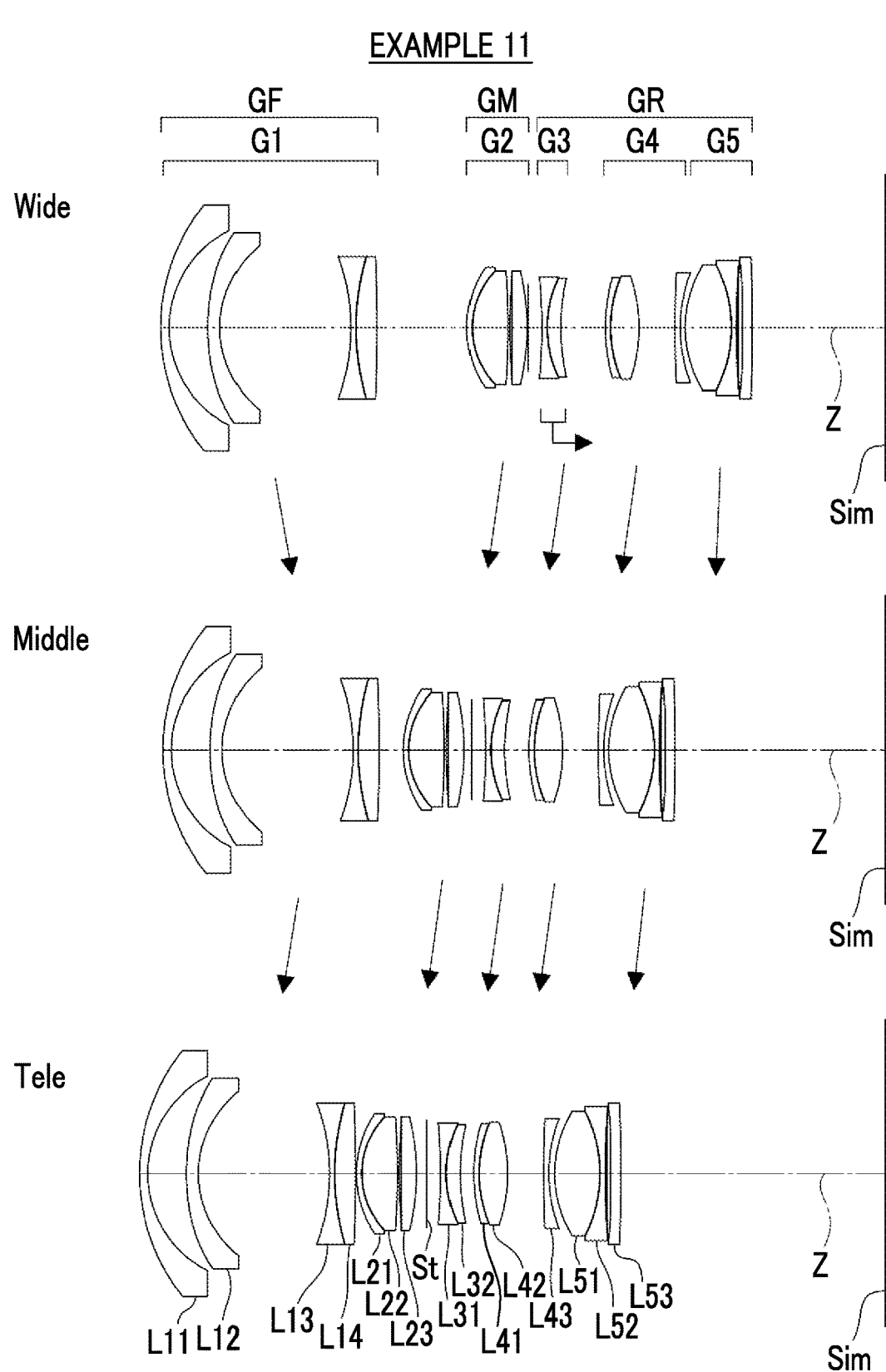
FIG. 24 is a cross-sectional view showing a configuration of a variable magnification optical system of Example 11 and is a diagram showing movement directions.

FIG. 24 shows a configuration and movement directions of the variable magnification optical system of Example 11. The variable magnification optical system shown in Example 11 consists of, in order from the object side to the image side, a first lens group G1 that has a negative refractive power, a second lens group G2 that has a positive refractive power, a third lens group G3 that has a negative refractive power, a fourth lens group G4 that has a positive refractive power, and a fifth lens group G5 that has a positive refractive power. The first lens group G1 consists of four lenses L11 to L14, in order from the object side to the image side. The second lens group G2 consists of three lenses L21 to L23, in order from the object side to the image side. The third lens group G3 consists of two lenses, the aperture stop St and lenses L31 and L32, in order from the object side to the image side. The fourth lens group G4 consists of three lenses L41 to L43, in order from the object side to the image side. The fifth lens group G5 consists of three lenses L51 to L53, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves to the image side.

Figure 25:
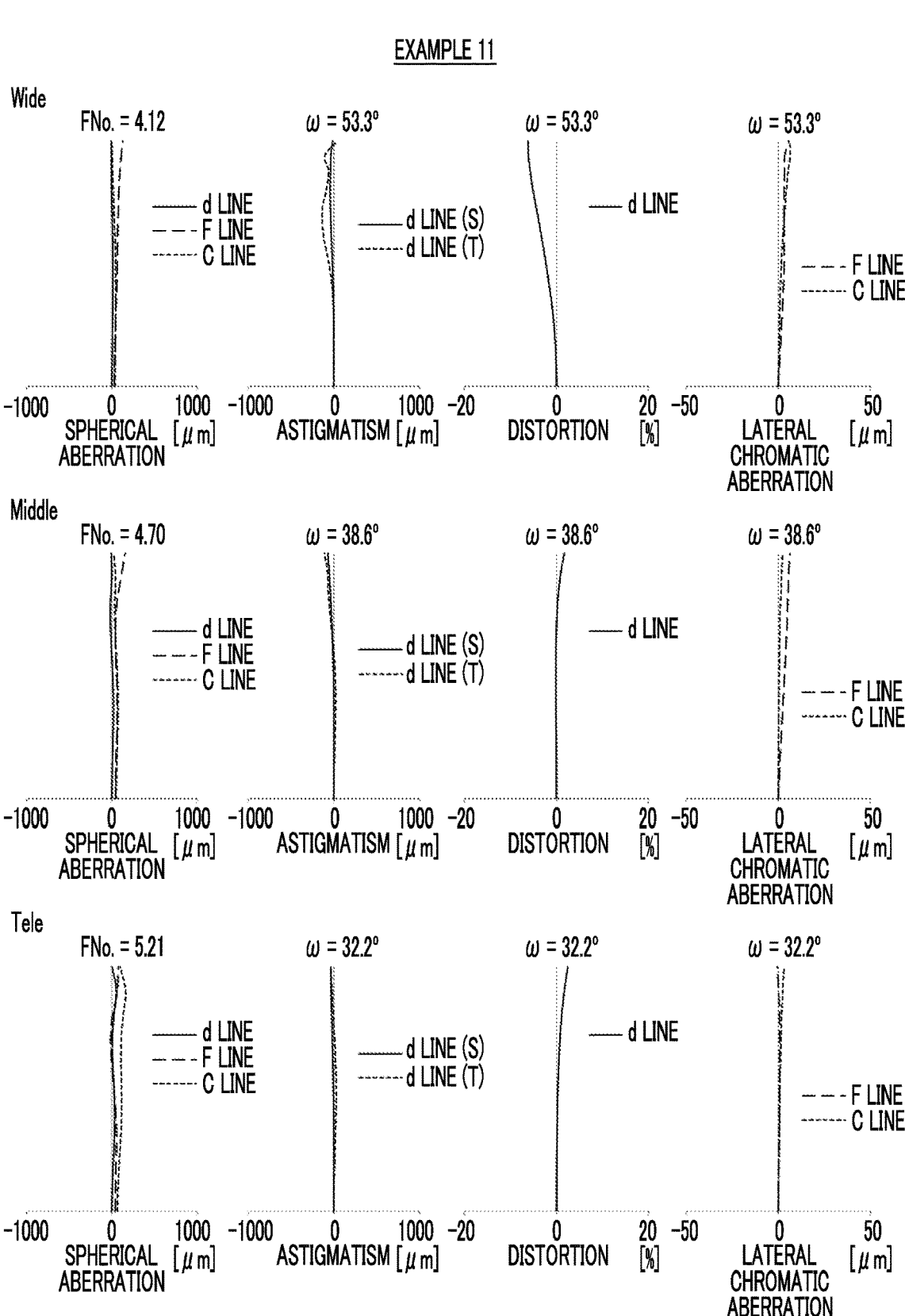
FIG. 25 is a diagram of aberrations of the variable magnification optical system of Example 11.

Regarding the variable magnification optical system of Example 11, Table 31 shows basic lens data, Table 32 shows specifications and variable surface spacings, and Table 33 shows aspherical coefficients thereof. FIG. 25 shows aberration diagrams.

TABLE 31

| | Example 11 | | | | |
|---|---|---|---|---|---|
| Sn | R | D | Nd | vd | ED |
| 1 | 27.6333 | 1.2000 | 2.00001 | 19.17 | 34.6392 |
| 2 | 15.3748 | 5.4547 | | | |
| *3 | 33.3344 | 1.6748 | 1.69893 | 57.77 | |
| *4 | 14.9526 | 18.4395 | | | |
| 5 | −28.5789 | 0.7098 | 1.43199 | 91.51 | |
| 6 | 34.8491 | 2.9623 | 1.80518 | 25.42 | |
| 7 | −228.6641 | DD[7] | | | |
| 8 | 15.2967 | 0.7498 | 1.88222 | 40.14 | |
| 9 | 11.6014 | 5.0102 | 1.43733 | 90.17 | |
| 10 | −119.3628 | 0.2625 | | | |
| **11 | 63.2364 | 0.3000 | 1.51460 | 49.96 | |

TABLE 31-continued

| | Example 11 | | | | |
|---|---|---|---|---|---|
| Sn | R | D | Nd | vd | ED |
| 12 | 1295.3389 | 2.1465 | 1.75584 | 49.54 | |
| 13 | −32.8987 | DD[13] | | | |
| 14(St) | ∞ | 1.9770 | | | |
| 15 | −77.6675 | 0.7600 | 1.61379 | 63.68 | |
| 16 | 16.2820 | 1.9252 | 1.49700 | 81.54 | |
| 17 | 31.6563 | DD[17] | | | |
| 18 | 25.6557 | 0.7498 | 1.82035 | 25.58 | |
| 19 | 18.6762 | 4.0100 | 1.49700 | 81.54 | |
| 20 | −22.4867 | 5.0907 | | | |
| 21 | 196.8007 | 0.7248 | 2.00100 | 29.14 | |
| 22 | 21.9183 | DD[22] | | | |
| 23 | 16.9097 | 6.4351 | 1.43875 | 94.94 | |
| 24 | −19.1016 | 0.7248 | 1.87673 | 41.21 | |
| 25 | 120.0615 | 0.2500 | 1.51460 | 49.96 | |
| **26 | 729.5700 | 0.5458 | | | |
| *27 | 500.0898 | 1.4248 | 1.82098 | 23.95 | |
| *28 | −499.9171 | DD[28] | | | 19.9720 |

TABLE 32

| | Example 11 | | |
|---|---|---|---|
| | Wide | Middle | Tele |
| Zr | 1.0 | 1.6 | 2.0 |
| f | 17.18 | 26.63 | 33.50 |
| Bf | 18.77 | 29.57 | 37.23 |
| FNo. | 4.12 | 4.70 | 5.21 |
| 2ω[°] | 106.6 | 77.2 | 64.4 |
| DD[7] | 12.52 | 3.40 | 0.12 |
| DD[13] | 0.10 | 0.99 | 1.41 |
| DD[17] | 6.30 | 3.42 | 1.84 |
| DD[22] | 0.70 | 0.71 | 0.82 |
| DD[28] | 18.77 | 29.57 | 37.23 |

TABLE 33

| | Example 11 | | |
|---|---|---|---|
| Sn | 3 | 4 | 11 |
| KA | 1.0000000E+00 | 1.0000000E+00 | 1.0000000E+00 |
| A4 | 3.3593488E−05 | 2.1567152E−05 | −5.3364769E−05 |
| A6 | −3.6763475E−08 | −1.1238790E−08 | 2.1545487E−08 |
| A8 | −2.2526319E−10 | −1.1023331E−09 | −7.0398886E−10 |
| A10 | 1.2481991E−12 | 1.8423848E−12 | 9.3133970E−12 |

| Sn | 26 | 27 | 28 |
|---|---|---|---|
| KA | 1.0000000E+00 | 1.0000000E+00 | 1.0000000E+00 |
| A4 | 5.9090039E−06 | −6.1691246E−05 | −2.2940983E−05 |
| A6 | −9.5506616E−08 | 7.6758990E−09 | 6.2298634E−08 |

TABLE 33-continued

| | Example 11 | | |
|---|---|---|---|
| A8 | 2.1171184E−09 | 4.1844277E−10 | 8.4732982E−10 |
| A10 | −7.0602838E−12 | 5.9890105E−12 | −7.2714800E−13 |

Example 12

Figure 26:
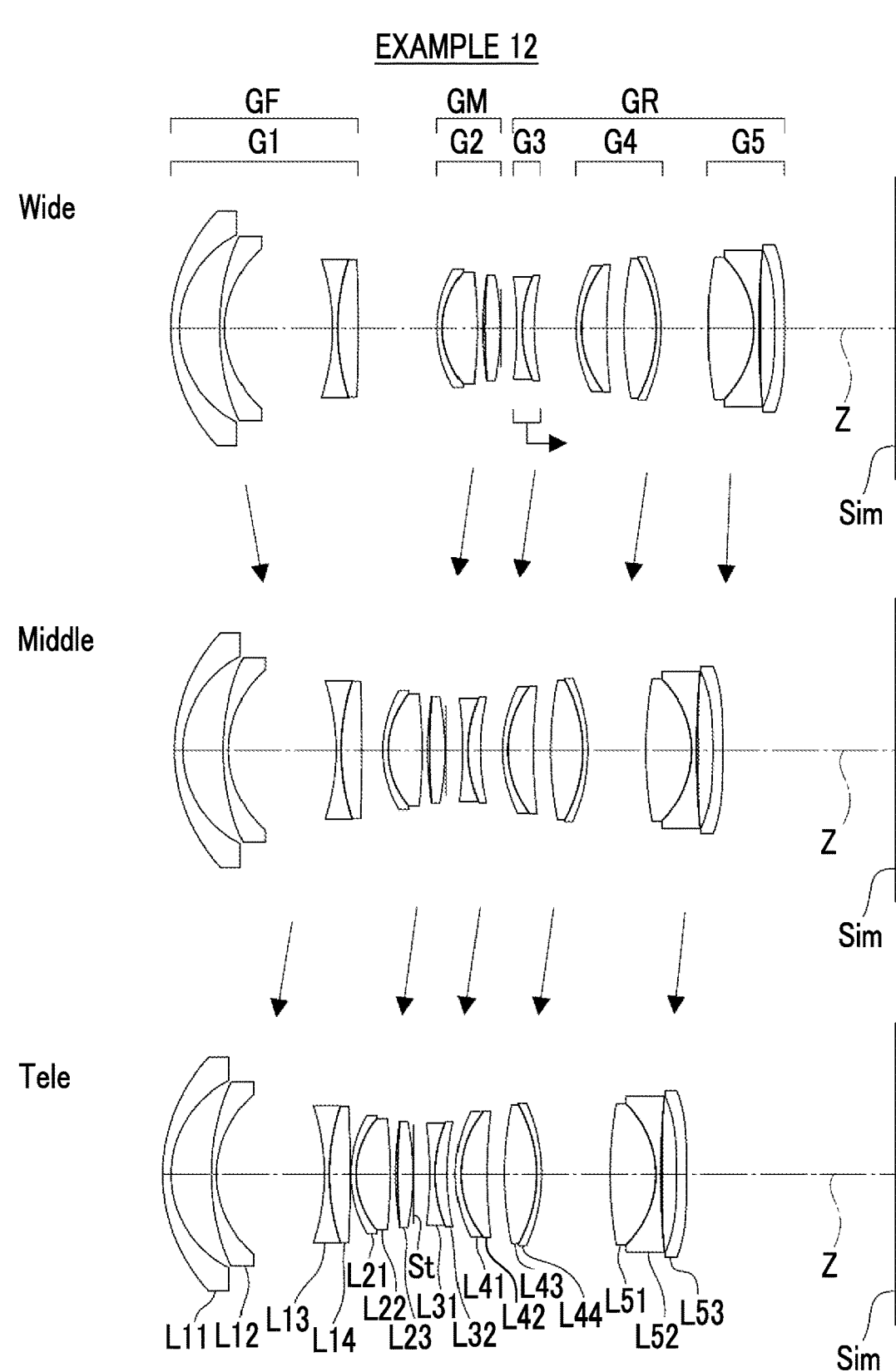
FIG. 26 is a cross-sectional view showing a configuration of a variable magnification optical system of Example 12 and is a diagram showing movement directions.

FIG. 26 shows a configuration and movement directions of the variable magnification optical system of Example 12. The variable magnification optical system shown in Example 12 consists of, in order from the object side to the image side, a first lens group G1 that has a negative refractive power, a second lens group G2 that has a positive refractive power, a third lens group G3 that has a negative refractive power, a fourth lens group G4 that has a positive refractive power, and a fifth lens group G5 that has a negative refractive power. The first lens group G1 consists of four lenses L11 to L14, in order from the object side to the image side. The second lens group G2 consists of three lenses L21 to L23, in order from the object side to the image side. The third lens group G3 consists of two lenses, the aperture stop St and lenses L31 and L32, in order from the object side to the image side. The fourth lens group G4 consists of four lenses L41 to L44, in order from the object side to the image side. The fifth lens group G5 consists of three lenses L51 to L53, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves to the image side.

Figure 27:
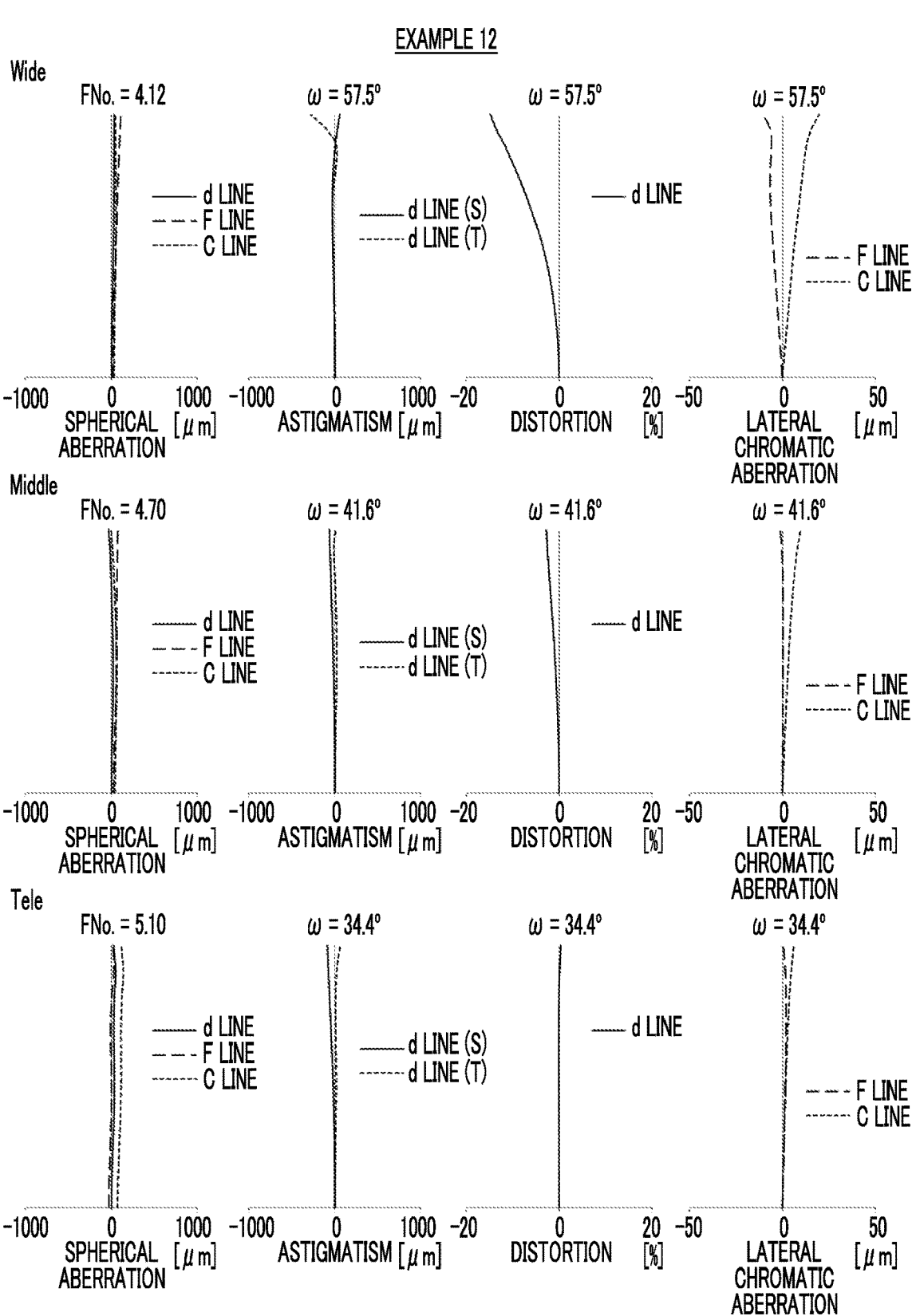
FIG. 27 is a diagram of aberrations of the variable magnification optical system of Example 12.

Regarding the variable magnification optical system of Example 12, Table 34 shows basic lens data, Table 35 shows specifications and variable surface spacings, and Table 36 shows aspherical coefficients thereof. FIG. 27 shows aberration diagrams.

TABLE 34

| | Example 12 | | | | |
|---|---|---|---|---|---|
| Sn | R | D | Nd | vd | ED |
| 1 | 24.5085 | 1.2000 | 2.00001 | 24.00 | 33.5238 |
| 2 | 15.0301 | 5.7963 | | | |
| *3 | 35.3235 | 0.6950 | 1.78902 | 41.10 | |
| *4 | 14.4608 | 15.4308 | | | |
| 5 | −31.2009 | 0.7042 | 1.48219 | 74.12 | |
| 6 | 31.2579 | 2.9701 | 1.80518 | 25.42 | |
| 7 | −247.1545 | DD[7] | | | |
| 8 | 16.8425 | 0.7498 | 1.89381 | 37.21 | |
| 9 | 12.3230 | 4.8833 | 1.46637 | 61.31 | |
| 10 | −74.4242 | 0.7678 | | | |
| **11 | 43.8792 | 0.3000 | 1.51460 | 49.96 | |
| 12 | 87.4630 | 2.2065 | 1.69424 | 53.63 | |
| 13 | −38.4772 | DD[13] | | | |
| 14(St) | ∞ | 2.2923 | | | |
| 15 | −54.9221 | 0.7501 | 1.81462 | 47.56 | |
| 16 | 19.3686 | 1.7092 | 1.49700 | 81.54 | |
| 17 | 34.1421 | DD[17] | | | |
| 18 | 19.8427 | 0.7501 | 1.87568 | 29.14 | |
| 19 | 14.6337 | 3.6512 | 1.49700 | 81.54 | |

TABLE 34-continued

| | Example 12 | | | | |
|---|---|---|---|---|---|
| Sn | R | D | Nd | vd | ED |
| 20 | 78.0317 | 2.4998 | | | |
| 21 | 51.2564 | 4.5981 | 1.62041 | 60.29 | |
| 22 | −20.3849 | 0.7248 | 2.00100 | 29.14 | |
| 23 | −25.2589 | DD[23] | | | |
| 24 | 58.4403 | 6.5387 | 1.43875 | 94.94 | |
| 25 | −14.1156 | 0.7248 | 1.88852 | 40.00 | |
| 26 | 123.9755 | 0.2500 | 1.51460 | 49.96 | |
| **27 | −953.8991 | 2.0120 | | | |
| *28 | −124.9856 | 1.4251 | 1.82098 | 46.91 | |
| *29 | −500.0774 | DD[29] | | | 23.9188 |

TABLE 35

| | Example 12 | | |
|---|---|---|---|
| | Wide | Middle | Tele |
| Zr | 1.0 | 1.6 | 2.0 |
| f | 16.17 | 25.06 | 31.53 |
| Bf | 15.87 | 24.73 | 29.85 |
| FNo. | 4.12 | 4.70 | 5.10 |
| 2ω[°] | 115.0 | 83.2 | 68.8 |
| DD[7] | 11.27 | 3.02 | 0.12 |
| DD[13] | 0.10 | 0.15 | 0.10 |
| DD[17] | 6.03 | 3.18 | 1.18 |
| DD[23] | 6.67 | 8.36 | 9.86 |
| DD[29] | 15.87 | 24.73 | 29.85 |

TABLE 36

| | Example 12 | | |
|---|---|---|---|
| Sn | 3 | 4 | 11 |
| KA | 1.0000000E+00 | 1.0000000E+00 | 1.0000000E+00 |
| A4 | 4.4765856E−06 | −1.3200954E−05 | −3.2592744E−05 |
| A6 | 3.4454236E−08 | −9.4252307E−09 | 2.5368728E−08 |
| A8 | −2.2291242E−10 | −4.6565256E−10 | −7.7867930E−10 |
| A10 | 8.2773483E−13 | −9.5109981E−14 | 9.3179471E−12 |
| Sn | 27 | 28 | 29 |
| KA | 1.0000000E+00 | 1.0000000E+00 | 1.0000000E+00 |
| A4 | 2.2761456E−05 | −7.5765999E−05 | −6.7993101E−05 |
| A6 | −5.9779586E−08 | −5.1376624E−08 | 7.8661408E−09 |
| A8 | 7.2193466E−10 | 3.0507157E−10 | 3.2822075E−10 |
| A10 | −1.7204926E−12 | 1.4721016E−12 | −4.6684443E−13 |

Example 13

Figure 28:
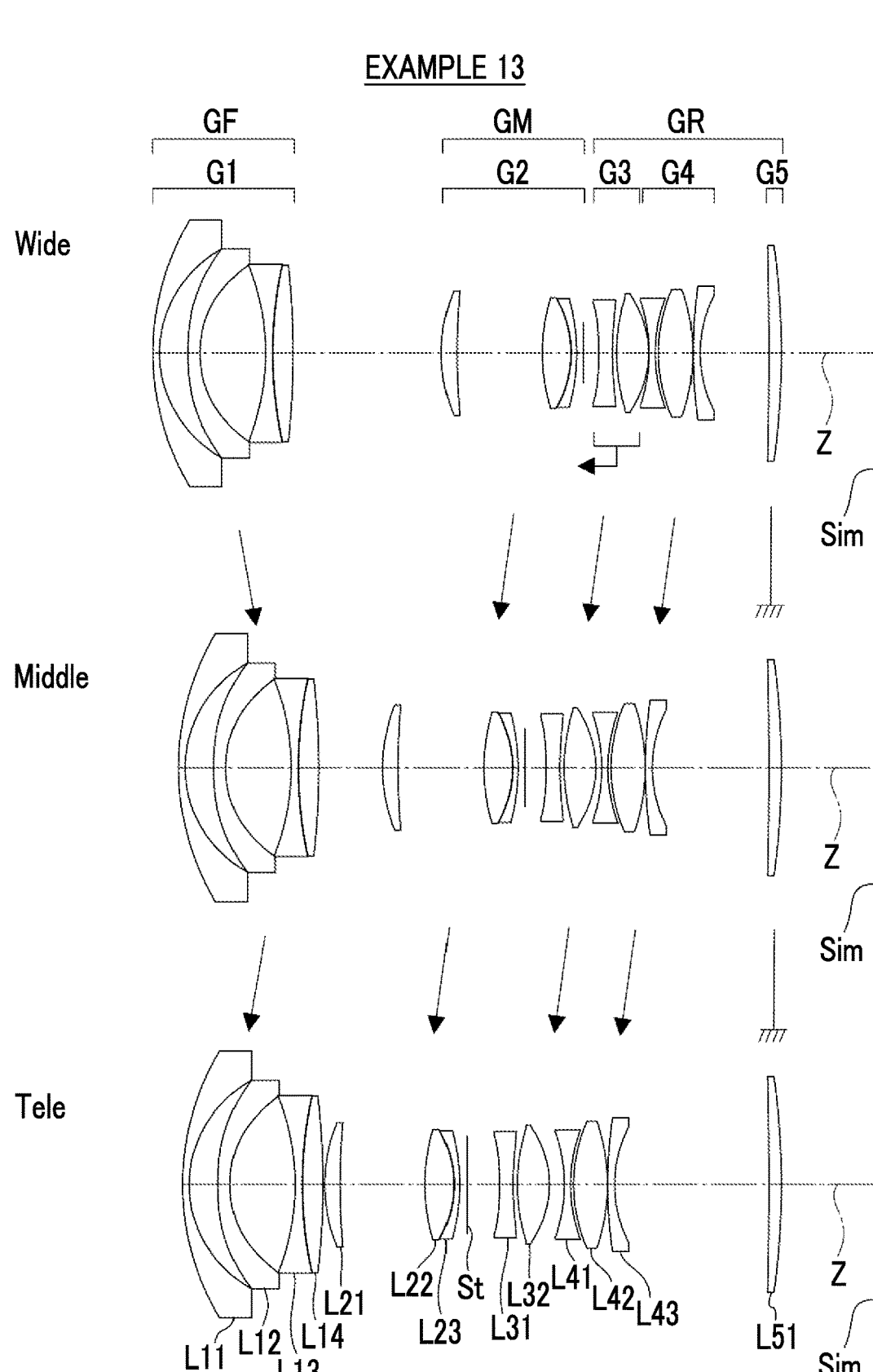
FIG. 28 is a cross-sectional view showing a configuration of a variable magnification optical system of Example 13 and is a diagram showing movement directions.

FIG. 28 shows a configuration and movement directions of the variable magnification optical system of Example 13. The variable magnification optical system shown in Example 13 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of three lenses L41 to L43, in order from the object side to the image side. The fifth lens group G5 consists of one lens L51.

During magnification change, the first lens group G1, the second lens group G2, the third lens group G3, and the fourth lens group G4 move along the optical axis Z by changing the spacing between adjacent lens groups, and the fifth lens group G5 remains stationary with respect to the image plane Sim. The ground symbols noted below the fifth lens group G5 in the upper and middle parts of FIG. 28 indicate that the fifth lens group G5 remains stationary with respect to the image plane Sim during magnification change. The method of showing the ground symbol is similar in the cross-sectional views of other examples. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves toward the object side.

Regarding the variable magnification optical system of Example 13, Table 37 shows basic lens data, Table 38 shows specifications and variable surface spacings, and Table 39 shows aspherical coefficients thereof. FIG. 29 shows aberration diagrams.

TABLE 37

Example 13

| Sn | R | D | Nd | vd | ED |
|----|-----|-----|-----|-----|-----|
| 1 | 41.31400 | 0.957 | 1.81786 | 47.23 | 40.8 |
| 2 | 18.61214 | 4.164 | | | |
| *3 | 44.78912 | 1.770 | 1.99999 | 19.38 | |
| *4 | 19.23066 | 9.492 | | | |
| 5 | −37.62991 | 1.038 | 1.51673 | 62.74 | |
| 6 | 66.29311 | 3.000 | 2.00272 | 19.32 | |

TABLE 37-continued

Example 13

| Sn | R | D | Nd | vd | ED |
|----|-----|-----|-----|-----|-----|
| 7 | −124.99412 | DD[7] | | | |
| 8 | 26.35896 | 2.241 | 1.84924 | 39.24 | |
| 9 | 109.39276 | 12.380 | | | |
| 10 | 31.17424 | 4.190 | 1.64075 | 60.62 | |
| 11 | −17.57407 | 0.800 | 1.91890 | 31.14 | |
| 12 | −32.69369 | 1.000 | | | |
| 13(St) | ∞ | DD[13] | | | |
| *14 | −71.56806 | 2.000 | 1.93128 | 26.99 | |
| *15 | 51.05506 | 0.632 | | | |
| *16 | 30.26086 | 4.666 | 1.59201 | 67.02 | |
| *17 | −15.85655 | DD[17] | | | |
| 18 | −25.81760 | 0.900 | 1.95272 | 31.31 | |
| 19 | 25.20563 | 0.446 | | | |
| 20 | 25.20563 | 5.000 | 1.71736 | 29.50 | |
| 21 | −31.06412 | 0.031 | | | |
| 22 | 78.25534 | 1.000 | 1.80633 | 48.41 | |
| 23 | 20.22523 | DD[23] | | | |
| 24 | −790.88944 | 1.833 | 1.98613 | 16.48 | |
| 25 | −124.99538 | 13.766 | | | 33 |

TABLE 38

Example 13

| | Wide | Middle | Tele |
|----|-----|-----|-----|
| Zr | 1.0 | 1.5 | 2.1 |
| f | 16.486 | 24.351 | 34.373 |
| Bf | 13.766 | 13.766 | 13.766 |
| FNo. | 4.10 | 4.10 | 4.10 |
| 2ω[°] | 112.8 | 83.0 | 61.6 |
| DD[7] | 21.587 | 9.307 | 0.266 |
| DD[13] | 2.258 | 3.092 | 4.714 |
| DD[17] | 0.072 | 0.862 | 2.185 |
| DD[23] | 10.034 | 16.953 | 22.455 |

TABLE 39

Example 13

| Sn | 3 | 4 | 14 | 15 |
|----|-----|-----|-----|-----|
| KA | −1.4905681E+00 | 1.9433780E−01 | 1.0000000E+00 | 1.0000000E+00 |
| A4 | 8.0928661E−05 | 9.9895248E−05 | −1.0867392E−04 | −5.1104925E−05 |
| A6 | −3.8322221E−07 | −2.3640572E−07 | 6.5886311E−07 | 7.4247331E−07 |
| A8 | 1.2035826E−09 | −5.7736106E−10 | −1.3728318E−08 | −6.6587598E−09 |
| A10 | −1.9722083E−12 | 8.2568096E−12 | 1.1510409E−10 | 6.2154176E−12 |
| A12 | 1.0994088E−15 | −2.0416100E−14 | −1.2102219E−12 | −6.2120862E−13 |

| Sn | 16 | 17 |
|----|-----|-----|
| KA | 1.0000000E+00 | 1.0000000E+00 |
| A4 | −5.7894315E−06 | 9.4066802E−06 |
| A6 | −1.3344483E−07 | −1.1796667E−07 |
| A8 | 2.6516087E−09 | −3.6872037E−09 |
| A10 | −1.6747864E−11 | 8.0225160E−11 |
| A12 | 3.6469622E−14 | 1.6231650E−13 |
| A14 | 4.4080159E−16 | −6.9553217E−15 |
| A16 | 3.3285194E−18 | 6.9693881E−17 |

Example 14

Figure 30:
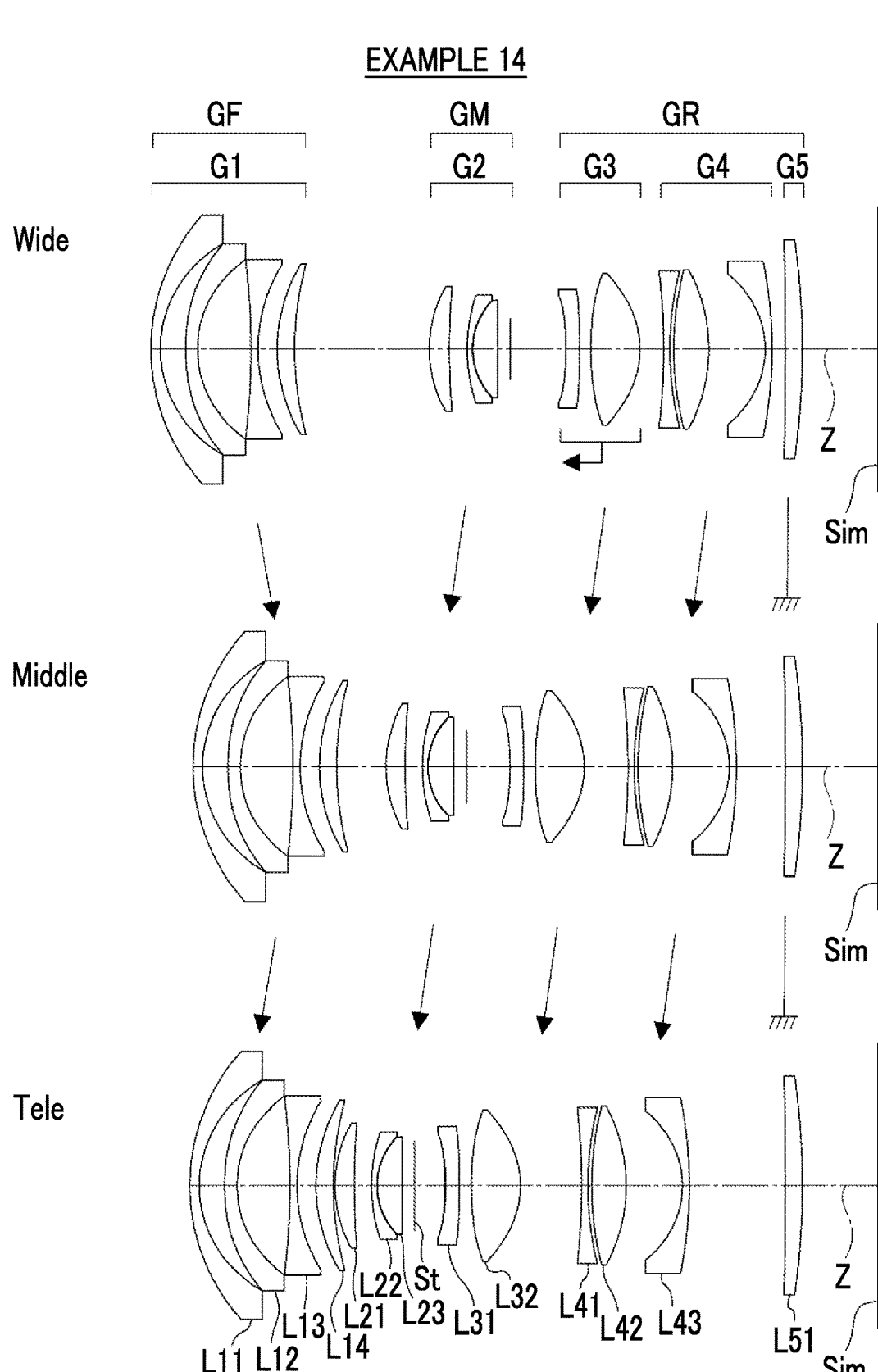
FIG. 30 is a cross-sectional view showing a configuration of a variable magnification optical system of Example 14 and is a diagram showing movement directions.

FIG. 30 shows a configuration and movement directions of the variable magnification optical system of Example 14. The variable magnification optical system shown in Example 14 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of three lenses L41 to L43, in order from the object side to the image side. The fifth lens group G5 consists of one lens L51.

During magnification change, the first lens group G1, the second lens group G2, the third lens group G3, and the fourth lens group G4 move along the optical axis Z by changing the spacing between adjacent lens groups, and the fifth lens group G5 remains stationary with respect to the image plane Sim. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves toward the object side.

Regarding the variable magnification optical system of Example 14, Table 40 shows basic lens data, Table 41 shows specifications and variable surface spacings, and Table 42 shows aspherical coefficients thereof. FIG. 31 shows aberration diagrams.

TABLE 40

| | | Example 14 | | | |
|---|---|---|---|---|---|
| Sn | R | D | Nd | νd | ED |
| 1 | 31.70514 | 1.375 | 1.97710 | 19.75 | |
| 2 | 18.67969 | 3.684 | | | 39.6724 |
| *3 | 37.87380 | 1.750 | 1.73153 | 56.06 | |
| *4 | 19.37462 | 1.655 | | | |
| 5 | −115.60686 | 1.000 | 1.51012 | 79.61 | |
| 6 | 25.38292 | 2.784 | | | |
| 7 | 26.10806 | 2.524 | 1.94595 | 17.98 | |
| 8 | 51.11787 | DD[8] | | | |
| 9 | 20.38497 | 2.802 | 1.69804 | 30.14 | |
| 10 | 119.15606 | 2.500 | | | |
| 11 | 27.16250 | 0.800 | 1.97411 | 31.25 | |
| 12 | 11.11072 | 3.614 | 1.49600 | 70.77 | |
| 13 | 2513.26175 | 1.830 | | | |
| 14(St) | ∞ | DD[14] | | | |
| *15 | −57.08219 | 2.000 | 1.99907 | 23.75 | |
| *16 | −167.35098 | 1.665 | | | |
| *17 | 52.96271 | 7.132 | 1.49710 | 81.56 | |
| *18 | −14.97572 | DD[18] | | | |
| 19 | −105.04188 | 0.900 | 1.61552 | 39.61 | |
| 20 | 50.90354 | 0.560 | | | |
| 21 | 50.90354 | 5.006 | 1.49700 | 81.61 | |
| 22 | −26.71829 | 8.170 | | | |
| 23 | −14.67360 | 1.000 | 1.75995 | 53.16 | |
| 24 | −69.92374 | DD[24] | | | |
| 25 | −986.90393 | 2.500 | 1.54072 | 47.23 | |
| 26 | −125.42335 | 10.990 | | | 33.25 |

TABLE 41

| | Example 14 | | |
|---|---|---|---|
| | Wide | Middle | Tele |
| Zr | 1.0 | 1.5 | 2.1 |
| f | 16.484 | 24.348 | 34.369 |
| Bf | 10.990 | 10.990 | 10.990 |
| FNo. | 4.10 | 4.10 | 4.10 |
| 2ω[°] | 112.6 | 84.6 | 64.0 |
| DD[8] | 19.555 | 7.146 | 0.222 |
| DD[14] | 8.072 | 6.250 | 4.384 |
| DD[18] | 3.446 | 6.382 | 8.907 |
| DD[24] | 1.895 | 7.079 | 13.810 |

TABLE 42

| | | Example 14 | | |
|---|---|---|---|---|
| Sn | 3 | 4 | 15 | 16 |
| KA | 1.8799421E+00 | 1.3927367E+00 | 1.0000000E+00 | 1.0000000E+00 |
| A4 | 6.4380274E−05 | 6.5557943E−05 | −8.1533415E−05 | −2.4618510E−05 |
| A6 | −3.1862506E−07 | −2.9608686E−07 | −1.1824316E−07 | 4.1195288E−08 |
| A8 | 1.0738356E−09 | 2.5305407E−10 | −1.3980330E−11 | 8.7116267E−10 |
| A10 | −2.2335230E−12 | 1.3512151E−12 | −4.5482025E−11 | −4.2773473E−11 |
| A12 | 2.2909647E−15 | −5.9115118E−15 | −1.7328003E−13 | 1.0305692E−13 |

| Sn | 17 | 18 |
|---|---|---|
| KA | 1.0000000E+00 | 1.0000000E+00 |
| A4 | 2.9822209E−05 | 8.4915816E−06 |
| A6 | −4.9302586E−08 | 3.0317716E−08 |
| A8 | −3.1301674E−10 | 4.6141211E−10 |
| A10 | 1.7387281E−12 | 1.0102684E−12 |
| A12 | 2.2981120E−14 | 5.8583953E−14 |
| A14 | −2.1271494E−16 | −2.2513521E−16 |
| A16 | 7.5973872E−19 | 8.3397304E−19 |

Example 15

Figure 32:
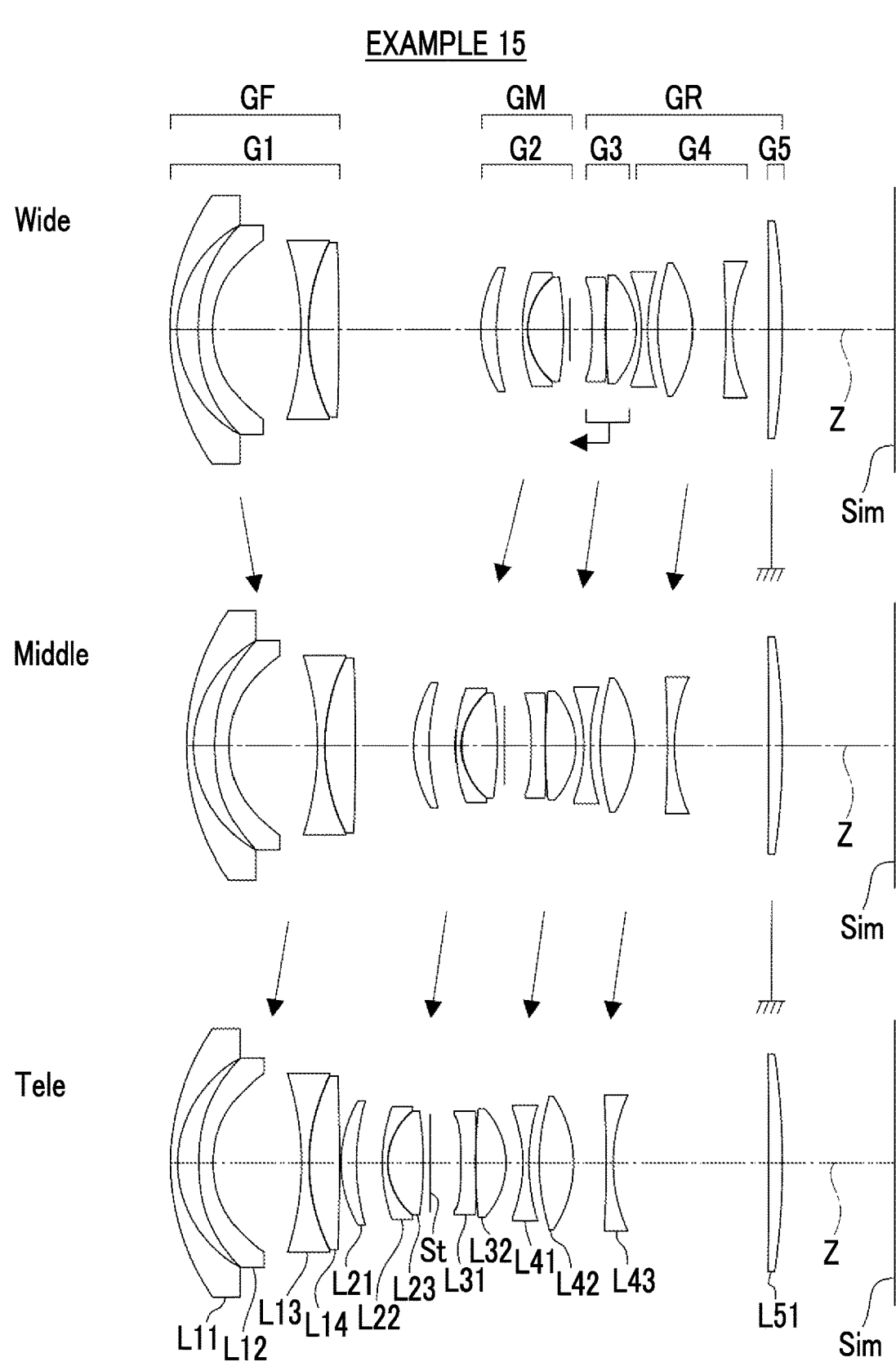
FIG. 32 is a cross-sectional view showing a configuration of a variable magnification optical system of Example 15 and is a diagram showing movement directions.

FIG. 32 shows a configuration and movement directions of the variable magnification optical system of Example 15. The variable magnification optical system shown in Example 15 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23 and an aperture stop St, in order from the object side to the image side. The third lens group G3 consists of two lenses L31 and L32, in order from the object side to the image side. The fourth lens group G4 consists of three lenses L41 to L43, in order from the object side to the image side. The fifth lens group G5 consists of one lens L51.

During magnification change, the first lens group G1, the second lens group G2, the third lens group G3, and the fourth lens group G4 move along the optical axis Z by changing the spacing between adjacent lens groups, and the fifth lens group G5 remains stationary with respect to the image plane Sim. The front group GF consists of the first lens group G1. The middle group GM consists of the second lens group G2. The rear group GR consists of the third lens group G3, the fourth lens group G4, and the fifth lens group G5. The focusing group consists of the third lens group G3. During focusing from the infinite distance object to the short range object, the focusing group moves toward the object side.

Regarding the variable magnification optical system of Example 15, Table 43 shows basic lens data, Table 44 shows specifications and variable surface spacings, and Table 45 shows aspherical coefficients thereof. FIG. 33 shows aberration diagrams.

TABLE 43

| | | | Example 15 | | |
|---|---|---|---|---|---|
| Sn | R | D | Nd | νd | ED |
| 1 | 37.20509 | 1.018 | 1.99999 | 19.62 | 39.9789 |
| 2 | 18.55483 | 3.081 | | | |
| *3 | 37.00124 | 2.065 | 2.00000 | 23.94 | |
| *4 | 19.23063 | 12.784 | | | |
| 5 | −46.17336 | 1.100 | 1.49601 | 72.01 | |
| 6 | 30.86064 | 4.420 | 1.89286 | 20.36 | |
| 7 | −363.89275 | DD[7] | | | |
| 8 | 19.25526 | 2.245 | 1.99997 | 21.34 | |
| 9 | 34.78310 | 3.762 | | | |
| 10 | 27.03042 | 0.800 | 1.86072 | 26.16 | |
| 11 | 10.60563 | 5.160 | 1.58168 | 45.69 | |
| 12 | −55.23272 | 1.000 | | | |
| 13(St) | ∞ | DD[13] | | | |
| *14 | −119.78028 | 2.000 | 2.00178 | 19.32 | |
| *15 | 68.67500 | 0.050 | | | |
| 16 | 89.00224 | 4.416 | 1.49700 | 81.54 | |
| 17 | −12.70786 | DD[17] | | | |
| 18 | −23.58691 | 0.900 | 1.84262 | 23.76 | |
| 19 | 31.87209 | 1.472 | | | |
| *20 | 31.87209 | 5.000 | 1.68893 | 31.16 | |
| *21 | −19.19076 | 4.789 | | | |
| 22 | −177.46983 | 1.000 | 1.70966 | 40.49 | |
| 23 | 26.40011 | DD[23] | | | |
| 24 | −990.61209 | 1.957 | 1.92286 | 18.90 | |
| 25 | −124.99445 | 16.298 | | | 33 |

TABLE 44

| | Example 15 | | |
|---|---|---|---|
| | Wide | Middle | Tele |
| Zr | 1.0 | 1.5 | 2.1 |
| f | 16.479 | 24.341 | 34.358 |
| Bf | 16.298 | 16.298 | 16.298 |
| FNo. | 4.10 | 4.10 | 4.10 |
| 2ω[°] | 112.0 | 82.8 | 62.4 |
| DD[7] | 20.439 | 8.469 | 0.207 |
| DD[13] | 3.169 | 3.930 | 4.370 |
| DD[17] | 0.769 | 1.208 | 2.434 |
| DD[23] | 5.275 | 13.659 | 22.556 |

TABLE 45

| | | | Example 15 | |
|---|---|---|---|---|
| Sn | 3 | 4 | 14 | 15 |
| KA | −2.3193313E+00 | 1.0211492E+00 | 1.0000000E+00 | 1.0000000E+00 |
| A4 | 8.9466184E−05 | 9.0486992E−05 | −2.0719406E−04 | −1.4375882E−04 |
| A6 | −3.0675143E−07 | −2.1984043E−07 | −8.0199339E−08 | 2.6450066E−07 |
| A8 | 7.9447254E−10 | −2.3610291E−10 | −4.0180213E−09 | 3.4005309E−09 |
| A10 | −1.3537298E−12 | 2.3893106E−12 | 7.7739316E−11 | −3.7931594E−11 |
| A12 | 8.4385892E−16 | −7.3897328E−15 | −1.0479556E−12 | 1.0203790E−13 |

| Sn | 20 | 21 |
|---|---|---|
| KA | 1.0000000E+00 | 1.0000000E+00 |
| A4 | −2.5655499E−05 | 2.5115404E−06 |
| A6 | 3.5762973E−08 | −3.5910212E−08 |
| A8 | 3.5432722E−10 | 9.0081497E−11 |
| A10 | −3.7029071E−12 | 9.6926727E−13 |
| A12 | 2.6970794E−14 | −2.8707422E−15 |
| A14 | 1.7690716E−16 | 2.8210773E−16 |
| A16 | −1.7215765E−18 | −1.1677564E−18 |

Example 16

Figure 34:
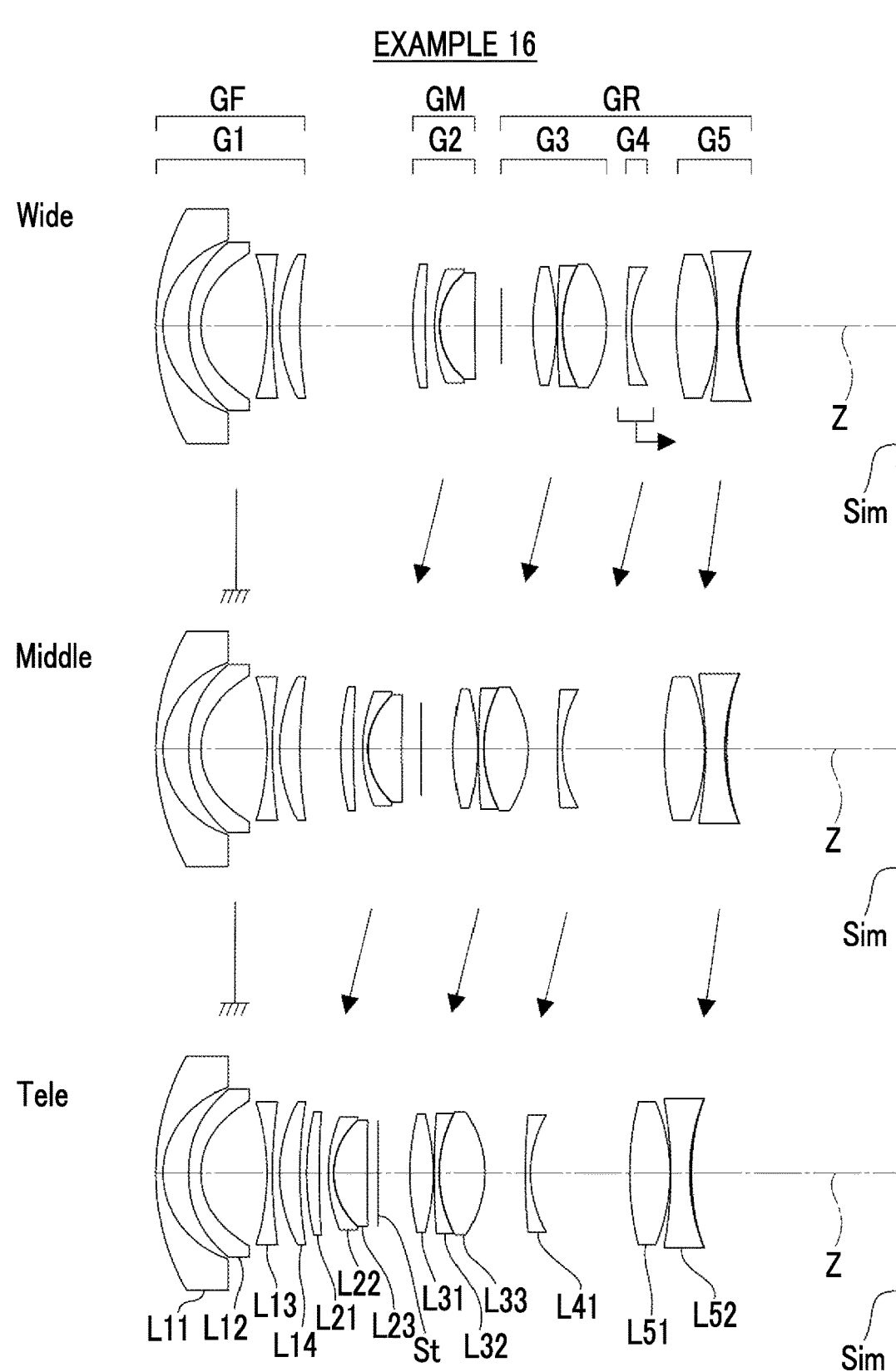
FIG. 34 is a cross-sectional view showing a configuration of a variable magnification optical system of Example 16 and is a diagram showing movement directions.

FIG. 34 shows a configuration and movement directions of the variable magnification optical system of Example 16. The variable magnification optical system shown in Example 16 consists of, in order from the object side to the image side, a first lens group G1 that has a negative refractive power, a second lens group G2 that has a positive refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23, in order from the object side to the image side. The third lens group G3 consists of the aperture stop St and three lenses L31 to L33, in order from the object side to the image side. The fourth lens group G4 consists of one lens L41. The fifth lens group G5 consists of two lenses L51 and L52, in order from the object side to the image side.

During magnification change, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The front group GF consists of the first lens group G1. The middle group GM consists of the second lens group G2. The rear group GR consists of the third lens group G3, the fourth lens group G4, and the fifth lens group G5. The focusing group consists of the fourth lens group G4. During focusing from the infinite distance object to the short range object, the focusing group moves to the image side.

Figure 35:
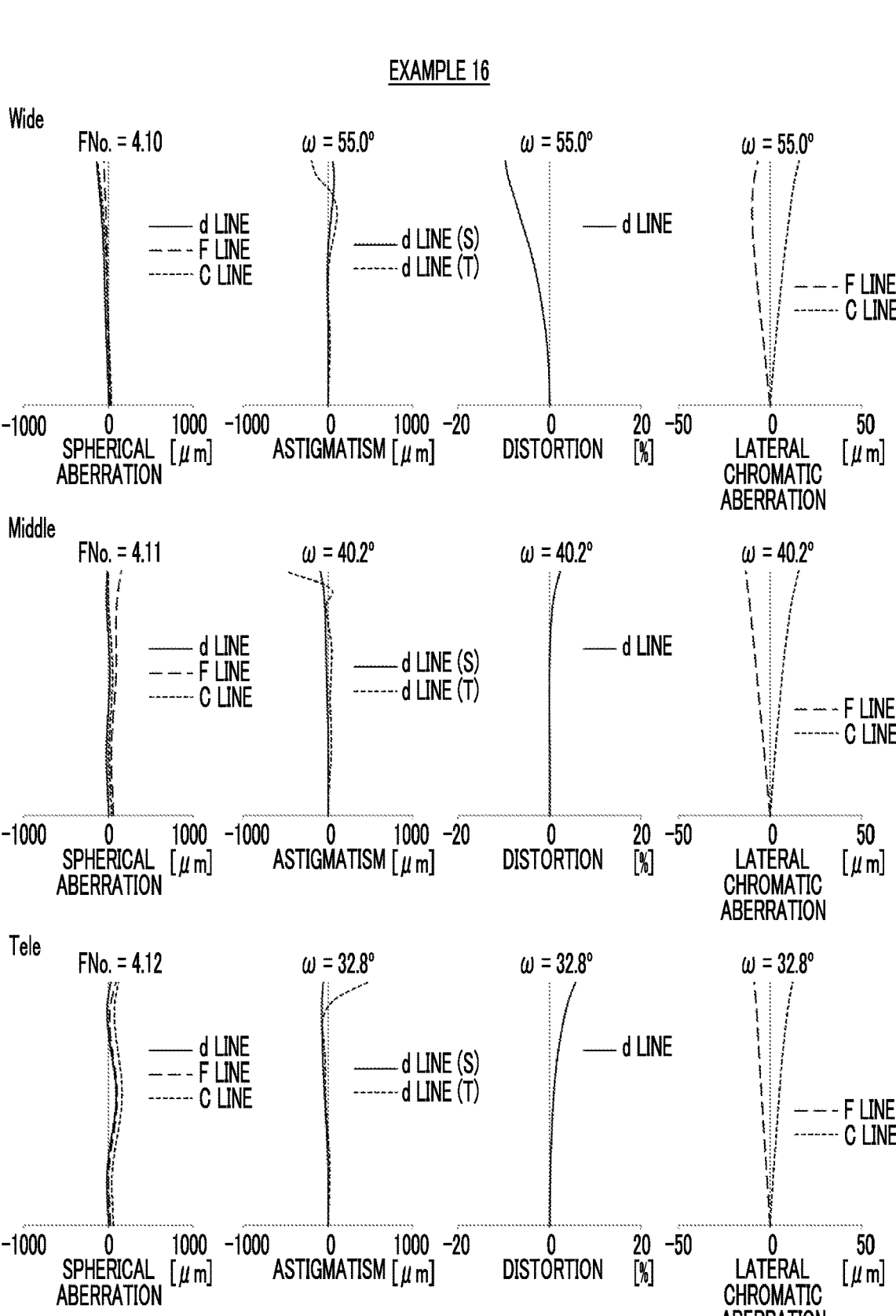
FIG. 35 is a diagram of aberrations of the variable magnification optical system of Example 16.

Regarding the variable magnification optical system of Example 16, Table 46 shows basic lens data, Table 47 shows specifications and variable surface spacings, and Table 48 shows aspherical coefficients thereof. FIG. 35 shows aberration diagrams.

TABLE 46

| | | Example 16 | | | |
|---|---|---|---|---|---|
| Sn | R | D | Nd | vd | ED |
| 1 | 39.4872 | 1.0326 | 1.70674 | 56.16 | 36 |
| 2 | 14.0674 | 3.6385 | | | |
| *3 | 25.2065 | 1.7498 | 1.57852 | 67.92 | |
| *4 | 13.3583 | 9.2698 | | | |
| 5 | −39.3111 | 0.7540 | 1.53548 | 74.54 | |
| 6 | 81.0660 | 1.0461 | | | |
| 7 | 25.2145 | 2.8426 | 1.69895 | 30.13 | |
| 8 | 72.0886 | DD[8] | | | |
| 9 | 44.7514 | 1.7857 | 1.87688 | 26.55 | |
| 10 | 153.9377 | 1.3047 | | | |
| 11 | 24.4931 | 0.7395 | 1.96889 | 31.11 | |
| 12 | 11.5601 | 4.7953 | 1.56505 | 48.14 | |
| 13 | 599.9561 | DD[13] | | | |
| 14(St) | ∞ | 4.4764 | | | |
| *15 | 35.0213 | 3.3586 | 1.49700 | 81.54 | |
| *16 | −32.4201 | 0.0998 | | | |
| 17 | 137.1589 | 0.7388 | 1.83835 | 43.59 | |
| 18 | 21.6396 | 6.2884 | 1.49700 | 81.54 | |
| 19 | −18.1562 | DD[19] | | | |
| 20 | 100.6752 | 0.7400 | 1.72155 | 55.42 | |
| 21 | 19.3715 | DD[21] | | | |
| 22 | 51.4790 | 5.7233 | 1.56883 | 56.36 | |
| 23 | −30.3398 | 0.1002 | | | |
| 24 | −67.0426 | 2.6875 | 1.74172 | 53.83 | |
| 25 | 34.0399 | 0.2500 | 1.51460 | 49.96 | |
| **26 | 44.7895 | DD[26] | | | 22.9376 |

TABLE 47

| | Example 16 | | |
|---|---|---|---|
| | Wide | Middle | Tele |
| Zr | 1.0 | 1.5 | 1.9 |
| f | 16.73 | 25.06 | 31.79 |
| Bf | 22.470 | 24.140 | 29.040 |
| FNo. | 4.10 | 4.11 | 4.12 |
| 2ω[°] | 110.0 | 80.4 | 65.6 |
| DD[8] | 15.99 | 5.82 | 0.97 |
| DD[13] | 3.75 | 2.77 | 1.50 |
| DD[19] | 2.79 | 4.11 | 5.71 |
| DD[21] | 6.31 | 14.48 | 14.10 |
| DD[26] | 22.47 | 24.14 | 29.04 |

TABLE 48

| | Example 16 | | |
|---|---|---|---|
| Sn | 3 | 4 | 15 |
| KA | 9.5290396E−01 | −3.6286075E−01 | 1.7486936E−01 |
| A3 | 7.5071429E−19 | 7.7715612E−19 | −9.0390639E−20 |
| A4 | 1.6177673E−04 | 2.2322033E−04 | −2.0962150E−05 |
| A5 | −6.0055826E−06 | 8.4022625E−07 | −2.9165912E−06 |
| A6 | 3.0580250E−07 | −1.6200383E−06 | 1.3600047E−06 |
| A7 | −1.5870791E−07 | 1.2632681E−07 | −2.1589503E−07 |
| A8 | 1.3309506E−08 | 2.3517569E−10 | −7.6544930E−10 |
| A9 | 5.4909033E−10 | −1.3952450E−09 | 3.4516691E−09 |
| A10 | −9.7747521E−11 | 1.2604751E−10 | −1.6044163E−10 |
| A11 | 8.1276644E−13 | 4.7196763E−12 | −2.4263736E−11 |
| A12 | 2.8329140E−13 | −8.1426600E−13 | 1.3609756E−12 |
| A13 | −7.8468218E−15 | −9.6906514E−15 | 9.2731736E−14 |
| A14 | −3.7913499E−16 | 1.9255935E−15 | −4.2647631E−15 |
| A15 | 1.5816383E−17 | 1.2380133E−17 | −1.8982903E−16 |
| A16 | 1.9466014E−19 | −1.5956928E−18 | 4.6528546E−18 |
| A17 | −1.0619515E−20 | −6.9059370E−21 | 1.6728979E−19 |

| Sn | 16 | 26 |
|---|---|---|
| KA | 4.9310402E−01 | −1.0192531E+00 |
| A3 | −9.0390639E−20 | 0.0000000E+00 |
| A4 | 2.3647356E−05 | 3.0648452E−05 |
| A5 | −4.8436107E−07 | −3.7082174E−06 |
| A6 | 9.7892474E−07 | 4.8103377E−07 |
| A7 | −2.2600180E−07 | 1.6122292E−09 |
| A8 | −1.8292231E−11 | −7.4745412E−09 |
| A9 | 3.8833712E−09 | 6.9192371E−10 |
| A10 | −1.6020421E−10 | 2.7821132E−11 |
| A11 | −3.0248829E−11 | −7.5379211E−12 |
| A12 | 1.3916610E−12 | 7.6699446E−14 |
| A13 | 1.2536878E−13 | 3.8101285E−14 |
| A14 | −4.5032390E−15 | −7.3677435E−16 |
| A15 | −2.6688769E−16 | −1.0365939E−16 |
| A16 | 5.1256230E−18 | 1.3807036E−18 |
| A17 | 2.2957231E−19 | 1.2123772E−19 |

Example 17

Figure 36:
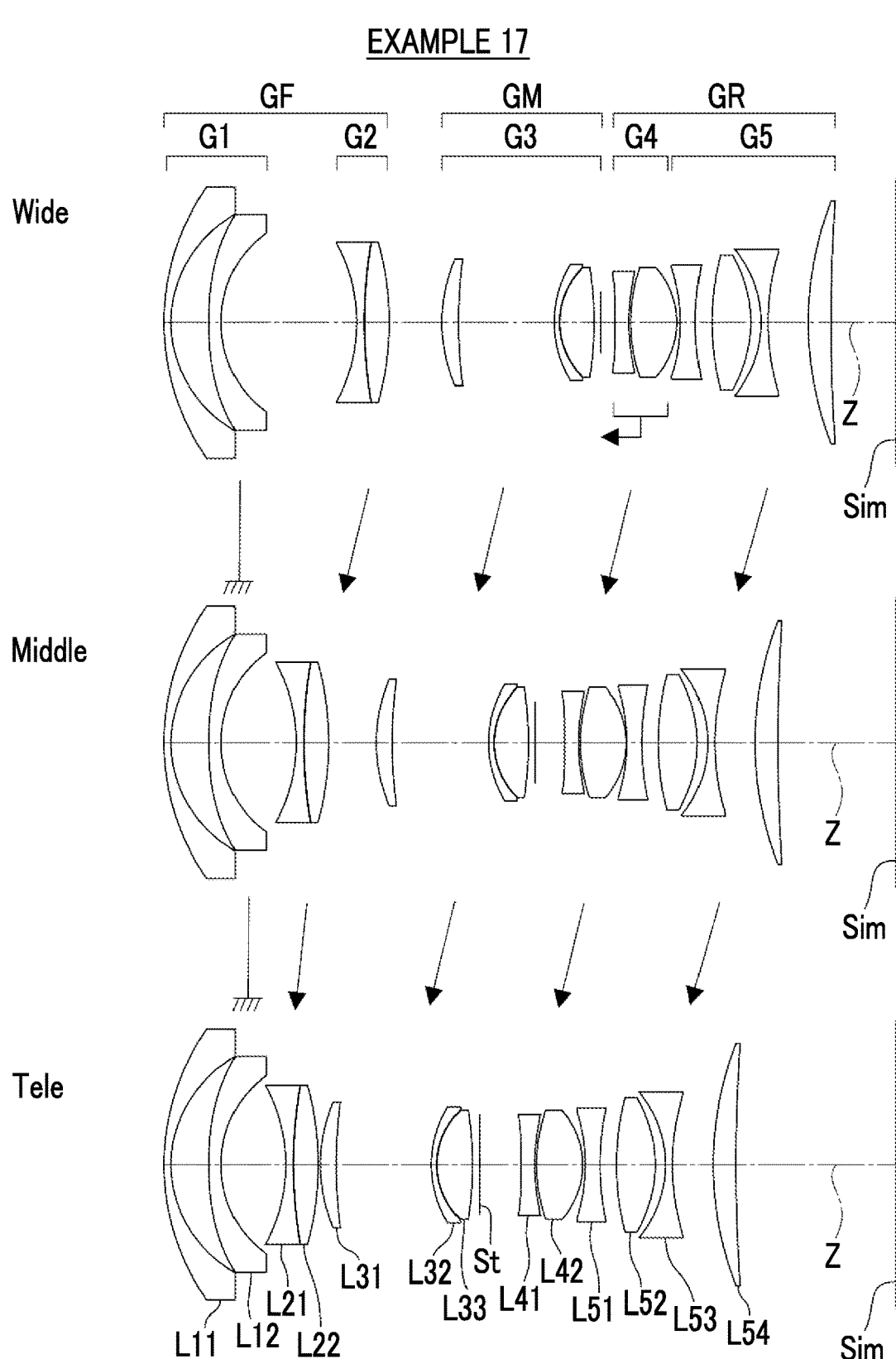
FIG. 36 is a cross-sectional view showing a configuration of a variable magnification optical system of Example 17 and is a diagram showing movement directions.

FIG. 36 shows a configuration and movement directions of the variable magnification optical system of Example 17. The variable magnification optical system shown in Example 17 consists of, in order from the object side to the image side, a first lens group G1 that has a negative refractive power, a second lens group G2 that has a positive refractive power, a third lens group G3 that has a positive refractive power, a fourth lens group G4 that has a positive refractive power, and a fifth lens group G5 that has a negative refractive power. The first lens group G1 consists of two lenses L11 and L12, in order from the object side to the image side. The second lens group G2 consists of two lenses L21 and L22, in order from the object side to the image side. The third lens group G3 consists of three lenses L31 to L33 and the aperture stop St, in order from the object side to the image side. The fourth lens group G4 consists of two lenses L41 and L42, in order from the object side to the image side. The fifth lens group G5 consists of four lenses L51 to L54, in order from the object side to the image side.

During magnification change, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The front group GF consists of the first lens group G1 and the second lens group G2. The middle group GM consists of the third lens group G3. The rear group GR consists of the fourth lens group G4 and the fifth lens group G5. The focusing group consists of the fourth lens group G4. During focusing from the infinite distance object to the short range object, the focusing group moves toward the object side.

Figure 37:
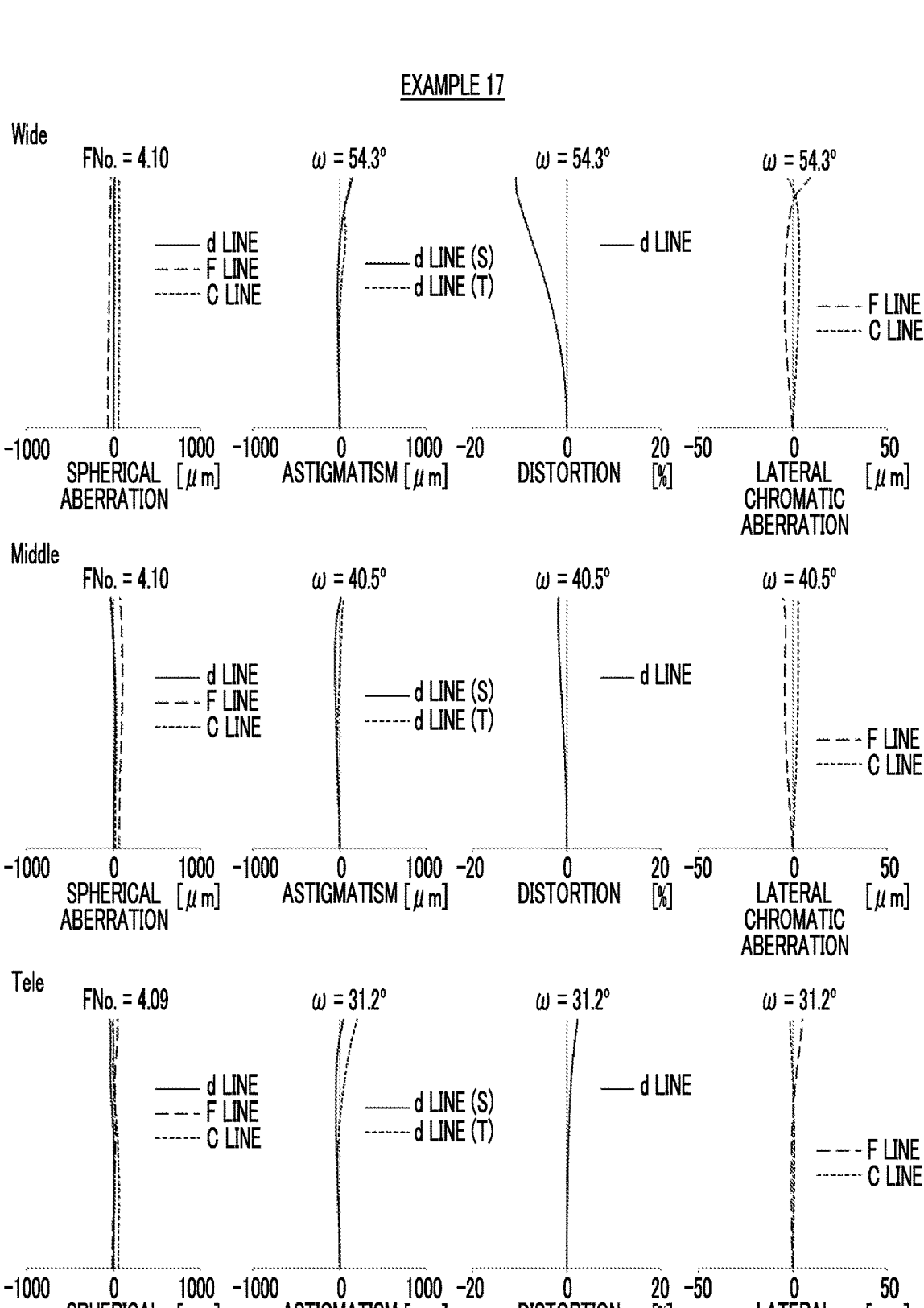
FIG. 37 is a diagram of aberrations of the variable magnification optical system of Example 17.

Regarding the variable magnification optical system of Example 17, Table 49 shows basic lens data, Table 50 shows specifications and variable surface spacings, and Table 51 shows aspherical coefficients thereof. FIG. 37 shows aberration diagrams.

TABLE 49

Example 17

| Sn | R | D | Nd | vd | ED |
|---|---|---|---|---|---|
| 1 | 36.99776 | 1.020 | 1.82941 | 46.05 | 40.5799 |
| 2 | 19.03929 | 5.418 | | | |
| *3 | 55.94377 | 1.750 | 1.82991 | 46.00 | |
| *4 | 19.23079 | DD[4] | | | |
| 5 | −25.90483 | 1.100 | 1.51602 | 62.11 | |
| 6 | 75.20017 | 3.555 | 1.90366 | 31.34 | |
| 7 | −47.28956 | DD[7] | | | |
| 8 | 24.96021 | 2.290 | 1.63930 | 44.87 | |

TABLE 49-continued

Example 17

| Sn | R | D | Nd | vd | ED |
|---|---|---|---|---|---|
| 9 | 75.46798 | 13.667 | | | |
| 10 | 17.58103 | 0.800 | 1.83164 | 45.82 | |
| 11 | 11.95060 | 4.934 | 1.53775 | 74.70 | |
| 12 | −56.11337 | 1.000 | | | |
| 13(St) | ∞ | DD[13] | | | |
| *14 | 979.95384 | 2.000 | 2.00000 | 22.22 | |
| *15 | 30.73810 | 0.266 | | | |
| 16 | 26.36970 | 6.627 | 1.49700 | 81.54 | |
| 17 | −12.91620 | DD[17] | | | |
| 18 | −27.90914 | 2.157 | 2.00000 | 22.76 | |
| 19 | 42.83071 | 2.371 | | | |
| *20 | 42.83071 | 5.576 | 2.00178 | 19.32 | |
| *21 | −20.18573 | 1.480 | | | |
| 22 | −17.77054 | 1.000 | 1.91070 | 37.73 | |
| 23 | 38.19506 | 5.775 | | | |
| 24 | 52.24078 | 3.285 | 1.51742 | 52.43 | |
| 25 | 283.19447 | DD[25] | | | 34.1976 |

TABLE 50

Example 17

| | Wide | Middle | Tele |
|---|---|---|---|
| Zr | 1.0 | 1.5 | 2.0 |
| f | 17.458 | 25.787 | 34.916 |
| Bf | 9.350 | 17.004 | 23.020 |
| FNo. | 4.09 | 4.09 | 4.09 |
| 2ω[°] | 108.6 | 81.0 | 62.4 |
| DD[4] | 19.458 | 10.760 | 9.260 |
| DD[7] | 7.572 | 6.847 | 0.293 |
| DD[13] | 2.034 | 4.189 | 5.946 |
| DD[17] | 0.476 | 0.091 | 0.372 |
| DD[25] | 9.350 | 17.004 | 23.020 |

TABLE 51

Example 17

| Sn | 3 | 4 | 14 | 15 |
|---|---|---|---|---|
| KA | −1.6382494E+01 | 1.2986726E−01 | 1.0000000E+00 | 1.0000000E+00 |
| A4 | 5.1911300E−05 | 5.6379457E−05 | −1.0165133E−04 | −3.4841750E−05 |
| A6 | −1.9918278E−07 | −8.6780997E−08 | −3.5165575E−07 | −9.3868369E−08 |
| A8 | 6.6692993E−10 | 2.2405873E−11 | −1.9519490E−11 | 1.3567529E−09 |
| A10 | −1.1957382E−12 | 2.7719699E−12 | −9.3308666E−11 | −5.5417309E−11 |
| A12 | 8.3676163E−16 | −6.8747257E−15 | 8.1434768E−13 | 6.3210387E−13 |

| Sn | 20 | 21 |
|---|---|---|
| KA | 1.0000000E+00 | 1.0000000E+00 |
| A4 | −3.1705697E−06 | 4.7581627E−06 |
| A6 | 5.7045455E−08 | 2.8798346E−08 |
| A8 | 3.2941508E−10 | 3.5494761E−10 |
| A10 | −3.3326125E−12 | −1.3727960E−12 |
| A12 | 1.8743488E−16 | −1.2372923E−14 |
| A14 | 3.6097124E−16 | 4.8251101E−16 |
| A16 | −2.2405974E−18 | −2.7693429E−18 |

Example 18

Figure 38:
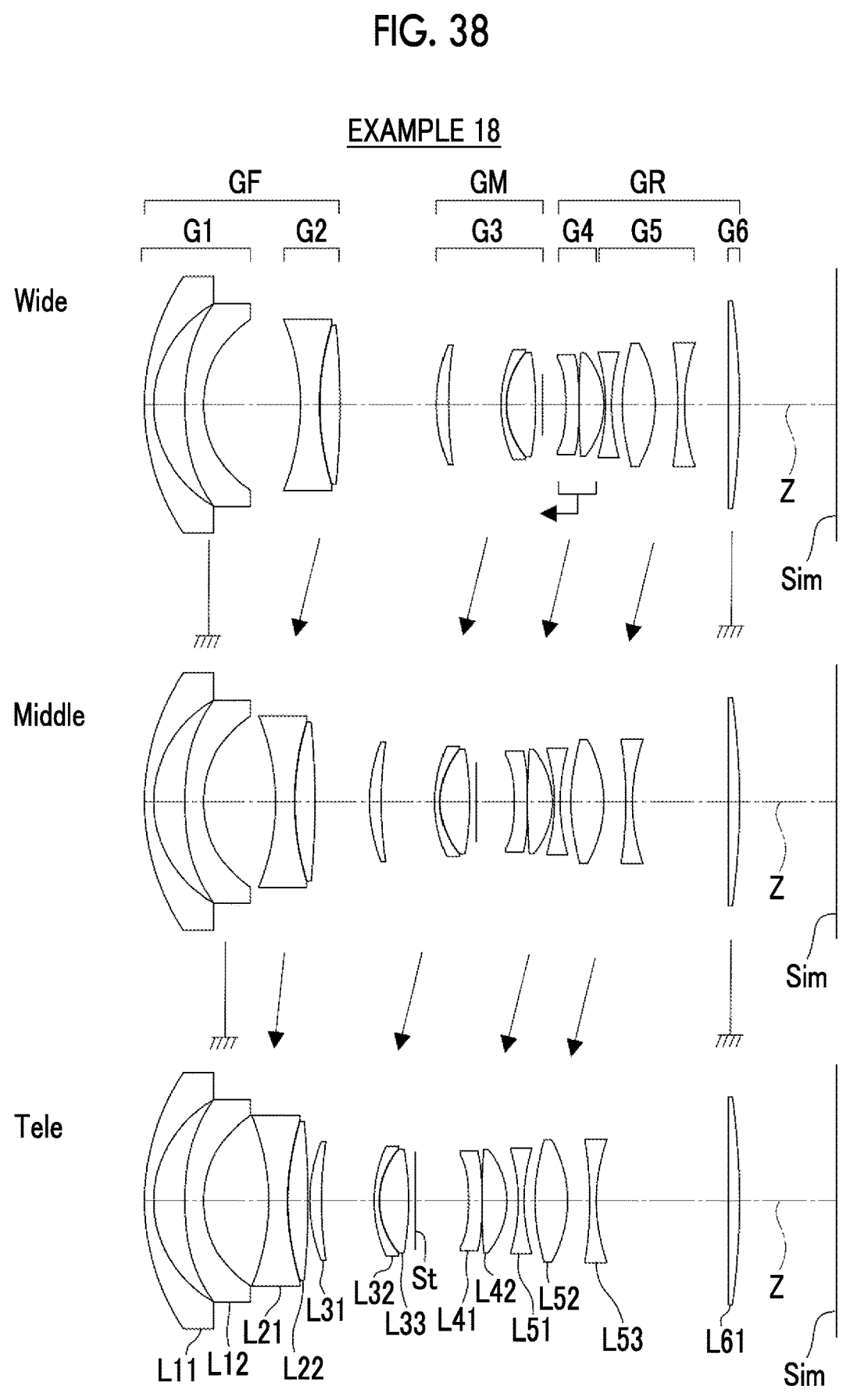

FIG. 38 shows a configuration and movement directions of the variable magnification optical system of Example 18. The variable magnification optical system of Example 18 consists of, in order from the object side to the image side, a first lens group G1 that has a negative refractive power, a second lens group G2 that has a positive refractive power, a third lens group G3 that has a positive refractive power, a fourth lens group G4 that has a positive refractive power, a fifth lens group G5 that has a negative refractive power, and a sixth lens group G6 that has a positive refractive power. The first lens group G1 consists of two lenses L11 and L12, in order from the object side to the image side. The second lens group G2 consists of two lenses L21 and L22, in order from the object side to the image side. The third lens group G3 consists of three lenses L31 to L33 and the aperture stop St, in order from the object side to the image side. The fourth lens group G4 consists of two lenses L41 and L42, in order from the object side to the image side. The fifth lens group G5 consists of three lenses L51 to L53, in order from the object side to the image side. The sixth lens group G6 consists of one lens L61.

During magnification change, the first lens group G1, the third lens group G3, and the sixth lens group G6 remain stationary with respect to the image plane Sim, and the second lens group G2, the fourth lens group G4, and the fifth lens group G5 move along the optical axis Z by changing the spacings between the adjacent lens groups. The front group GF consists of the first lens group G1 and the second lens group G2. The middle group GM consists of the third lens group G3. The rear group GR consists of the fourth lens group G4, the fifth lens group G5, and the sixth lens group G6. The focusing group consists of the fourth lens group G4. During focusing from the infinite distance object to the short range object, the focusing group moves toward the object side.

Figure 39:
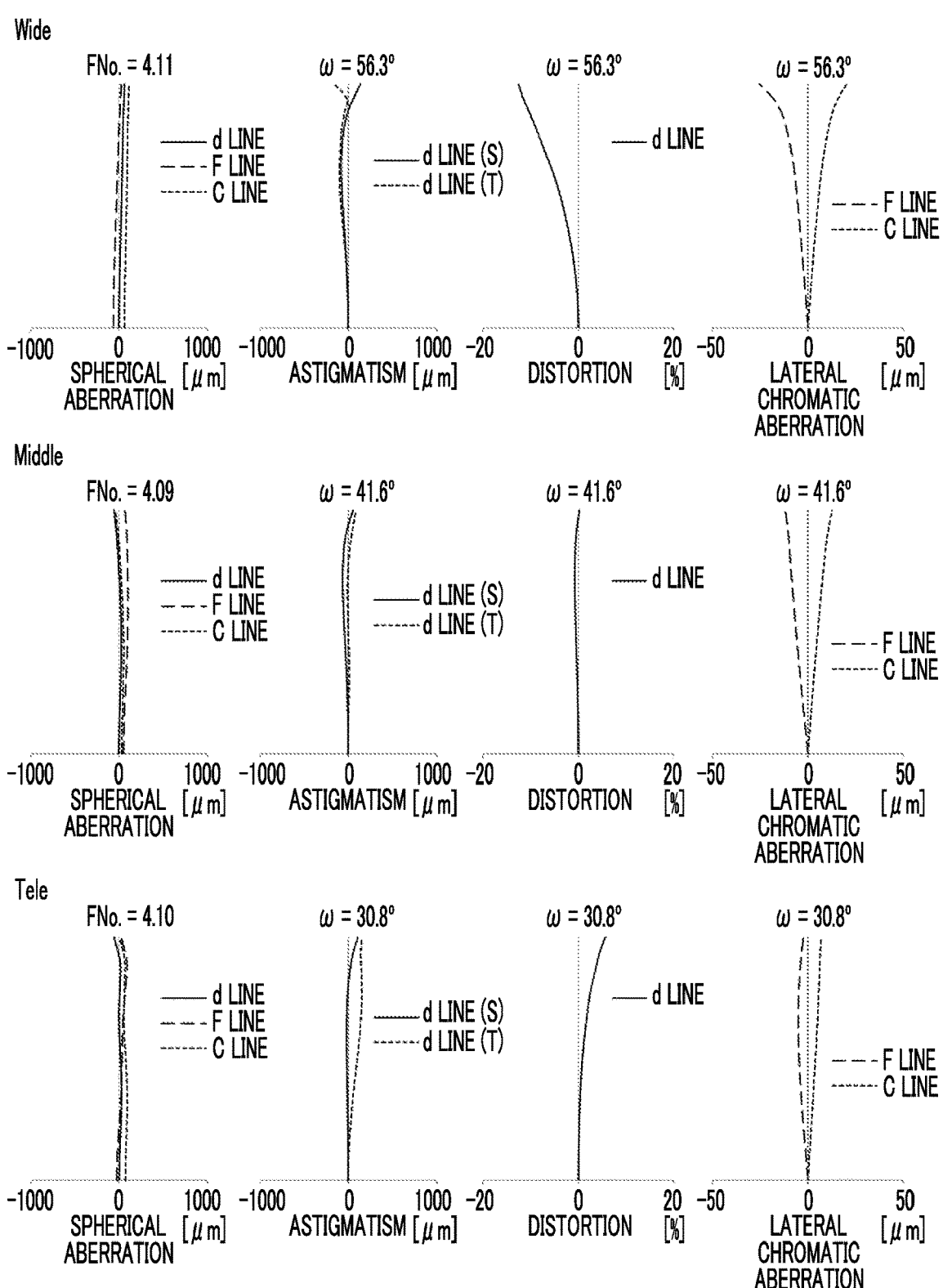
FIG. 39 is a diagram of aberrations of the variable magnification optical system of Example 18.

Regarding the variable magnification optical system of Example 18, Table 52 shows basic lens data, Table 53 shows specifications and variable surface spacings, and Table 54 shows aspherical coefficients thereof. FIG. 39 shows aberration diagrams.

TABLE 52

| | | Example 18 | | | |
|---|---|---|---|---|---|
| Sn | R | D | Nd | vd | ED |
| 1 | 38.06754 | 1.400 | 1.91856 | 36.93 | 40.8 |
| 2 | 18.78508 | 4.731 | | | |
| *3 | 51.13120 | 2.878 | 1.91294 | 37.50 | |
| *4 | 19.23089 | DD[4] | | | |
| 5 | −37.05062 | 2.908 | 1.49601 | 55.75 | |
| 6 | 44.58341 | 3.081 | 1.96300 | 24.11 | |
| 7 | −135.39913 | DD[7] | | | |
| 8 | 26.66985 | 1.783 | 1.95375 | 32.32 | |
| 9 | 67.20128 | 8.001 | | | |
| 10 | 21.88641 | 0.800 | 1.92599 | 23.60 | |
| 11 | 13.23405 | 4.456 | 1.52841 | 76.45 | |
| 12 | −50.40663 | 1.000 | | | |
| 13(St) | ∞ | DD[13] | | | |
| *14 | −42.61344 | 2.000 | 1.85406 | 27.26 | |
| *15 | −173.35059 | 0.010 | | | |
| 16 | 121.09298 | 3.799 | 1.49700 | 81.54 | |
| 17 | −13.42445 | DD[17] | | | |
| 18 | −30.28368 | 0.900 | 2.00000 | 28.30 | |
| 19 | 30.88854 | 1.645 | | | |
| *20 | 30.88854 | 5.000 | 1.75520 | 27.51 | |
| *21 | −20.27693 | 3.372 | | | |
| 22 | −64.73890 | 1.000 | 1.91405 | 37.39 | |
| 23 | 30.50175 | DD[23] | | | |
| 24 | 4685.35375 | 1.693 | 1.95906 | 17.47 | |
| 25 | −125.00001 | 14.764 | | | 33 |

TABLE 53

| | Example 18 | | |
|---|---|---|---|
| | Wide | Middle | Tele |
| Zr | 1.0 | 1.5 | 2.1 |
| f | 16.481 | 24.344 | 34.363 |
| Bf | 14.764 | 14.764 | 14.764 |
| FNo. | 4.11 | 4.10 | 4.10 |
| 2ω[°] | 112.6 | 83.2 | 61.6 |
| DD[4] | 14.652 | 10.865 | 9.811 |
| DD[7] | 14.548 | 8.292 | 0.256 |
| DD[13] | 3.614 | 5.798 | 7.947 |
| DD[17] | 0.256 | 0.290 | 1.733 |
| DD[23] | 6.693 | 14.518 | 20.016 |

TABLE 54

| | | Example 18 | | |
|---|---|---|---|---|
| Sn | 3 | 4 | 14 | 15 |
| KA | −4.9102352E+00 | 8.8534340E−01 | 1.0000000E+00 | 1.0000000E+00 |
| A4 | 5.832907IE−05 | 6.4634200E−05 | −2.1380288E−04 | −1.3320322E−04 |
| A6 | −2.2316681E−07 | −1.8303340E−07 | −4.1871105E−08 | 3.2565893E−07 |
| A8 | 7.2664608E−10 | 1.6895386E−10 | −5.0179503E−09 | 2.8889546E−09 |
| A10 | −1.3381422E−12 | 2.7201542E−12 | 8.0526102E−11 | −3.5366634E−11 |
| A12 | 1.0553640E−15 | −8.7290384E−15 | −8.6056354E−13 | 1.5278030E−13 |

| Sn | 20 | 21 |
|---|---|---|
| KA | 1.0000000E+00 | 1.0000000E+00 |
| A4 | −2.5687050E−05 | 7.1296377E−06 |
| A6 | 7.4753460E−08 | −7.3816587E−09 |
| A8 | 2.5179713E−10 | 2.9974353E−11 |
| A10 | −4.0119504E−12 | −9.2691079E−13 |
| A12 | −3.2029380E−14 | 1.2715293E−15 |
| A14 | 9.8466337E−16 | 4.5999869E−16 |
| A16 | −5.5631096E−18 | −3.4897701E−18 |

Example 19

Figure 40:
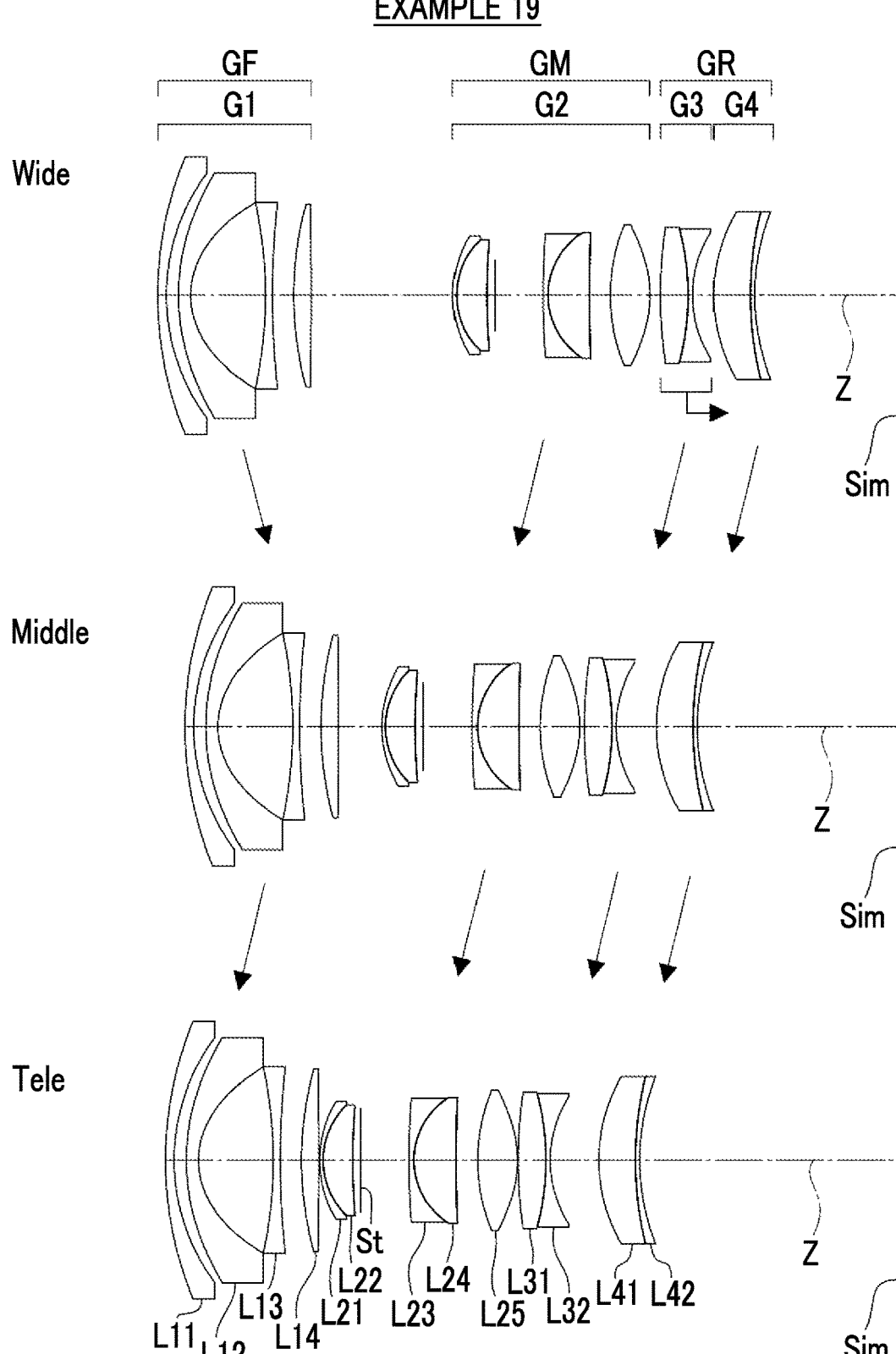
FIG. 40 is a cross-sectional view showing a configuration of a variable magnification optical system of Example 19 and is a diagram showing movement directions.

FIG. 40 shows a configuration and movement directions of the variable magnification optical system of Example 19. The variable magnification optical system of Example 19 consists of, in order from the object side to the image side, a first lens group G1 that has a negative refractive power, a second lens group G2 that has a positive refractive power, a third lens group G3 that has a negative refractive power, and a fourth lens group G4 that has a positive refractive power. The first lens group G1 consists of four lenses L11 to L14, in order from the object side to the image side. The second lens group G2 consists of lenses L21 and L22, an aperture stop St, and lenses L23 to L25, in order from the object side to the image side. The third lens group G3 consists of two lenses L31 and L32, in order from the object side to the image side. The fourth lens group G4 consists of two lenses L41 and L42, in order from the object side to the image side.

During magnification change, all the lens groups move along the optical axis Z by changing the spacings between the adjacent lens groups. The front group GF consists of the first lens group G1. The middle group GM consists of the second lens group G2. The rear group GR consists of the third lens group G3 and the fourth lens group G4. The focusing group consists of the third lens group G3. During focusing from the infinite distance object to the short range object, the focusing group moves to the image side.

Figure 41:
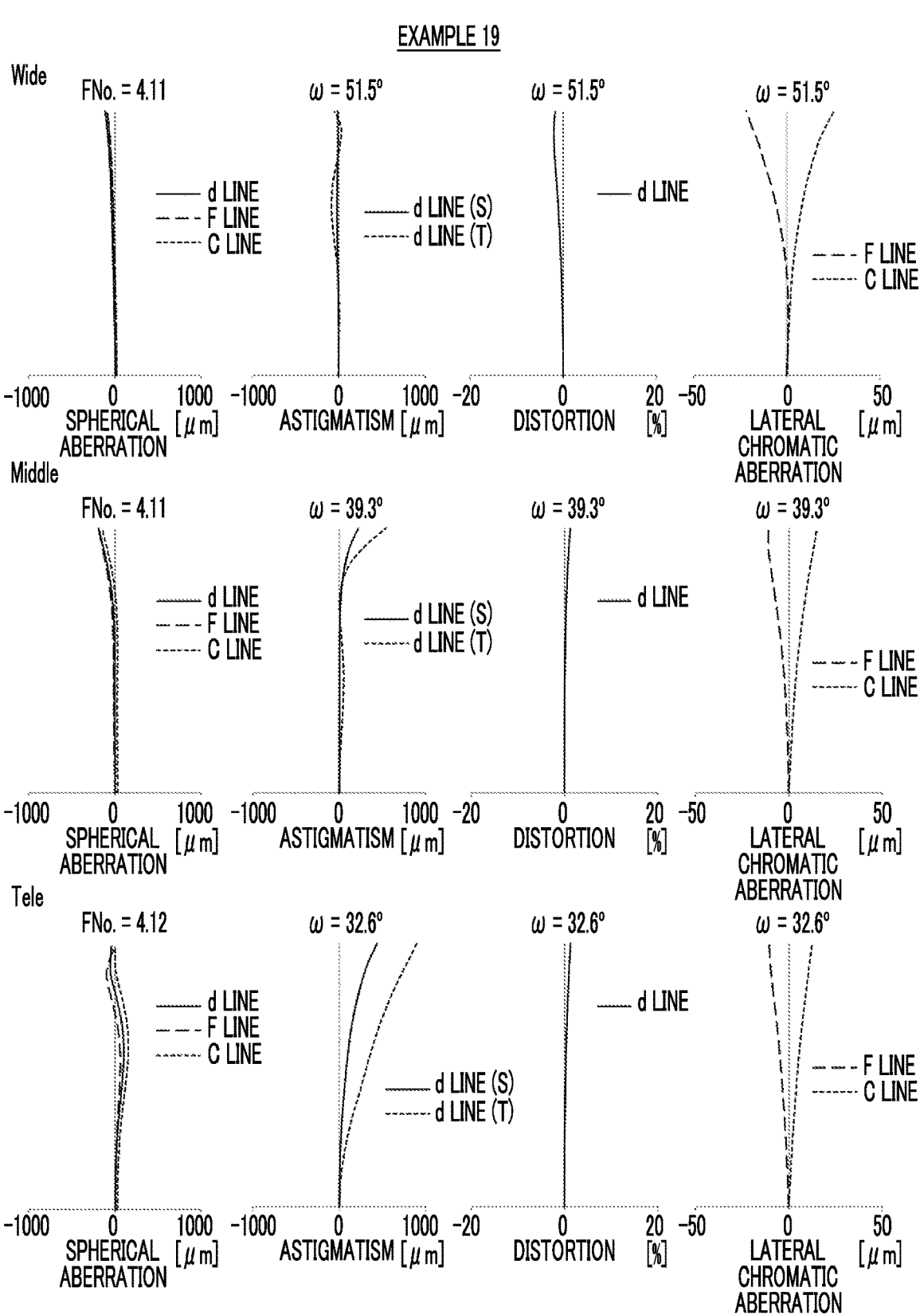
FIG. 41 is a diagram of aberrations of the variable magnification optical system of Example 19.

Regarding the variable magnification optical system of Example 19, Table 55 shows basic lens data, Table 56 shows specifications and variable surface spacings, and Table 57 shows aspherical coefficients thereof. FIG. 41 shows aberration diagrams.

TABLE 55

Example 19

| Sn | R | D | Nd | vd | ED |
|---|---|---|---|---|---|
| 1 | 51.9005 | 1.2498 | 2.00001 | 28.60 | 39.8341 |
| 2 | 29.4121 | 1.7498 | | | |
| *3 | 31.8784 | 1.7498 | 1.54134 | 74.85 | |
| *4 | 11.6485 | 10.6661 | | | |
| 5 | −62.8746 | 1.0000 | 1.65115 | 60.11 | |
| 6 | 123.0107 | 3.0574 | | | |
| 7 | 49.6705 | 2.5000 | 1.99667 | 26.15 | |
| 8 | −941.1041 | DD[8] | | | |
| 9 | 16.5370 | 0.4999 | 1.80956 | 48.08 | |
| 10 | 11.1502 | 4.2598 | 1.43599 | 67.00 | |
| 11 | 91.5615 | 0.0300 | 1.51460 | 49.96 | |
| **12 | 93.6275 | 1.1251 | | | |
| 13(St) | ∞ | 6.9222 | | | |
| 14 | 114.0935 | 0.7076 | 1.52219 | 50.84 | |
| 15 | 10.6840 | 5.9747 | 1.50242 | 80.83 | |
| 16 | 249.4223 | 0.0300 | 1.51460 | 49.96 | |
| **17 | −293.5145 | 2.9813 | | | |
| *18 | 26.4012 | 5.7095 | 1.51150 | 79.40 | |

TABLE 55-continued

Example 19

| Sn | R | D | Nd | vd | ED |
|---|---|---|---|---|---|
| *19 | −17.1024 | DD[19] | | | |
| 20 | 66.0446 | 3.9998 | 2.00001 | 19.79 | |
| 21 | −36.9709 | 0.6100 | 1.99465 | 28.85 | |
| 22 | 17.0493 | DD[22] | | | |
| 23 | 23.8695 | 5.2598 | 1.44728 | 89.18 | |
| 24 | 49.9784 | 0.6249 | 1.96803 | 21.51 | |
| 25 | 33.0567 | DD[25] | | | 24.0310 |

TABLE 56

Example 19

| | Wide | Middle | Tele |
|---|---|---|---|
| Zr | 1.0 | 1.5 | 1.9 |
| f | 17.52 | 26.08 | 33.46 |
| Bf | 20.52 | 28.69 | 36.97 |
| FNo. | 4.11 | 4.11 | 4.12 |
| 2ω[°] | 103.0 | 78.6 | 65.2 |
| DD[8] | 20.31 | 6.26 | 0.11 |
| DD[19] | 1.49 | 0.66 | 0.10 |
| DD[22] | 3.00 | 5.78 | 7.02 |
| DD[25] | 20.52 | 28.69 | 36.97 |

TABLE 57

Example 19

| Sn | 3 | 4 | 12 |
|---|---|---|---|
| KA | 1.3040572E+00 | 4.1423786E−01 | −3.1925585E+01 |
| A4 | 5.7829502E−06 | 9.6913359E−06 | −1.2157505E−06 |
| A6 | −4.2932306E−08 | −2.1681538E−08 | 1.7465925E−07 |
| A8 | 6.3507181E−11 | −1.2455312E−10 | −5.9129343E−09 |
| A10 | −6.6506958E−14 | 4.4625657E−13 | 7.0366583E−11 |
| A12 | 3.0845383E−17 | −2.4389492E−15 | −3.3233494E−13 |

| Sn | 17 | 18 | 19 |
|---|---|---|---|
| KA | 1.1817707E+02 | 1.0832063E+00 | 5.1485655E−01 |
| A4 | 4.8849510E−05 | −3.7775238E−06 | 3.0444795E−05 |
| A6 | −8.1571266E−08 | 1.8299818E−08 | −1.9963397E−08 |
| A8 | 1.5262686E−09 | 4.6882333E−10 | 7.8276134E−10 |
| A10 | −2.3646310E−11 | −4.0710349E−12 | −1.4097146E−12 |
| A12 | 2.4241190E−14 | 1.1597323E−14 | −7.4245225E−16 |

Tables 58 to 61 show the corresponding values of Conditional Expressions (1) to (28) of the variable magnification optical system of Examples 1 to 19. By using the corresponding values of examples shown in Tables 58 to 61 as the upper limits or the lower limits of conditional expressions, an even more preferable ranges of the conditional expressions may be set.

TABLE 58

| Expression Number | | Example 1 | Example 2 | Example 3 | Example 4 | Example 5 |
|---|---|---|---|---|---|---|
| (1) | TLw/(ft × tanωt) | 4.339 | 4.820 | 4.993 | 4.633 | 4.899 |
| (2) | (fw × TLw)/ft² | 1.840 | 1.433 | 1.461 | 1.468 | 1.434 |
| (3) | FNot/(ft/fw) | 2.384 | 1.966 | 1.971 | 1.995 | 1.971 |
| (4) | (−fFw)/fM | 0.357 | 0.461 | 0.462 | 1.401 | 0.460 |
| (5) | (−fFw)/(fw × ft)^{1/2} | 1.135 | 0.895 | 0.849 | 1.114 | 0.906 |
| (6) | fM/(fw × ft)^{1/2} | 3.181 | 1.944 | 1.837 | 0.795 | 1.970 |
| (7) | fL1/fFw | 1.403 | 2.280 | 3.184 | 1.357 | 2.002 |
| (8) | (−fFw)/(ft/FNot) | 3.548 | 2.542 | 2.416 | 3.195 | 2.579 |
| (9) | D1/(ft/FNot) | 0.145 | 0.127 | 0.129 | 0.227 | 0.121 |

TABLE 58-continued

| Expression Number | | Example 1 | Example 2 | Example 3 | Example 4 | Example 5 |
|---|---|---|---|---|---|---|
| (10) | $\tan\omega w/FNow$ | 0.353 | 0.366 | 0.370 | 0.370 | 0.360 |
| (11) | $\beta Mt/\beta Mw$ | 0.559 | −1.276 | −2.118 | 1.364 | −1.080 |
| (12) | $(fw \times ft)^{1/2}/|fRw|$ | 0.718 | 0.456 | 0.416 | 0.985 | 0.477 |
| (13) | $\beta Rrw$ | −0.177 | 1.415 | 1.334 | 1.135 | 1.453 |
| (14) | $DDFSTw/|fFw|$ | 1.778 | 2.473 | 2.609 | 1.842 | 2.369 |
| (15) | $Enpw/\{(fw \times \tan\omega w) \times \log(ft/fw)\}$ | 2.807 | 2.190 | 2.276 | 2.129 | 2.165 |
| (16) | $DDFSTw/\{(fw \times \tan\omega w) \times \log(ft/fw)\}$ | 7.779 | 6.656 | 6.582 | 6.154 | 6.577 |
| (17) | $Enpw/(fw \times ft)^{1/2}$ | 0.728 | 0.728 | 0.766 | 0.710 | 0.707 |
| (18) | $DDFSTw/TLw$ | 0.486 | 0.513 | 0.503 | 0.471 | 0.497 |
| (19) | $Bfw/TEw$ | 0.137 | 0.165 | 0.174 | 0.154 | 0.165 |
| (20) | $fw/Expw$ | 0.507 | 0.428 | 0.421 | 0.422 | 0.425 |
| (21) | $(Rf + Rr)/(Rf - Rr)$ | 2.539 | 3.278 | 3.223 | 2.226 | 2.658 |
| (22) | $vRpave$ | 73.55 | 73.55 | 67.68 | 57.58 | 64.39 |
| (23) | $(ft/fw)/DMwt$ | −0.14 | −0.14 | −0.16 | −0.09 | −0.16 |
| (24) | $(NL1 + NLn2)/2$ | 1.84533 | 1.82298 | 1.72698 | 1.7438 | 1.80618 |
| (25) | $fRw/fREp$ | 0.681 | 2.698 | 3.191 | −1.284 | 3.130 |
| (26) | $EDf/EDr$ | 1.574 | 1.702 | 1.820 | 1.536 | 1.673 |
| (27) | $EDf/TLw$ | 0.400 | 0.375 | 0.382 | 0.388 | 0.375 |
| (28) | $vLn3$ | 90.19 | 90.19 | 90.19 | 78.59 | 70.24 |

TABLE 59

| Expression Number | | Example 6 | Example 7 | Example 8 | Example 9 | Example 10 |
|---|---|---|---|---|---|---|
| (1) | $TLw/(ft \times \tan\omega t)$ | 5.032 | 5.005 | 4.824 | 4.851 | 4.729 |
| (2) | $(fw \times TLw)/ft^2$ | 1.619 | 1.629 | 1.480 | 1.470 | 1.493 |
| (3) | $FNot/(ft/fw)$ | 2.108 | 2.113 | 1.992 | 1.985 | 1.995 |
| (4) | $(-fFw)/fM$ | 0.375 | 0.324 | 0.293 | 0.462 | 1.416 |
| (5) | $(-fFw)/(fw \times ft)^{1/2}$ | 0.786 | 0.756 | 0.805 | 0.936 | 1.136 |
| (6) | $fM/(fw \times ft)^{1/2}$ | 2.094 | 2.330 | 2.748 | 2.027 | 0.802 |
| (7) | $fL1/fFw$ | 1.614 | 1.799 | 1.985 | 1.822 | 1.327 |
| (8) | $(-fFw)/(ft/FNot)$ | 2.312 | 2.229 | 2.306 | 2.674 | 3.256 |
| (9) | $D1/(ft/FNot)$ | 0.130 | 0.130 | 0.126 | 0.151 | 0.227 |
| (10) | $\tan\omega w/FNow$ | 0.347 | 0.355 | 0.367 | 0.351 | 0.363 |
| (11) | $\beta Mt/\beta Mw$ | 0.020 | 0.323 | 0.573 | −0.931 | 1.365 |
| (12) | $(fw \times ft)^{1/2}/|fRw|$ | 0.530 | 0.575 | 0.686 | 0.502 | 0.965 |
| (13) | $\beta Rrw$ | 0.764 | 0.675 | 0.577 | 1.018 | 0.778 |
| (14) | $DDFSTw/|fFw|$ | 2.659 | 2.780 | 2.670 | 2.269 | 1.853 |
| (15) | $Enpw/\{(fw \times \tan\omega w) \times \log(ft/fw)\}$ | 2.223 | 2.186 | 2.207 | 2.305 | 2.196 |
| (16) | $DDFSTw/\{(fw \times \tan\omega w) \times \log(ft/fw)\}$ | 7.043 | 6.925 | 6.507 | 6.721 | 6.430 |
| (17) | $Enpw/(fw \times ft)^{1/2}$ | 0.659 | 0.663 | 0.729 | 0.728 | 0.719 |
| (18) | $DDFSTw/TLw$ | 0.474 | 0.474 | 0.488 | 0.485 | 0.475 |
| (19) | $Bfw/TEw$ | 0.241 | 0.216 | 0.140 | 0.244 | 0.150 |
| (20) | $fw/Expw$ | 0.371 | 0.370 | 0.411 | 0.386 | 0.413 |
| (21) | $(Rf + Rr)/(Rf - Rr)$ | 2.074 | 1.964 | 2.367 | 2.904 | 2.261 |
| (22) | $vRpave$ | 71.58 | 78.86 | 82.63 | 70.04 | 60.78 |
| (23) | $(ft/fw)/DMwt$ | −0.12 | −0.13 | −0.12 | −0.10 | −0.08 |
| (24) | $(NL1 + NLn2)/2$ | 1.6296 | 1.70941 | 1.65069 | 1.8376 | 1.79008 |
| (25) | $fRw/fREp$ | 2.051 | 1.757 | 1.213 | 2.681 | −1.083 |
| (26) | $EDf/EDr$ | 1.625 | 1.557 | 1.563 | 1.865 | 1.606 |
| (27) | $EDf/TLw$ | 0.344 | 0.346 | 0.374 | 0.376 | 0.389 |
| (28) | $vLn3$ | 71.52 | 75.20 | 85.20 | 94.66 | 76.36 |

TABLE 60

| Expression Number | | Example 11 | Example 12 | Example 13 | Example 14 | Example 15 |
|---|---|---|---|---|---|---|
| (1) | $TLw/(ft \times \tan\omega t)$ | 4.831 | 4.797 | 5.137 | 4.899 | 5.045 |
| (2) | $(fw \times TLw)/ft^2$ | 1.560 | 1.685 | 1.469 | 1.468 | 1.465 |
| (3) | $FNot/(ft/fw)$ | 2.672 | 2.616 | 1.966 | 1.966 | 1.966 |
| (4) | $(-fFw)/fM$ | 0.880 | 0.833 | 0.864 | 0.510 | 0.863 |
| (5) | $(-fFw)/(fw \times ft)^{1/2}$ | 0.724 | 0.705 | 0.812 | 0.917 | 0.960 |

TABLE 60-continued

| Expression Number | | Example 11 | Example 12 | Example 13 | Example 14 | Example 15 |
|---|---|---|---|---|---|---|
| (6) | fM/(fw × ft)$^{1/2}$ | 0.822 | 0.846 | 0.940 | 1.799 | 1.112 |
| (7) | fL1/fFw | 2.099 | 2.608 | 2.183 | 2.250 | 1.666 |
| (8) | (−fFw)/(ft/FNot) | 2.700 | 2.573 | 2.306 | 2.603 | 2726 |
| (9) | D1/(ft/FNot) | 0.187 | 0.194 | 0.114 | 0.164 | 0.121 |
| (10) | tanωw/FNow | 0.326 | 0.381 | 0.367 | 0.366 | 0.362 |
| (11) | βMt/βMw | 1.516 | 1.574 | 1.936 | −0.981 | 2.047 |
| (12) | (fw × ft)$^{1/2}$/\|fRw\| | 0.721 | 0.464 | 0.417 | 0.523 | 0.005 |
| (13) | βRrw | 0.778 | 1.544 | 0.910 | 0.959 | 0.896 |
| (14) | DDFSTw/\|fFw\| | 2.969 | 2.959 | 3.238 | 2.377 | 2.534 |
| (15) | Enpw/{(fw × tanωw) × log(ft/fw)} | 2.488 | 2.174 | 2.274 | 2.415 | 2.240 |
| (16) | DDFSTw/{(fw × tanωw) × log(ft/fw)} | 7.709 | 6.395 | 7.908 | 6.577 | 7.424 |
| (17) | Enpw/(fw × ft)$^{1/2}$ | 0.693 | 0.709 | 0.756 | 0.800 | 0.734 |
| (18) | DDFSTw/TEw | 0.506 | 0.455 | 0.595 | 0.493 | 0.551 |
| (19) | Bfw/TEw | 0.184 | 0.153 | 0.131 | 0.104 | 0.155 |
| (20) | fw/Expw | 0.470 | 0.423 | 0.431 | 0.442 | 0.397 |
| (21) | (Rf + Rr)/(Rf − Rr) | 3.508 | 4.171 | 2.640 | 3.868 | 2.990 |
| (22) | vRpave | 58.36 | 79.58 | 37.67 | 70.13 | 43.87 |
| (23) | (ft/fw)/DMwt | −0.13 | −0.16 | −0.12 | −0.15 | −0.10 |
| (24) | (NL1 + NLn2)/2 | 1.84947 | 1.89452 | 1.90893 | 1.85432 | 1.999995 |
| (25) | fRw/fREp | −1.568 | −2.021 | −3.125 | 1.872 | −269.361 |
| (26) | EDf/EDr | 1.734 | 1.402 | 1.236 | 1.193 | 1.211 |
| (27) | EDf/TLw | 0.340 | 0.324 | 0.388 | 0.377 | 0.381 |
| (28) | vLn3 | 91.51 | 74.12 | 62.74 | 79.61 | 72.01 |

TABLE 61

| Expression Number | | Example 16 | Example 17 | Example 18 | Example 19 |
|---|---|---|---|---|---|
| (1) | TLw/(ft × tanωt) | 5.112 | 4.964 | 5.125 | 4.955 |
| (2) | (fw × TLw)/ft$^2$ | 1.734 | 1.503 | 1.465 | 1.659 |
| (3) | FNot/(ft/fw) | 2.168 | 2.045 | 1.966 | 2.157 |
| (4) | (−fFw)/fM | 0.323 | 1.053 | 0.876 | 1.559 |
| (5) | (−fFw)/(fw × ft)$^{1/2}$ | 0.765 | 1.062 | 0.932 | 1.333 |
| (6) | fM/(fw × ft)$^{1/2}$ | 2.369 | 1.008 | 1.064 | 0.855 |
| (7) | fLl/fFw | 1.784 | 1.851 | 1.885 | 2.163 |
| (8) | (−fFw)/(ft/FNot) | 2.285 | 3.072 | 2.648 | 3.975 |
| (9) | D1/(ft/FNot) | 0.134 | 0.119 | 0.167 | 0.154 |
| (10) | tanωw/FNow | 0.348 | 0.340 | 0.365 | 0.306 |
| (11) | βMt/βMw | 0.328 | 1.792 | 2.011 | 1.351 |
| (12) | (fw × ft)$^{1/2}$/\|fRw\| | 0.565 | 0.521 | 0.169 | 1.032 |
| (13) | βRrw | 0.890 | 2.159 | 0.883 | 0.894 |
| (14) | DDFSTw/\|fFw\| | 2.762 | 2.385 | 2.715 | 1.493 |
| (15) | Enpw/{(fw × tanωw) × log(ft/fw)} | 2.338 | 2.688 | 2.322 | 2.923 |
| (16) | DDFSTw/{ (fw × tanωw) × log(ft/fw)} | 7.311 | 8.554 | 7.639 | 7.788 |
| (17) | Enpw/(fw × ft)$^{1/2}$ | 0.675 | 0.796 | 0.769 | 0.747 |
| (18) | DDFSTw/TLw | 0.465 | 0.596 | 0.574 | 0.455 |
| (19) | Bfw/TLw | 0.215 | 0.089 | 0.141 | 0.194 |
| (20) | fw/Expw | 0.374 | 0.555 | 0.424 | 0.405 |
| (21) | (Rf + Rr)/(Rf − Rr) | 2.107 | 3.120 | 2.948 | 3.616 |
| (22) | vRpave | 73.15 | 51.10 | 42.17 | 67.30 |
| (23) | (ft/fw)/DMwt | −0.13 | −0.11 | −0.11 | −0.09 |
| (24) | (NL1 + NLn2)/2 | 1.64263 | 1.82966 | 1.91575 | 1.770675 |
| (25) | fRw/fRLp | 1.945 | −3.307 | −8.333 | −1.104 |
| (26) | EDf/EDr | 1.569 | 1.187 | 1.236 | 1.658 |
| (27) | EDf/TLw | 0.344 | 0.387 | 0.389 | 0.376 |
| (28) | vLn3 | 74.54 | 62.11 | 55.75 | 60.11 |

The variable magnification optical systems of Examples 1 to 19 have a total angle of view of greater than 100 degrees at the wide angle end while being configured to have a small size, thereby achieving a wide angle of view. The variable magnification optical systems of Examples 1 to 19 have a maximum variable magnification ratio of 1.7 or greater, thereby achieving a relatively high variable magnification ratio as an optical system having a wide angle of view. In the variable magnification optical systems of Examples 1 to 19, various aberrations are satisfactorily corrected and high optical performance is maintained.

Figure 42:
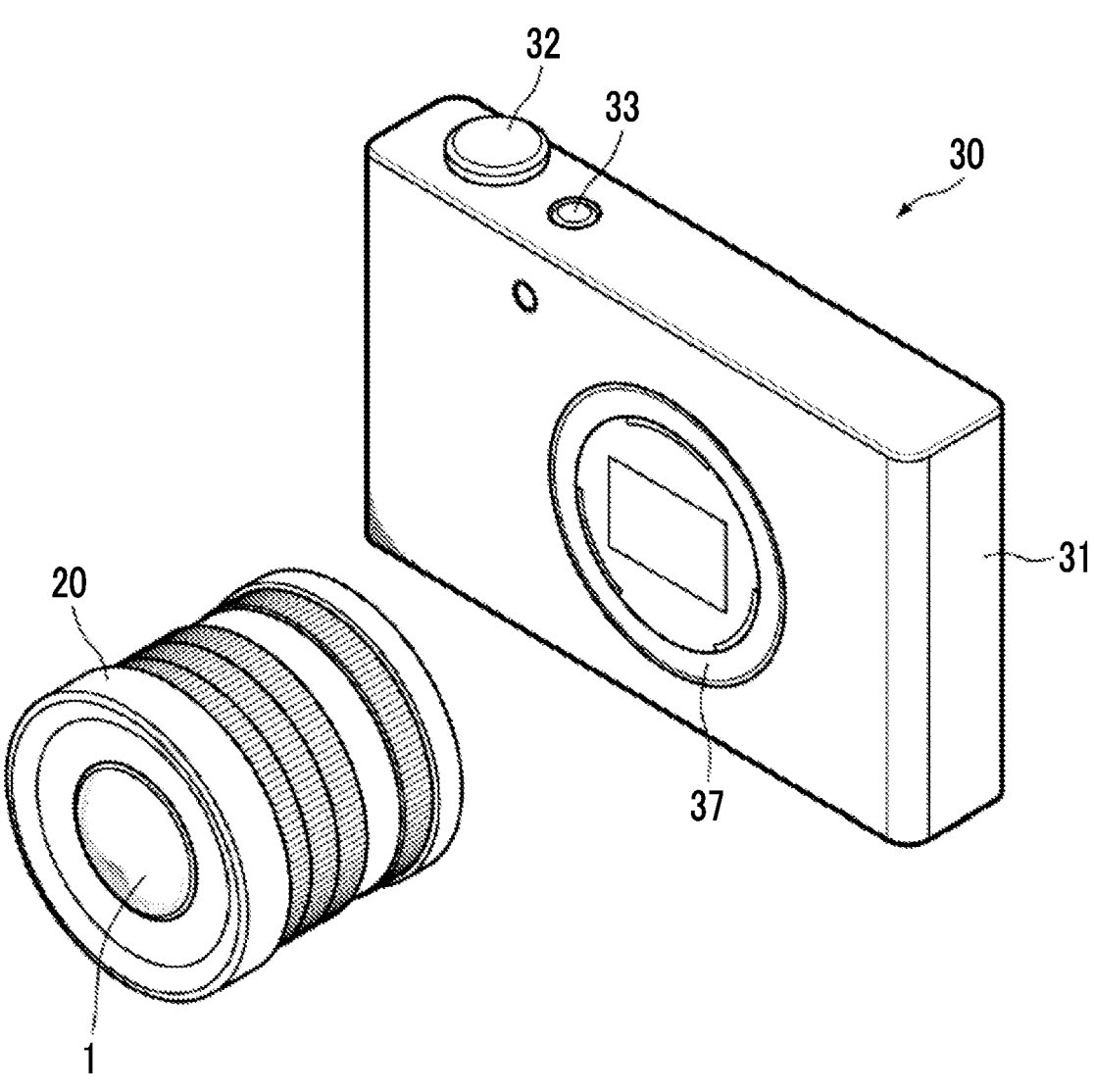
FIG. 42 is a perspective view of the front side of the imaging apparatus according to an embodiment.
Figure 43:
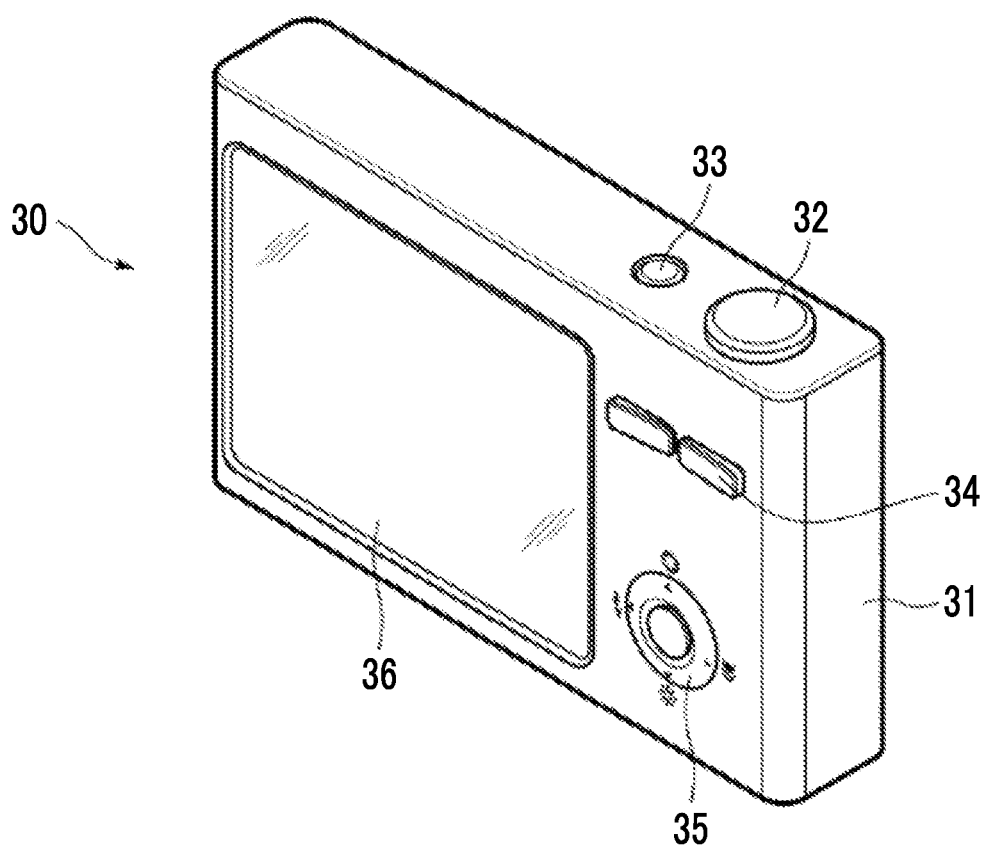
FIG. 43 is a perspective view of the rear side of the imaging apparatus according to the embodiment.

Next, an imaging apparatus according to an embodiment of the present disclosure will be described. FIGS. 42 and 43 are external views of a camera 30 which is the imaging apparatus according to the embodiment of the present disclosure. FIG. 42 is a perspective view of the camera 30 viewed from a front side, and FIG. 43 is a perspective view of the camera 30 viewed from a rear side. The camera 30 is a so-called mirrorless type digital camera, and the interchangeable lens 20 can be removably attached thereto. The interchangeable lens 20 is configured to include the variable magnification optical system 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the abovementioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, a video camera, and a security camera.

What is claimed is:

1. A variable magnification optical system consisting of, in order from an object side to an image side: a front group; a middle group; and a rear group, wherein the front group consists of two or fewer lens groups and has a negative refractive power as a whole throughout an entire variable magnification range, the middle group includes only one lens group that has a positive refractive power as a lens group, the rear group consists of three or less lens groups, an aperture stop is disposed between a lens surface closest to the image side in the front group and a lens surface closest to the object side in the rear group, during magnification change, a spacing between the front group and the middle group changes, and a spacing between the middle group and the rear group changes, in a case where the front group consists of two lens groups, a spacing between adjacent lens groups in the front group changes during magnification change, in a case where the rear group consists of a plurality of lens groups, all spacings between adjacent lens groups in the rear group change during magnification change, the front group includes at least three negative lenses and at least one positive lens, a first lens that has a negative refractive power and has a meniscus shape convex toward the object side is disposed closest to the object side in the front group, and assuming that a sum of a back focal length of the variable magnification optical system in terms of an air-equivalent distance and a distance on an optical axis from a lens surface closest to the object side in the front group to a lens surface closest to the image side in the rear group in a state where an infinite distance object is in focus at a wide angle end is TLw, a focal length of the variable magnification optical system in a state where the infinite distance object is in focus at the wide angle end is fw, a focal length of the variable magnification optical system in a state where the infinite distance object is in focus at a telephoto end is ft, and a maximum half angle of view in a state where the infinite distance object is in focus at the telephoto end is $\omega t$, Conditional Expressions (1) and (2) are satisfied, which are represented by $$3.8 < TLw/(ft \times \tan \omega t) < 5.2 \tag{1, and}$$

$$1 < (fw \times TLw)/ft^2 < 2 \tag{2,}$$

wherein assuming that a distance on the optical axis from the lens surface closest to the object side in the front group to the aperture stop in a state where the infinite distance object is in focus at the wide angle end is DDFSTw, and a maximum half angle of view in a state where the infinite distance object is in focus at the wide angle end is $\omega w$, Conditional Expression (16) is satisfied, which is represented by $$5 < DDFSTw/\{(fw \times \tan \omega w) \times \log(ft/fw)\} < 10 \tag{16,}$$

wherein a lens group closest to the object side in the rear group has a positive refractive power, wherein the rear group consists of, in order from the object side to the image side, a lens group that has a positive refractive power and a lens group that has a negative refractive power, and wherein the front group consists of one lens group that moves during magnification change.

2. The variable magnification optical system according to claim 1, wherein assuming that an open F number in a state where the infinite distance object is in focus at the telephoto end is FNot, Conditional Expression (3) is satisfied, which is represented by $$1.5 < FNot/(ft/fw) < 3 \tag{3.}$$

3. The variable magnification optical system according to claim 1, wherein assuming that a focal length of the front group in a state where the infinite distance object is in focus at the wide angle end is fFw, and a focal length of the middle group is fM, Conditional Expression (4) is satisfied, which is represented by $$0.1 < (-fFw)/fM < 1.6 \tag{4.}$$

4. The variable magnification optical system according to claim 1, wherein assuming that a focal length of the front group in a state where the infinite distance object is in focus at the wide angle end is fFw, Conditional Expression (5) is satisfied, which is represented by $$0.6 < (-fFw)/(fw \times ft)^{1/2} < 1.3 \tag{5}.$$

5. The variable magnification optical system according to claim 1, wherein assuming that a focal length of the middle group is fM, Conditional Expression (6) is satisfied, which is represented by $$0.65 < fM/(fw \times ft)^{1/2} < 3.7 \tag{6}.$$

6. The variable magnification optical system according to claim 1, wherein assuming that a focal length of the first lens is fL1, and a focal length of the front group in a state where the infinite distance object is in focus at the wide angle end is fFw, Conditional Expression (7) is satisfied, which is represented by $$1 < fL1/fFw < 3.5 \tag{7}.$$

7. The variable magnification optical system according to claim 1, wherein assuming that a focal length of the front group in a state where the infinite distance object is in focus at the wide angle end is fFw, and an open F number in a state where the infinite distance object is in focus at the telephoto end is FNot, Conditional Expression (8) is satisfied, which is represented by $$1.8 < (-fFw)/(ft/FNot) < 4 \tag{8}.$$

8. The variable magnification optical system according to claim 1, wherein assuming that a center thickness of the first lens is D1, and an open F number in a state where the infinite distance object is in focus at the telephoto end is FNot, Conditional Expression (9) is satisfied, which is represented by $$0.08 < D1/(ft/FNot) < 0.42 \tag{9}.$$

9. The variable magnification optical system according to claim 1, wherein assuming that a maximum half angle of view in a state where the infinite distance object is in focus at the wide angle end is ωw, and an open F number in a state where the infinite distance object is in focus at the wide angle end is FNow, Conditional Expression (10) is satisfied, which is represented by $$0.3 < \tan \omega w/FNow < 0.47 \tag{10}.$$

10. The variable magnification optical system according to claim 1, wherein assuming that a focal length of the rear group in a state where the infinite distance object is in focus at the wide angle end is fRw, Conditional Expression (12) is satisfied, which is represented by $$0.15 < (fw \times ft)^{1/2}/|fRw| < 1.1 \tag{12}.$$

11. The variable magnification optical system according to claim 1, wherein assuming that a focal length of the front group in a state where the infinite distance object is in focus at the wide angle end is fFw, Conditional Expression (14) is satisfied, which is represented by $$1.4 < DDFSTw/|fFw| < 4 \tag{14}.$$

12. The variable magnification optical system according to claim 1, wherein assuming that a distance on the optical axis from the lens surface closest to the object side in the front group to a paraxial entrance pupil position in a state where the infinite distance object is in focus at the wide angle end is Enpw, and a maximum half angle of view in a state where the infinite distance object is in focus at the wide angle end is ωw, Conditional Expression (15) is satisfied, which is represented by $$1.9 < Enpw/\{(fw \times \tan \omega w) \times \log(ft/fw)\} < 3.8 \tag{15}.$$

13. The variable magnification optical system according to claim 1, wherein assuming that a distance on the optical axis from the lens surface closest to the object side in the front group to a paraxial entrance pupil position in a state where the infinite distance object is in focus at the wide angle end is Enpw, Conditional Expression (17) is satisfied, which is represented by $$0.5 < Enpw/(fw \times ft)^{1/2} < 1.1 \tag{17}.$$

14. The variable magnification optical system according to claim 1, wherein Conditional Expression (18) is satisfied, which is represented by $$0.3 < DDFSTw/TLw < 0.7 \tag{18}.$$

15. The variable magnification optical system according to claim 1, wherein assuming that the back focal length of the variable magnification optical system in terms of the air-equivalent distance in a state where the infinite distance object is in focus at the wide angle end is Bfw, Conditional Expression (19) is satisfied, which is represented by $$0.08 < Bfw/TLw < 0.27 \tag{19}.$$

16. The variable magnification optical system according to claim 1, wherein assuming that a sum of the back focal length of the variable magnification optical system in terms of the air-equivalent distance and a distance on the optical axis from a paraxial exit pupil position to the lens surface closest to the image side in the rear group in a state where the infinite distance object is in focus at the wide angle end is Expw, Conditional Expression (20) is satisfied, which is represented by $$0.28 < fw/Expw < 0.65 \tag{20}.$$

17. The variable magnification optical system according to claim 1, wherein assuming that a curvature radius of an object side surface of the first lens is Rf, and a curvature radius of an image side surface of the first lens is Rr, Conditional Expression (21) is satisfied, which is represented by $$1.5 < (Rf+Rr)/(Rf-Rr) < 4.2 \tag{21}.$$

18. The variable magnification optical system according to claim 1, wherein assuming that an average value of Abbe numbers of all positive lenses of the rear group based on a d line is vRpave, Conditional Expression (22) is satisfied, which is represented by $$40 < vRpave < 90 \tag{22}.$$

19. The variable magnification optical system according to claim 1, wherein assuming that a difference in an optical axis direction between a position of the middle group in a state where the infinite distance object is in focus at the wide angle end and a position of the middle group in a state where the infinite distance object is in focus at the telephoto end is DMwt, and a sign of DMwt is positive in a case where the position of the middle group in a state where the infinite distance object is in focus at the telephoto end is closer to the image side than the position of the middle group in a state where the infinite distance object is in focus at the wide angle end, and is negative in a case where the position of the middle group in a state where the infinite distance object is in focus at the telephoto end is closer to the object side than the position of the middle group in a state where the infinite distance object is in focus at the wide angle end, and a unit of DMwt is millimeters, Conditional Expression (23) is satisfied, which is represented by $$-0.2 < (ft/fw)/DMwt < -0.04 \tag{23}.$$

20. The variable magnification optical system according to claim 1, wherein assuming that a refractive index of the first lens at a d line is NL1, and a refractive index of a negative lens which is second from the object side at the d line among the negative lenses in the front group is NLn2, Conditional Expression (24) is satisfied, which is represented by $$1.58 < (NL1 + NLn2)/2 < 2.2 \tag{24}.$$

21. The variable magnification optical system according to claim 1, wherein an image side surface of a lens having a strongest positive refractive power in the rear group is a convex surface, and assuming that a focal length of the lens having the strongest positive refractive power in the rear group is fRLp, and a focal length of the rear group in a state where the infinite distance object is in focus at the wide angle end is fRw, Conditional Expression (25) is satisfied, which is represented by $$-10 < fRw/fRLp < 5 \tag{25}.$$

22. The variable magnification optical system according to claim 21, wherein the lens having the strongest positive refractive power in the rear group is a biconvex lens.

23. The variable magnification optical system according to claim 1, wherein assuming that an effective diameter of the lens surface closest to the object side in the front group is EDf, and an effective diameter of the lens surface closest to the image side in the rear group is EDr, Conditional Expression (26) is satisfied, which is represented by $$1.1 < EDf/EDr < 2.1 \tag{26}.$$

24. The variable magnification optical system according to claim 1, wherein assuming that an effective diameter of the lens surface closest to the object side in the front group is EDf, Conditional Expression (27) is satisfied, which is represented by $$0.2 < EDf/TLw < 0.45 \tag{27}.$$

25. The variable magnification optical system according to claim 1, wherein the rear group includes a focusing group that moves along the optical axis during focusing, and the focusing group consists of two or fewer lenses.

26. The variable magnification optical system according to claim 25, wherein the focusing group consists of one negative lens and one positive lens.

27. The variable magnification optical system according to claim 1, wherein the variable magnification optical system includes only one focusing group that moves along the optical axis during focusing, and the focusing group is disposed in the rear group.

28. The variable magnification optical system according to claim 1, wherein the variable magnification optical system includes at least two cemented lenses consisting of one positive lens and one negative lens at a position closer to the image side than the front group.

29. The variable magnification optical system according to claim 1, wherein assuming that an Abbe number of a negative lens which is third from the object side among the negative lenses in the front group based on a d line is vLn3, Conditional Expression (28) is satisfied, which is represented by $$50 < vLn3 < 95 \tag{28}.$$

30. The variable magnification optical system according to claim 1, wherein the front group includes, in order from the object side to the image side, the first lens, a second lens that has a negative refractive power and that has a meniscus shape convex toward the object side, a third lens that has a negative refractive power and that is concave toward the image side, and a fourth lens that has a positive refractive power and that is convex toward the object side.

31. An imaging apparatus comprising the variable magnification optical system according to claim 1.

* * * * *